United States Patent
Yasui

(10) Patent No.: US 8,667,782 B2
(45) Date of Patent: Mar. 11, 2014

(54) EXHAUST GAS PURIFYING APPARATUS FOR INTERNAL COMBUSTION ENGINE

(75) Inventor: Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 560 days.

(21) Appl. No.: 13/013,498

(22) Filed: Jan. 25, 2011

(65) Prior Publication Data
US 2011/0192148 A1    Aug. 11, 2011

(30) Foreign Application Priority Data

Feb. 6, 2010  (JP) ................................ 2010-024898

(51) Int. Cl.
*F01N 3/18*    (2006.01)
(52) U.S. Cl.
USPC ................................. 60/286; 60/284; 60/301
(58) Field of Classification Search
USPC ............................................ 60/284, 286, 301
See application file for complete search history.

(56) References Cited

U.S. PATENT DOCUMENTS

2010/0024390 A1    2/2010    Wills et al.

FOREIGN PATENT DOCUMENTS

| DE | 10 2005 062 120 A1 | 6/2007 |
|---|---|---|
| DE | 10 2006 055 235 A1 | 5/2008 |
| DE | 10 2007 040 439 A1 | 3/2009 |
| EP | 1 426 575 A1 | 6/2004 |
| JP | 2005-337969 A | 12/2005 |
| JP | 2007-163177 A | 6/2007 |
| JP | 2008-546968 A | 12/2008 |
| JP | 2009-024613 A | 2/2009 |
| JP | 2009-127496 A | 6/2009 |
| JP | 2009-209765 A | 9/2009 |
| WO | WO 2007/000170 A1 | 1/2007 |
| WO | WO 2008/138682 A1 | 11/2008 |

OTHER PUBLICATIONS

Japanese Office Action from JP App. No. 2010-024898 dated Jan. 31, 2012.

*Primary Examiner* — Thomas Denion
*Assistant Examiner* — Brandon Lee
(74) *Attorney, Agent, or Firm* — Arent Fox LLP

(57) ABSTRACT

An exhaust gas purifying apparatus for an internal combustion engine is provided. A selective reduction catalyst is disposed in an exhaust passage of the engine for reducing NOx in exhaust gases from the engine under existence of a reducing agent. The reducing agent or a reactant for generating the reducing agent is supplied to the upstream side of the selective reduction catalyst. Occurrence of a reducing-agent slip in which the reducing agent is discharged to the downstream side of the selective reduction catalyst is determined. A storage amount indicative of an amount of the reducing agent stored in the selective reduction catalyst is temporarily reduced from the state where the storage amount is at the maximum, and thereafter the storage amount is increased until the occurrence of the reducing-agent slip is detected. An accuracy of the reducing agent supply is determined according to an occurrence state of the reducing agent slip when the storage amount is changed.

18 Claims, 36 Drawing Sheets

FIG. 1
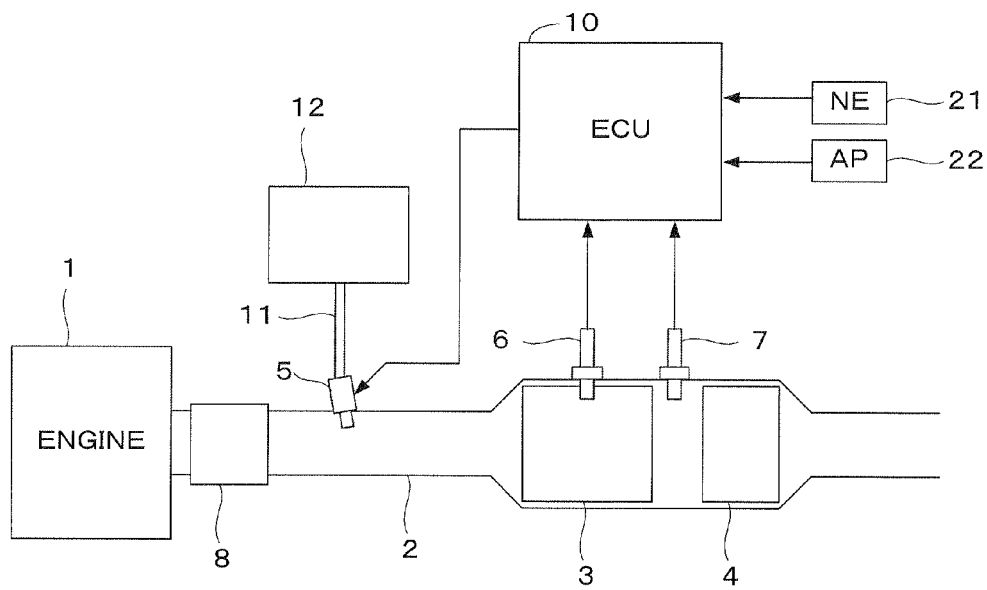
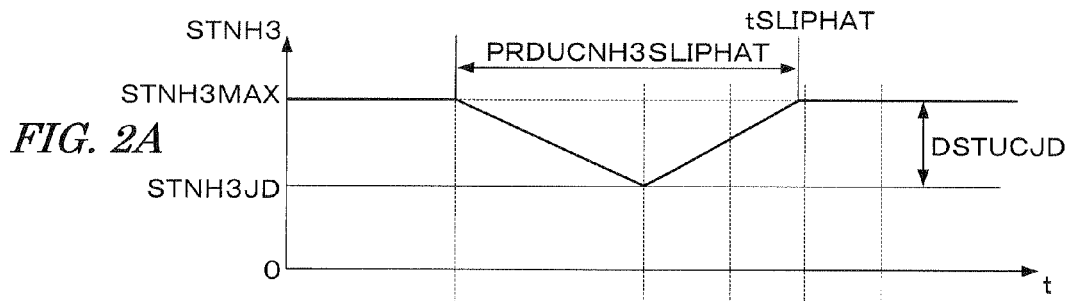
FIG. 2A
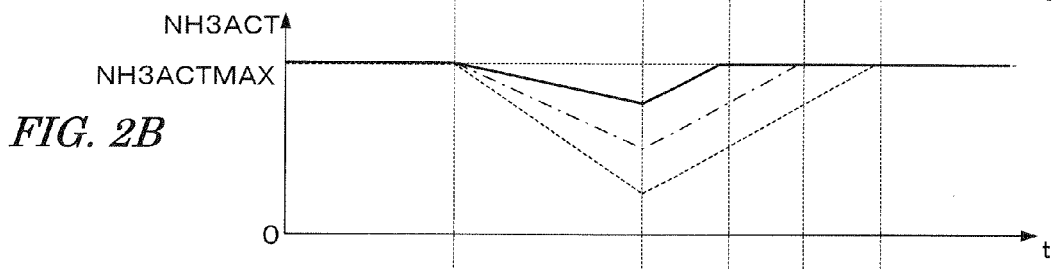
FIG. 2B
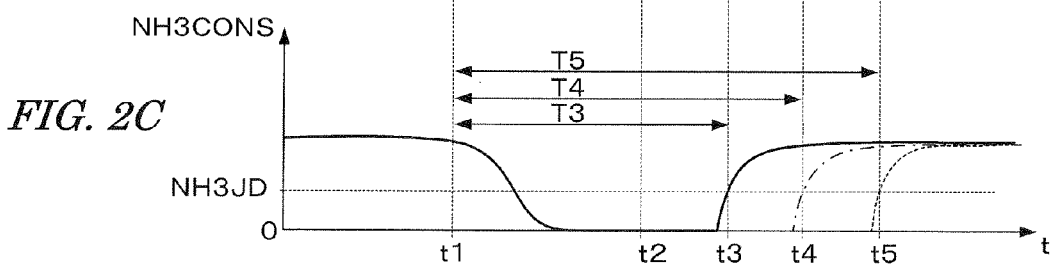
FIG. 2C

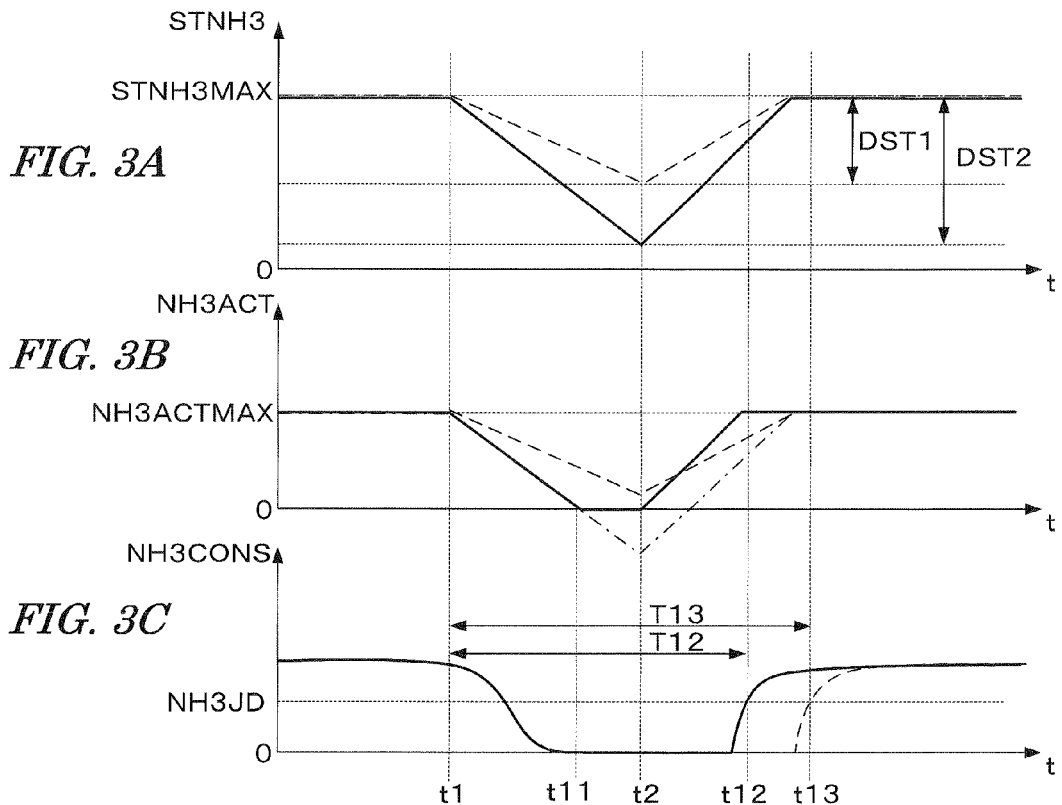
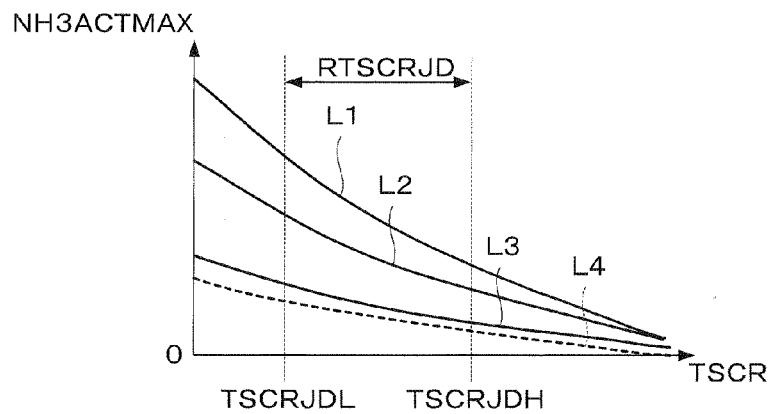

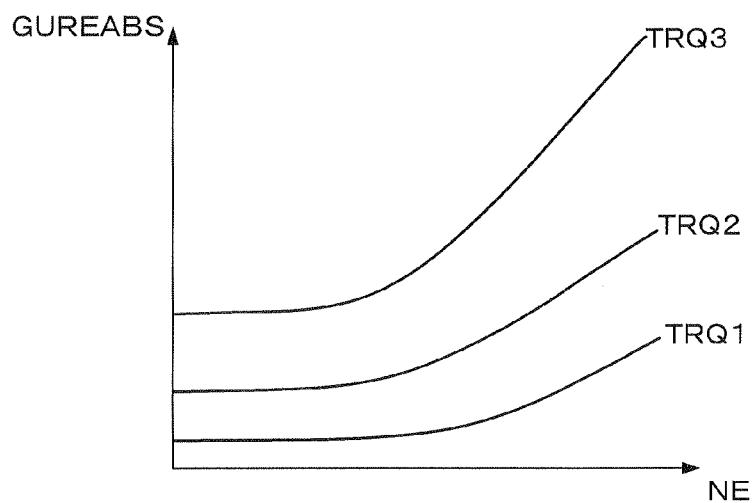
FIG. 6
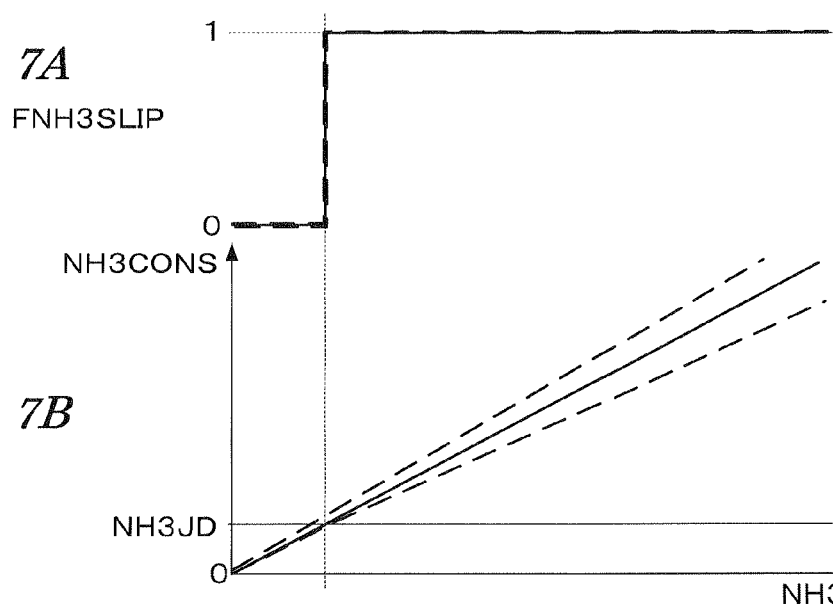
FIG. 7A
FIG. 7B

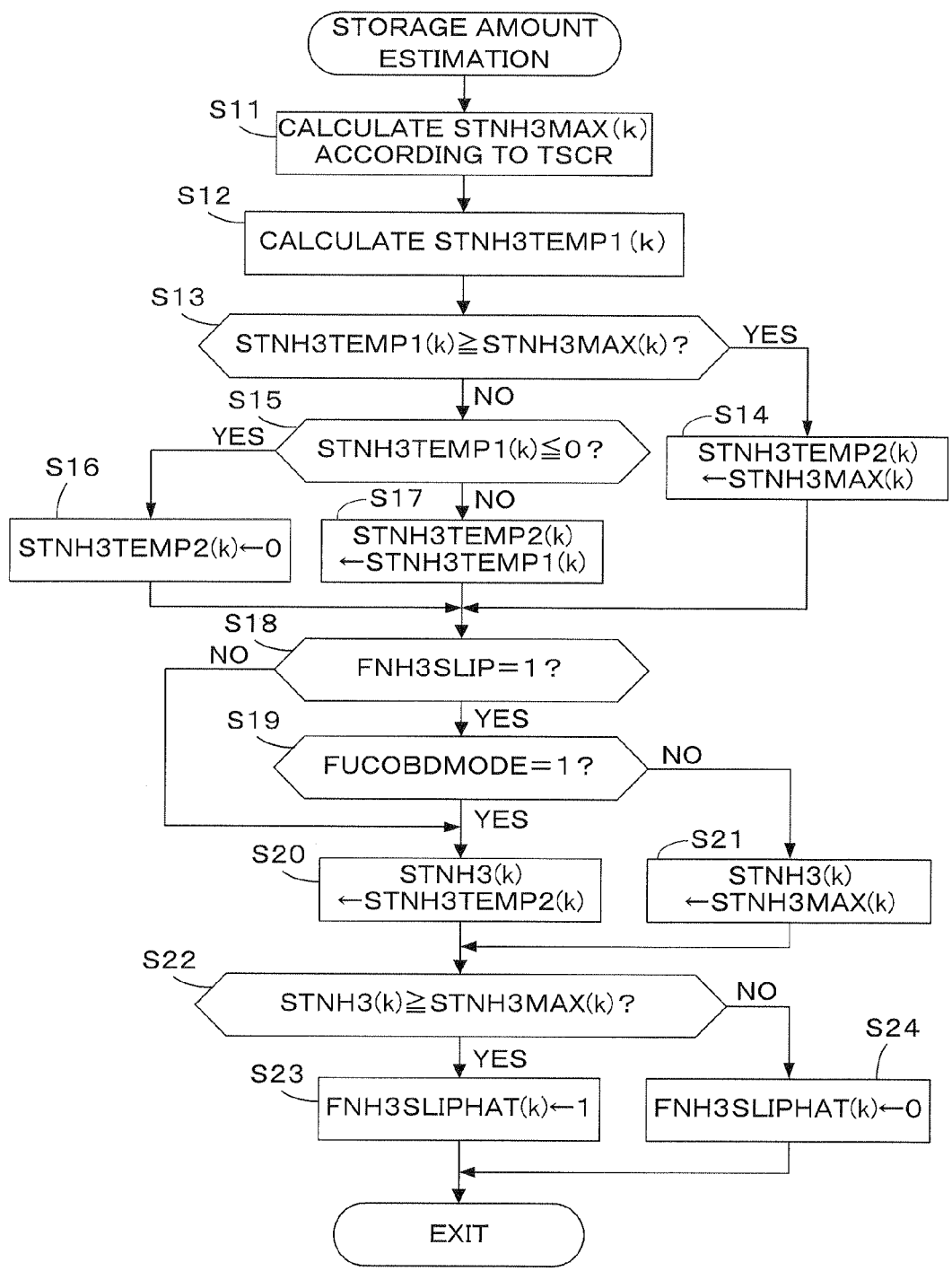

FUREASW

FNH3SLIP

NH3CONS
NH3JD

STNH3
STNH3MAX
STNH3NM
STNH3UCJD

GUREA
GUREAFF

FUCOBDMODE t21 t22 t23 t24 t25 t26

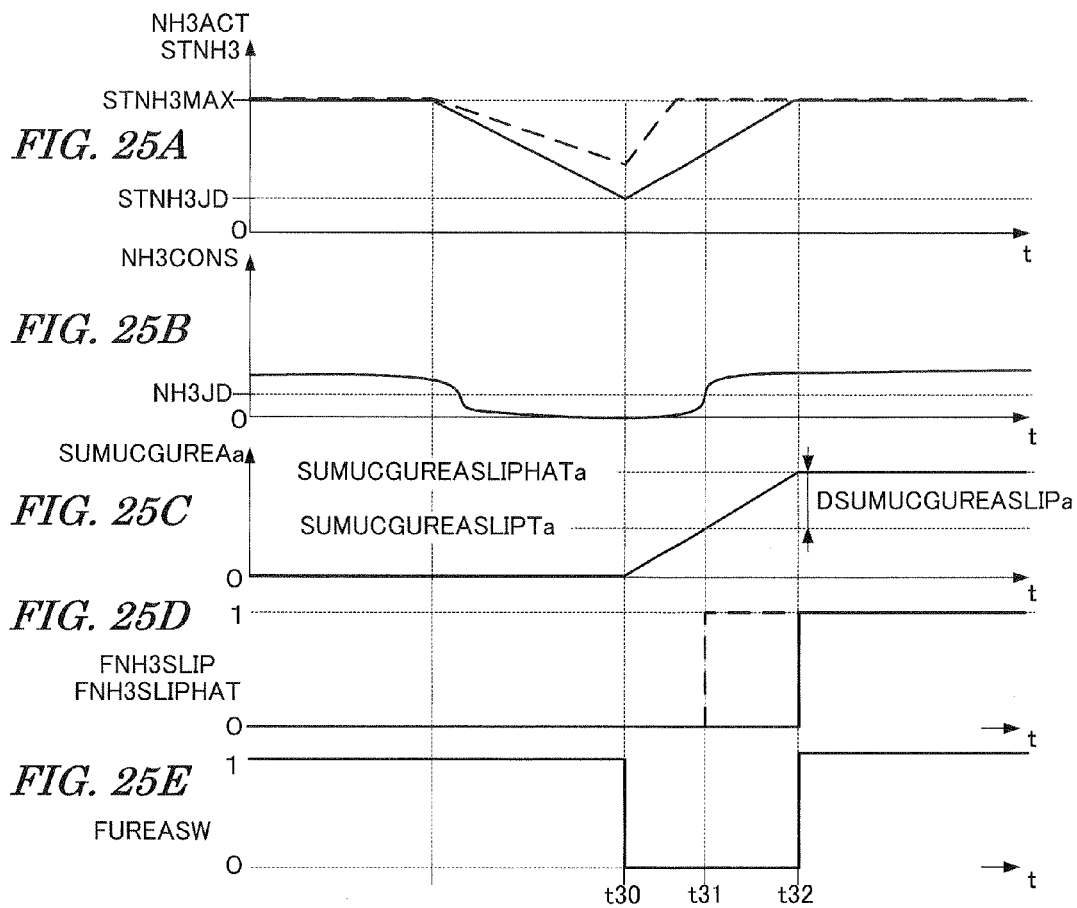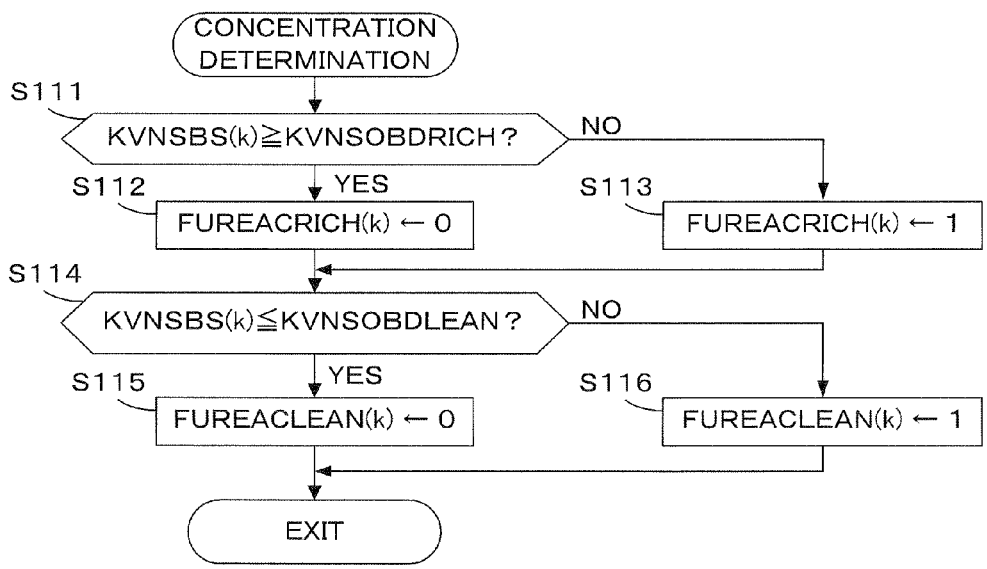

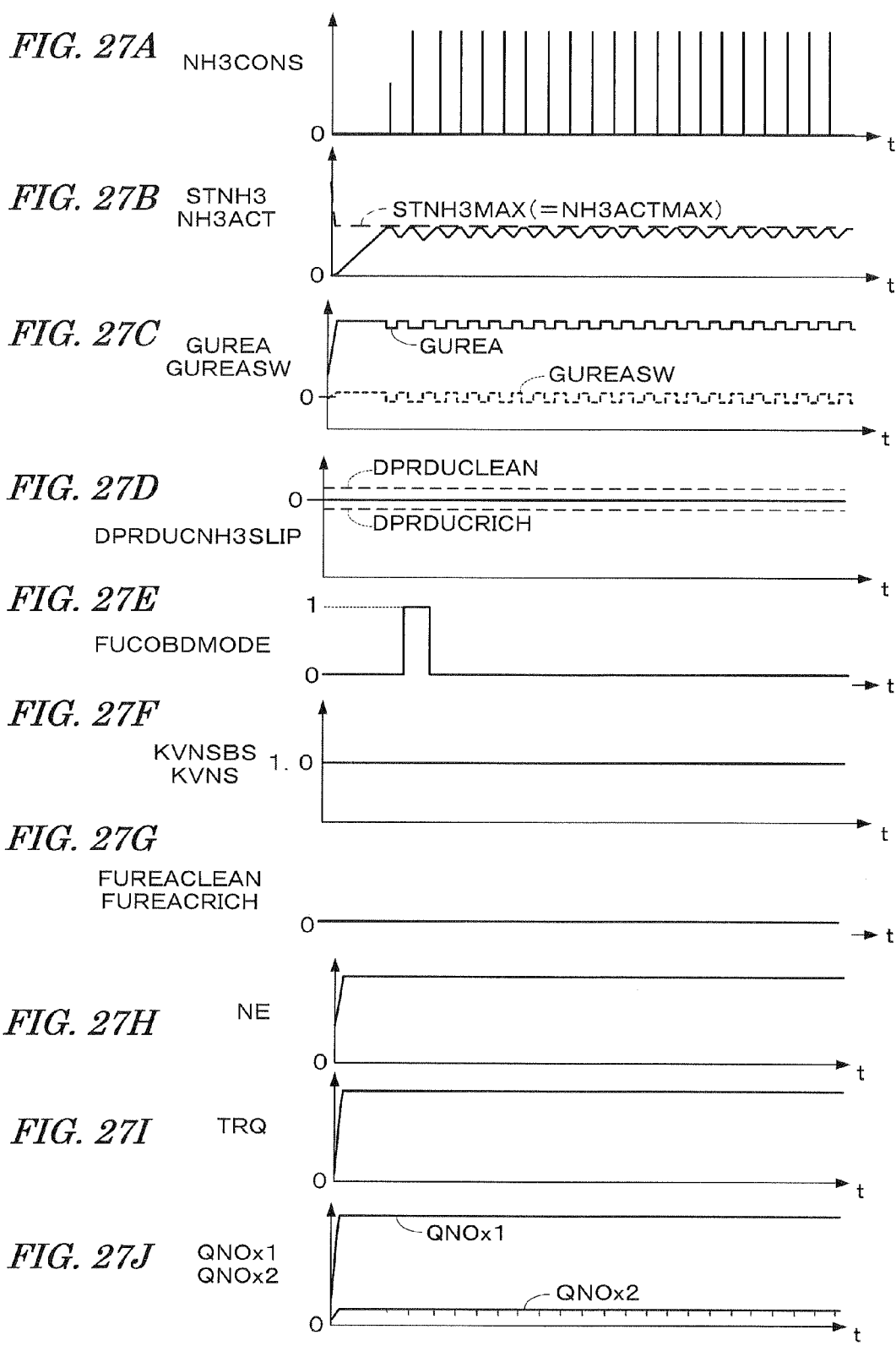

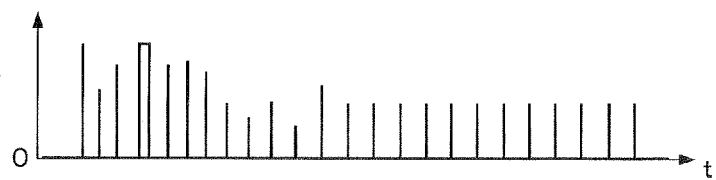
FIG. 28A  NH3CONS
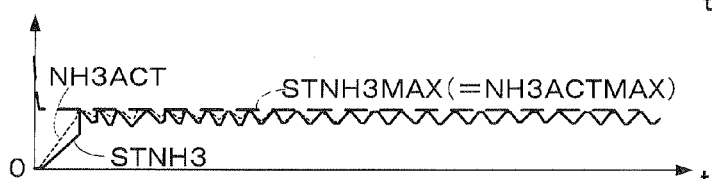
FIG. 28B  STNH3 NH3ACT
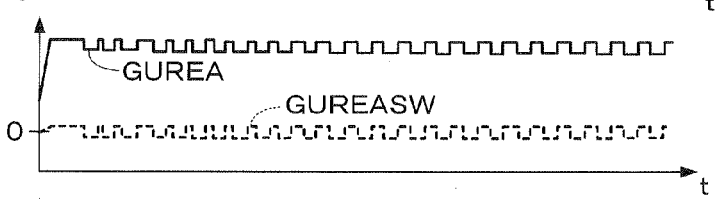
FIG. 28C  GUREA GUREASW
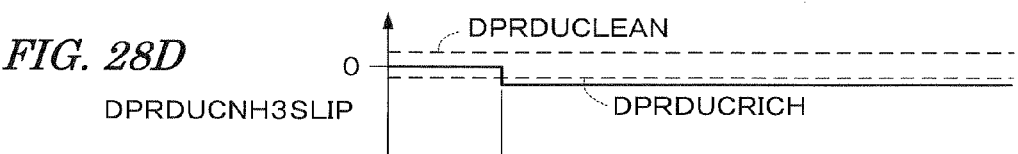
FIG. 28D  DPRDUCNH3SLIP
FIG. 28E  FUCOBDMODE
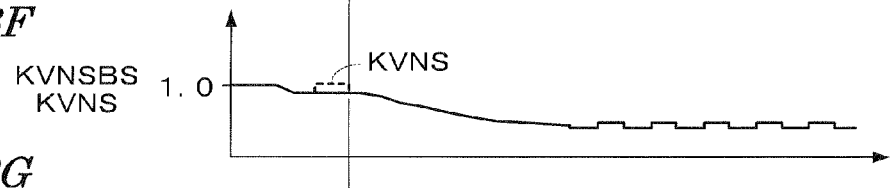
FIG. 28F  KVNSBS KVNS
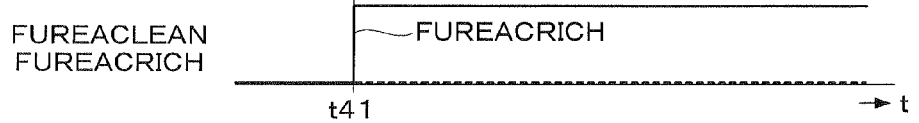
FIG. 28G  FUREACLEAN FUREACRICH

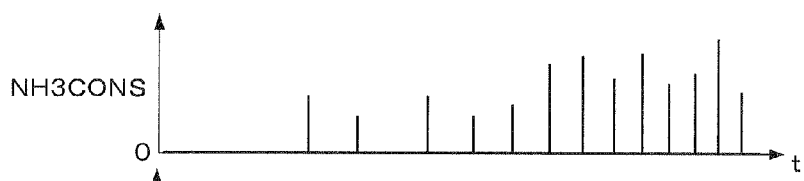
FIG. 29A NH3CONS
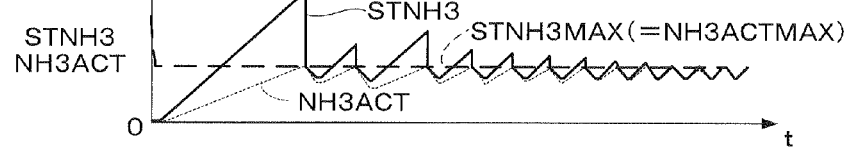
FIG. 29B STNH3 NH3ACT
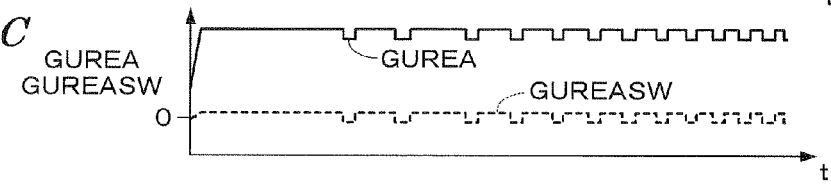
FIG. 29C GUREA GUREASW
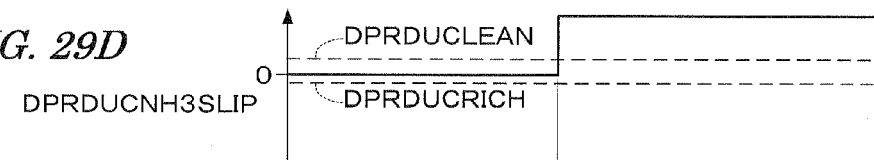
FIG. 29D DPRDUCNH3SLIP
FIG. 29E FUCOBDMODE
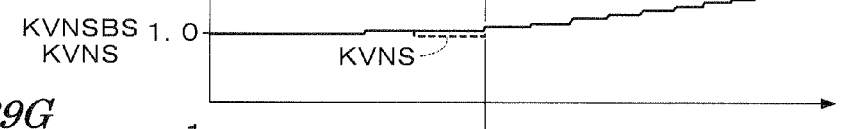
FIG. 29F KVNSBS KVNS
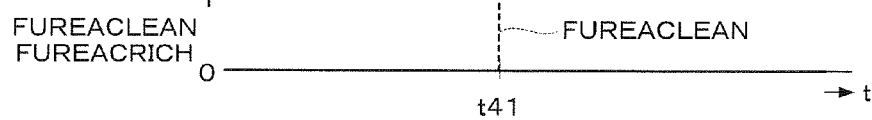
FIG. 29G FUREACLEAN FUREACRICH FIG. 30A NH3CONS
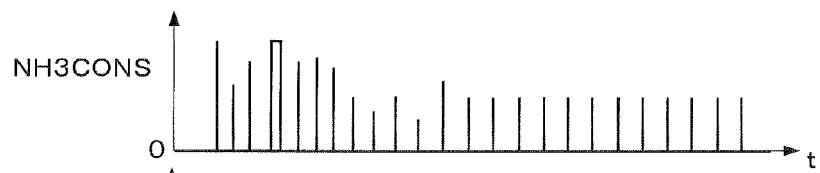
FIG. 30B STNH3 NH3ACT
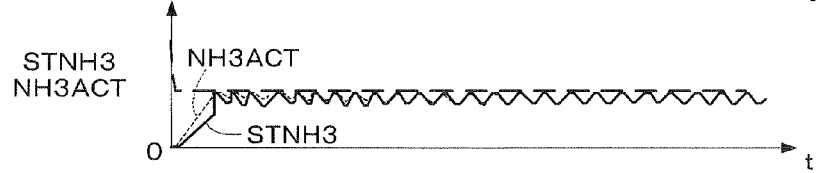
FIG. 30C GUREA GUREASW
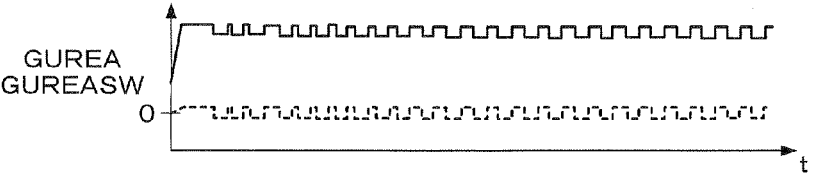
FIG. 30D DPRDUCNH3SLIP
FIG. 30E FUCOBDMODE
FIG. 30F KVNSBS KVNS
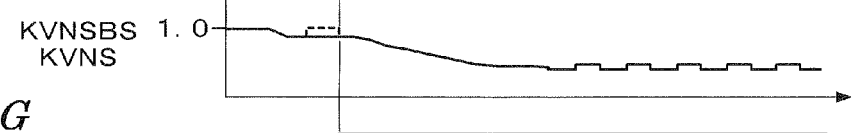
FIG. 30G FUREACLEAN FUREACRICH
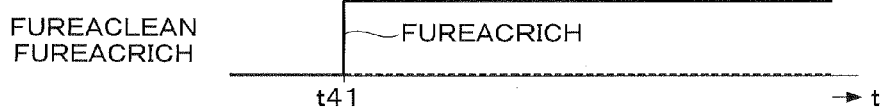

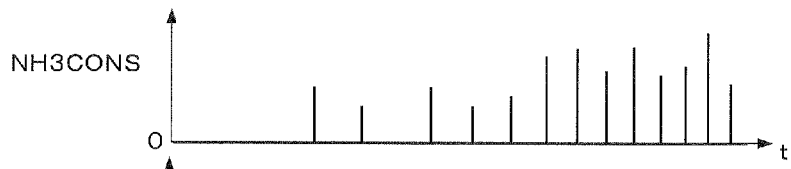
FIG. 31A  NH3CONS
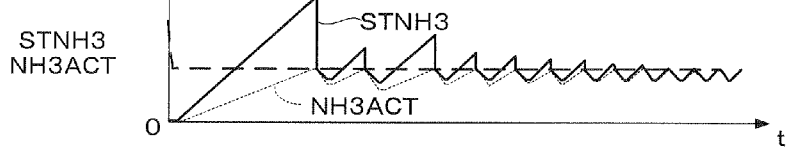
FIG. 31B  STNH3 NH3ACT
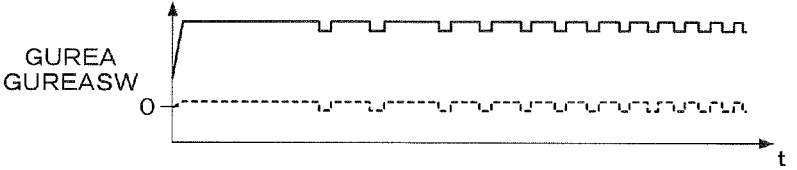
FIG. 31C  GUREA GUREASW
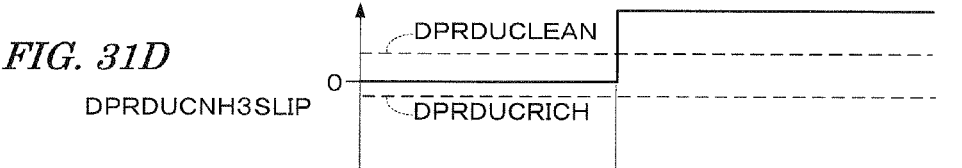
FIG. 31D  DPRDUCNH3SLIP
FIG. 31E  FUCOBDMODE
FIG. 31F  KVNSBS KVNS
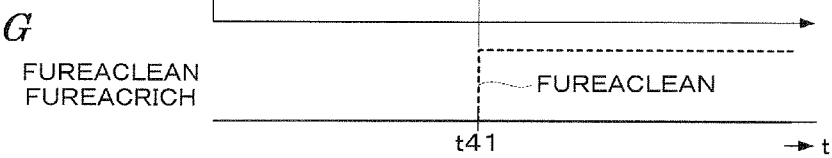
FIG. 31G  FUREACLEAN FUREACRICH

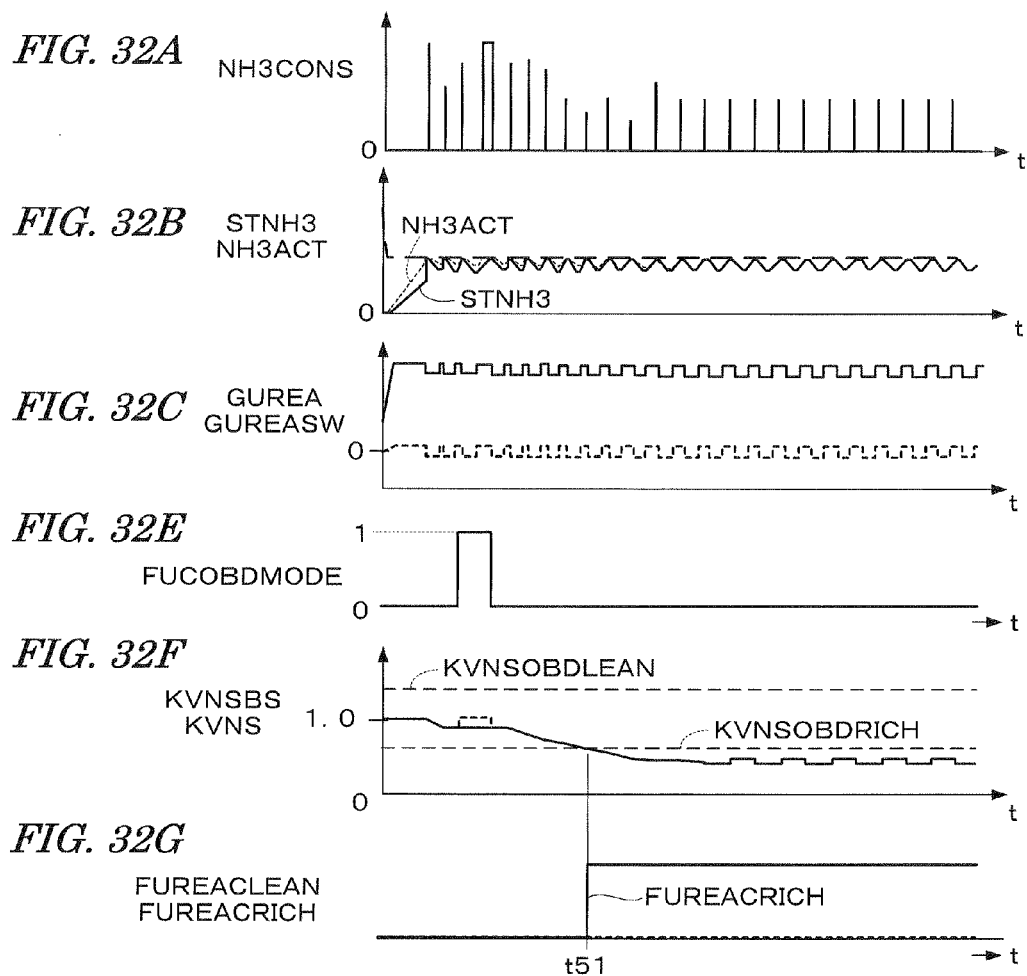

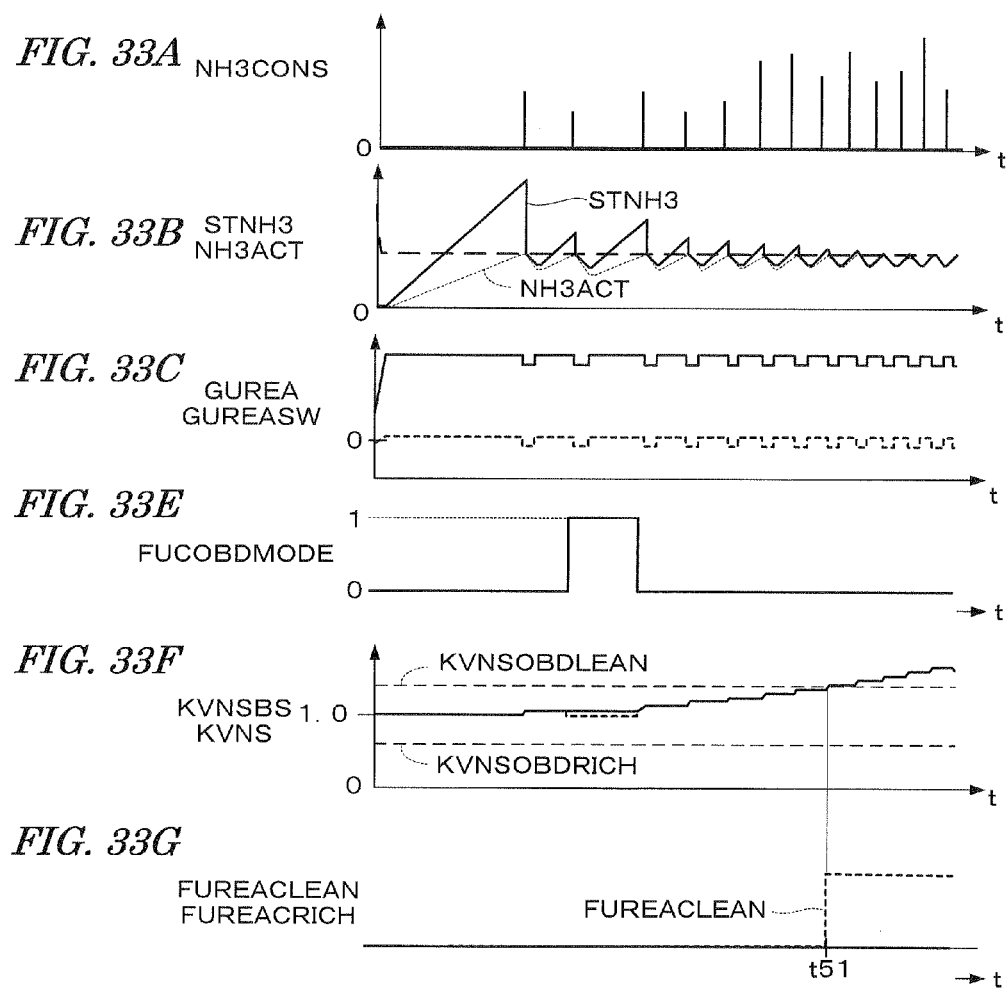

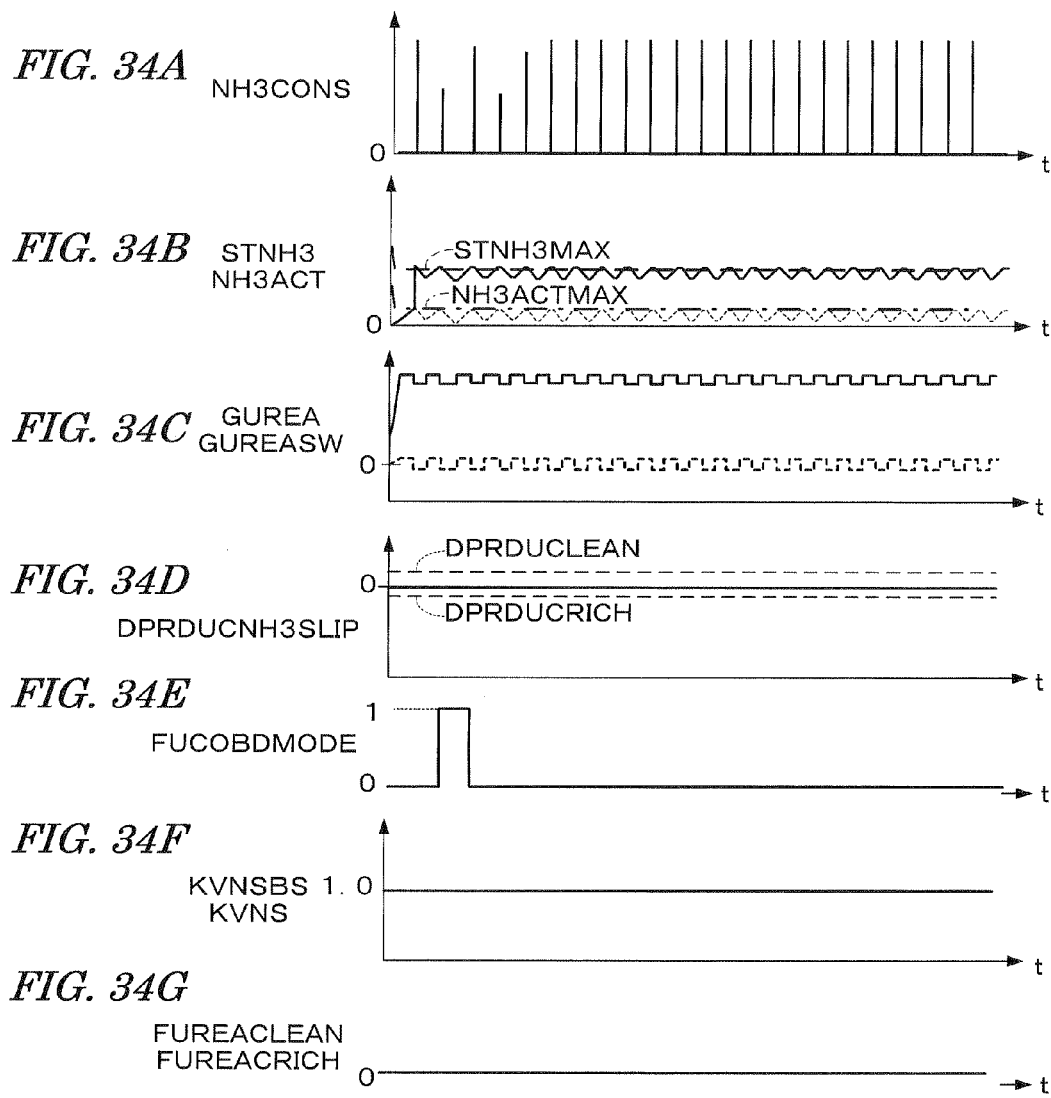

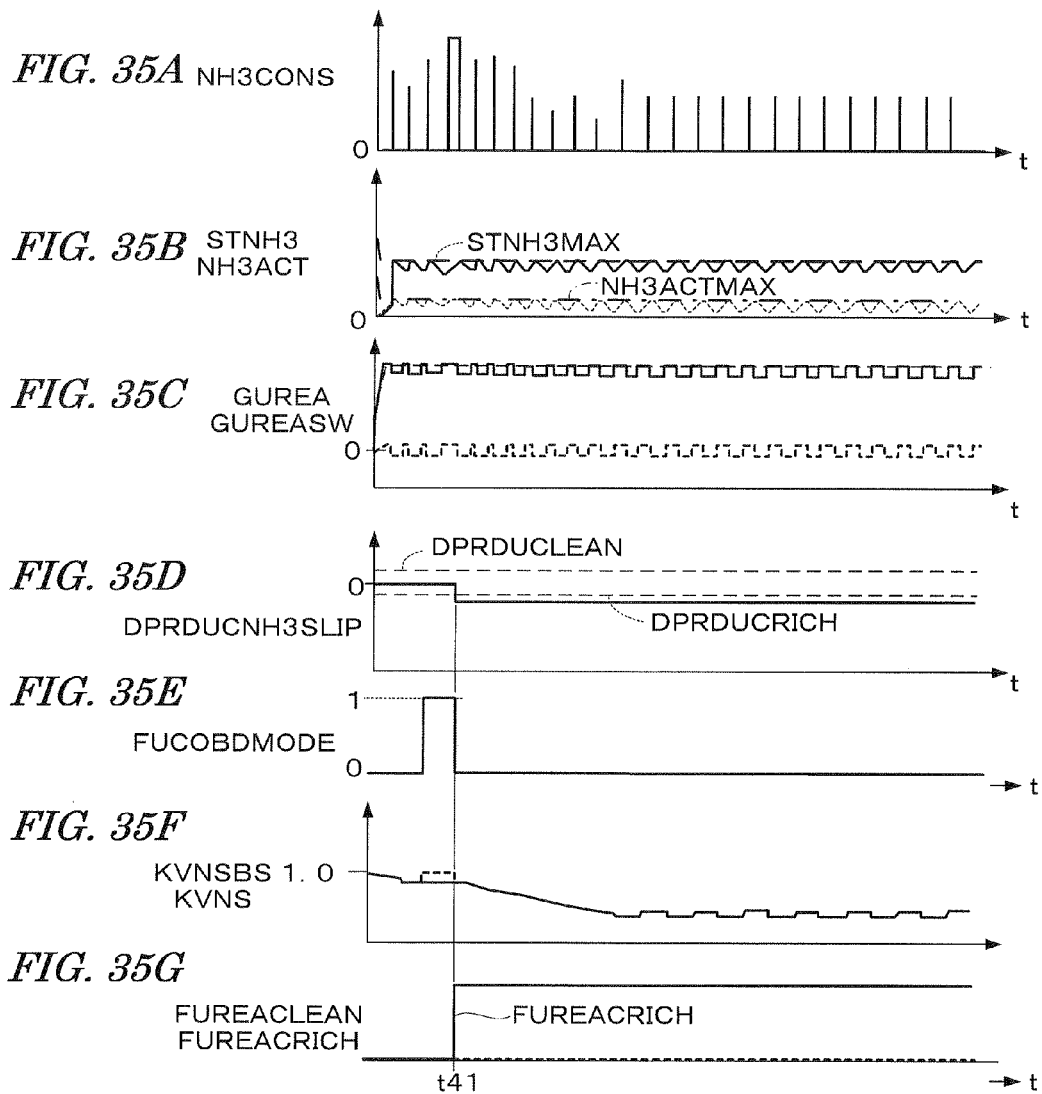

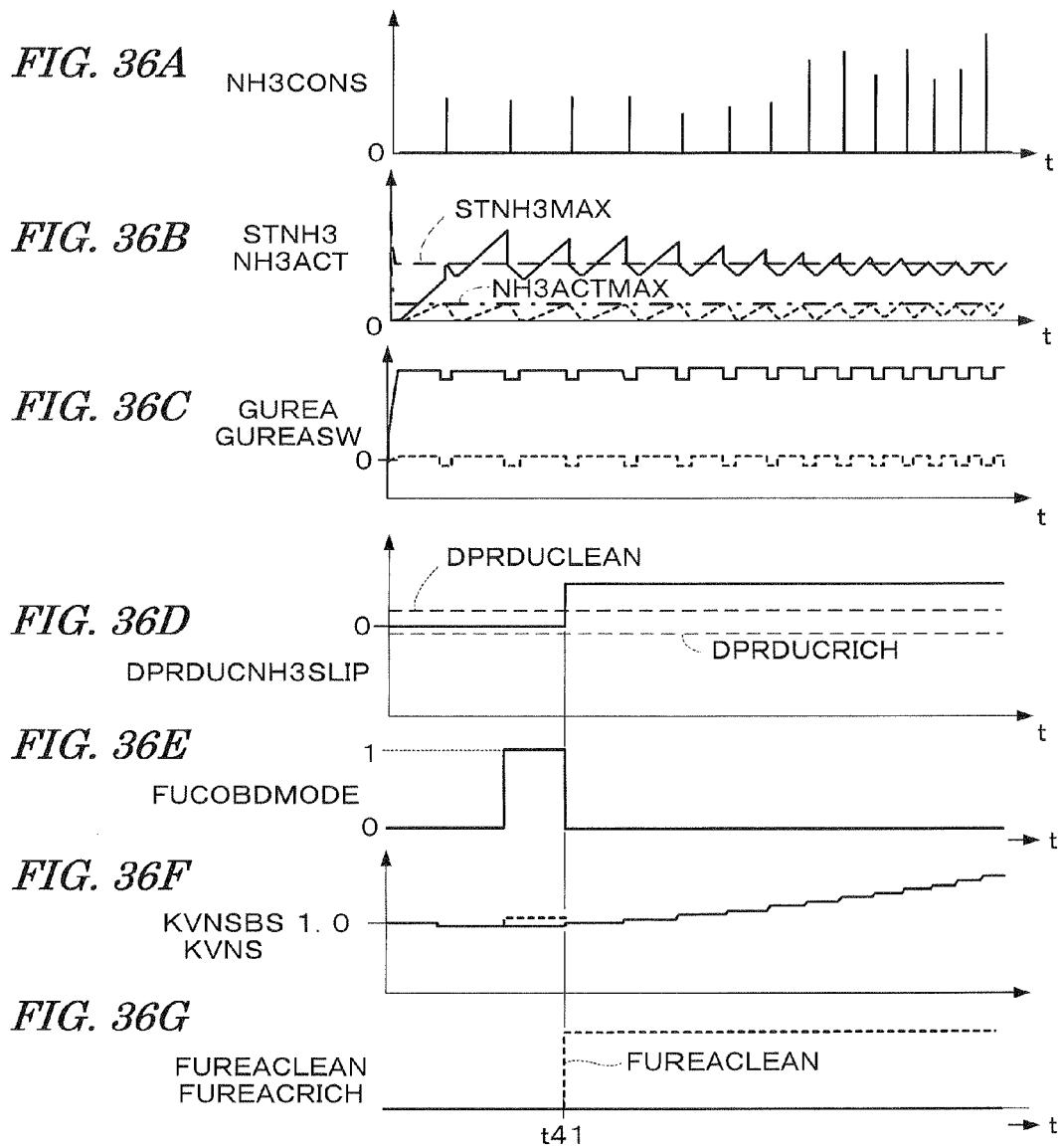

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly to an apparatus having a selective reduction catalyst which reduces NOx in exhaust gases under existence of a reducing agent.

2. Description of the Related Art

The NOx removing device for removing NOx in the exhaust gases using the selective reduction catalyst is shown, for example, in Japanese Patent Laid-open No. 2009-209765 (JP-'765). This NOx removing device is provided with the selective reduction catalyst and an aqueous urea solution (hereinafter referred to as "urea solution") supply device for supplying urea solution as a reactant for generating a reducing agent, to the upstream side of the selective reduction catalyst. According to this device, a reducing agent supply amount is controlled by controlling an amount of the urea solution supplied to the selective reduction catalyst.

Even if an amount of the urea solution is maintained at a constant value, a suitable supply amount of the reducing agent changes corresponding to a change in the urea concentration of the urea solution. Therefore, it is necessary to monitor the urea concentration. Japanese Patent Laid-open No. 2007-163177 (JP-'177) and Japanese Patent Laid-open No. 2005-337969 (JP-'969) disclose techniques in which a sensor (urea concentration sensor) for detecting an urea concentration is provided in an urea solution tank which stores the urea solution.

Further, JP-'765 shows a method for estimating the urea concentration according to the freezing point of the urea solution without using an urea concentration sensor. Specifically, the urea solution which is frozen by reducing a temperature of the urea solution in the tank and the freezing point of the urea solution is measured by detecting a temperature at which the frozen urea solution melts.

Further, Japanese Patent Laid-open No. 2008-546968 (JP-'968) shows an exhaust gas purifying apparatus in which ammonia gas is supplied to the selective reduction catalyst as a reducing agent. According to this apparatus, the ammonia gas supply amount is controlled so that a ratio of ammonia to NOx becomes optimal with suppressing an outflow of ammonia to the downstream side of the selective reduction catalyst.

As shown in JP-'177 and JP-'969, the apparatus using the urea concentration sensor invites a cost increase and an increase in weight and size. Further, the urea solution in the tank vibrates when the vehicle runs and air bubbles may be generated by the vibration. Therefore, detection accuracy of the urea concentration may deteriorate due to the vibration and the generation of air bubbles.

Further, the method shown in JP-'765 has a problem described below. FIG. 41 shows a relationship between the freezing point TSOL and the urea concentration CUR. As apparent from FIG. 41, it is correctly detectable that the urea concentration CUR is equal to the normal concentration CUR0 (32.5%) (TSOL=TSOL0). However, when the freezing point TSOL, for example, is equal to TSOL1, the urea concentration CUR may be equal to the concentration CUR1H higher than the normal concentration CUR0 or to the concentration CUR1L lower than the normal concentration CUR0. Therefore, it cannot be determined which is the correct urea concentration. In general, it is considered that the urea concentration CUR changes in the decreasing direction.

However, there may be a case where the urea concentration changes in the increasing direction depending on the using condition, or a case where the urea solution outside the standard is used. Accordingly, the urea concentration may incorrectly be determined by the method shown in JP-'765.

If the deterioration in the detection accuracy of the urea concentration or the incorrect determination occurs as described above, there is a possibility that the control accuracy of the urea solution supply amount may deteriorate or an unnecessary fail-safe action may be performed.

Further, according to the apparatus shown in JP-'968, an ammonia gas flow rate is detected by a flow rate sensor, and a flow rate control valve is controlled so that the detected ammonia gas flow rate coincides with a command value. Therefore, the control accuracy of the ammonia supply amount may possibly deteriorate due to the characteristic variations or aging changes in the flow rate sensor or the flow rate control valve.

SUMMARY OF THE INVENTION

The present invention was made contemplating the above-described points, and an objective of the present invention is to provide an exhaust gas purifying apparatus for removing NOx using the selective reduction catalyst, which can accurately determine the deterioration in the reducing agent supply accuracy due to changes in the concentration of the reducing agent contained in the reactant for generating the reducing agent or characteristic changes in the reducing agent supply device, with a comparatively simple configuration.

The present invention provides an exhaust gas purifying apparatus for an internal combustion engine including a selective reduction catalyst (3), reducing-agent supply means, reducing-agent slip determining means, storage amount changing means, and accuracy determining means. The selective reduction catalyst (3) is disposed in an exhaust passage (2) of the engine, and reduces NOx in exhaust gases from the engine under existence of a reducing agent (urea, ammonia). The reducing-agent supply means supplies the reducing agent (ammonia) or a reactant (urea solution) for generating the reducing agent (urea, ammonia) to the upstream side of the selective reduction catalyst (3). The reducing-agent slip determining means determines occurrence of a reducing-agent slip in which the reducing agent is discharged to the downstream side of the selective reduction catalyst. The storage amount changing means temporarily decreases a storage amount (NH3ACT) indicative of an amount of the reducing agent stored in the selective reduction catalyst (3), from the state where the storage amount (NH3ACT) is at the maximum, and thereafter increasing the storage amount (NH3ACT) until the occurrence of the reducing-agent slip is detected. The accuracy determining means determines an accuracy of the reducing agent supply by the reducing agent supply means, according to an occurrence state of the reducing agent slip when the storage amount change means changes the storage amount (NH3ACT).

With this configuration, the storage amount indicative of an amount of the reducing agent stored in the selective reduction catalyst is decreased from the state in which the storage amount of the reducing agent is at the maximum, and thereafter the storage amount is increased until the occurrence of the reducing agent slip is detected. The accuracy of the reducing agent supply is determined according to the occurrence state of the reducing agent slip when the storage amount is changed. Therefore, deterioration of the reducing agent supply accuracy due to a change in the concentration of the reducing agent contained in the reactant for generating the reducing agent, or due to a change in the characteristic of the reducing agent supply device, can accurately be determined with a comparatively simple configuration.

Preferably, the storage amount changing means sets a decreasing amount (DSTUCJD) of the storage amount to a value which is less than a deteriorated storage capacity (NH3AMAXNG) indicative of a maximum storable amount of the reducing agent in a selective reduction catalyst which should be determined to be deteriorated.

With this configuration, the decreasing amount of the storage amount is set to a value less than the deteriorated storage capacity which is the maximum storable amount of the selective reduction catalyst which should be determined to be deteriorated. Therefore, the reducing agent supply accuracy can be determined without being influenced by the deterioration degree of the selective reduction catalyst.

Preferably, the accuracy determining means performs the determination based on a difference (DPRDUCHN3SLIP) between a time parameter (PRDUCHH3SLIP) and a determination reference value (PRDUCNH3SLIPHAT), the time parameter indicating a time period from the time the decreasing of the storage amount is started to the time the reducing agent slip occurs.

With this configuration, the reducing agent supply accuracy is determined based on the difference between the time parameter, which indicates the time period from the time the decreasing of the storage amount is started to the time the reducing agent slip occurs, and the determination reference value. The time parameter decreases as the concentration of the reducing agent increases, i.e., the reducing agent supply amount per unit time increases. Accordingly, the reducing agent supply accuracy can be determined based on the difference between the time parameter and the determination reference value. In addition, by setting the determination reference value according to the engine operating condition, for example, the engine load, the catalyst temperature, or the like, the determination can accurately be performed regardless of the engine operating condition in which the reducing agent supply accuracy determination is performed.

Alternatively, the accuracy determining means performs the determination based on a difference (DPRDUCHN3SLIPa) between a time parameter (PRDUCHH3SLIPa) and a determination reference value (PRDUCNH3SLIPHATa), the time parameter indicating a time period from the time the increasing of the storage amount is started to the time the reducing agent slip occurs.

With this configuration, the reducing agent supply accuracy is determined based on the difference between the time parameter, which indicates the time period from the time the increasing of the storage amount is started to the time the reducing agent slip occurs, and the determination reference value. The time parameter indicative of the time period from the time of starting the increase in the storage amount to the time of the reducing agent slip occurrence, can be used to similarly determine the reducing agent supply accuracy.

Alternatively, the accuracy determining means performs the determination based on a difference (DSUMUCGUREA-SLIP) between a change amount parameter (SU-MUCGUREASLIP) and a determination reference value (SUMUCGUREASLIPHAT). The change amount parameter (SUMUCGUREASLIP) indicates a change amount of the storage amount from the time the decreasing of the storage amount is started to the time the reducing agent slip occurs.

With this configuration, the reducing agent supply accuracy is determined based on the difference between the change amount parameter, which indicates the change amount of the storage amount from the time the decreasing of the storage amount is started to the time the reducing agent slip occurs, and the determination reference value. The change amount parameter decreases as the concentration of the reducing agent increases, i.e., the reducing agent supply amount per unit time increases. Accordingly, the reducing agent supply accuracy can be determined based on the difference between the change amount parameter and the determination reference value. In addition, by setting the determination reference value according to the engine operating condition, for example, the engine load, the catalyst temperature, or the like, the determination can accurately be performed regardless of the engine operating condition in which the reducing agent supply accuracy determination is performed.

Alternatively, the accuracy determining means performs the determination based on a difference (DSUMUCGUREA-SLIPa) between a change amount parameter (SU-MUCGUREASLIPa) and a determination reference value (SUMUCGUREASLIPHATa). The change amount parameter (SUMUCGUREASLIPa) indicates a change amount of the storage amount from the time the increasing of the storage amount is started to the time the reducing agent slip occurs.

With this configuration, the reducing agent supply accuracy is determined based on the difference between the change amount parameter indicative of the change amount of the storage amount from the time the increasing of the storage amount is started to the time the reducing agent slip occurs, and the determination reference value. The change amount parameter indicative of the change amount of the storage amount from the time of starting the increase in the storage amount to the time of the reducing agent slip occurrence, can be used to similarly determine the reducing agent supply accuracy.

Preferably, the exhaust gas purifying further includes storage amount estimating means for calculating an estimated value (STNH3) of the storage amount according to an operating condition of the engine, wherein the determination reference value is calculated based on the estimated value of the storage amount.

With this configuration, the estimated value of the storage amount is calculated according to the engine operating condition, and the determination reference value is calculated based on the estimated value of the storage amount. Accordingly, the reducing agent supply accuracy can accurately be determined regardless of the engine operating condition in which the reducing agent supply accuracy determination is performed.

BRIEF DESCRIPTION OF THE DRAWINGS

FIG. 1 is a schematic diagram showing a configuration of an internal combustion engine and an exhaust gas purifying apparatus therefor according to one embodiment of the present invention;

FIGS. 2A-2C show time charts for illustrating an urea concentration determination method in this embodiment;

FIGS. 3A-3C show time charts for illustrating a problem when performing the urea concentration determination in a state where the selective reduction catalyst is deteriorated;

FIG. 4 shows relationships between a temperature (TSCR) of the selective reduction catalyst and a reducing agent storage capacity (NH3ACTMAX);

FIG. 6 shows a map for calculating a basic injection amount (GUREABS) of the urea solution;

FIGS. 7A and 7B show diagrams for illustrating a binarization of an ammonia concentration sensor output (NH3CONS);

FIG. 8 is a flowchart of a calculation process in the storage amount calculation block of FIG. 5;

FIGS. 25A-25E show time charts for illustrating the process of FIG. 24;

FIG. 26 is a flowchart of the calculation process (fifth concentration determination method) in the concentration determination block of FIG. 5;

FIGS. 27A-27J show time charts illustrating an operation example (normal concentration) to which the first concentration determination method is applied;

FIGS. 28A-28G show time charts illustrating an operation example (high concentration) to which the first concentration determination method is applied;

FIGS. 29A-29G show time charts illustrating an operation example (low concentration) to which the first concentration determination method is applied;

FIGS. 30A-30G show time charts illustrating an operation example (high concentration) to which the fourth concentration determination method is applied;

FIGS. 31A-31G show time charts illustrating an operation example (low concentration) to which the fourth concentration determination method is applied;

FIGS. 32A-32C and 32E-32G show time charts illustrating an operation example (high concentration) to which the fifth concentration determination method is applied;

FIGS. 33A-33C and 33E-33G show time charts illustrating an operation example (low concentration) to which the fifth concentration determination method is applied;

FIGS. 34A-34G show time charts illustrating an operation example (deteriorated SCR catalyst, normal concentration) to which the first concentration determination method is applied;

FIGS. 35A-35G show time charts illustrating an operation example (deteriorated SCR catalyst, high concentration) to which the first concentration determination method;

FIGS. 36A-36G show time charts illustrating an operation example (deteriorated SCR catalyst, low concentration) to which the first concentration determination method is applied;

DETAILED DESCRIPTION OF THE PREFERRED EMBODIMENTS

Figure 5:
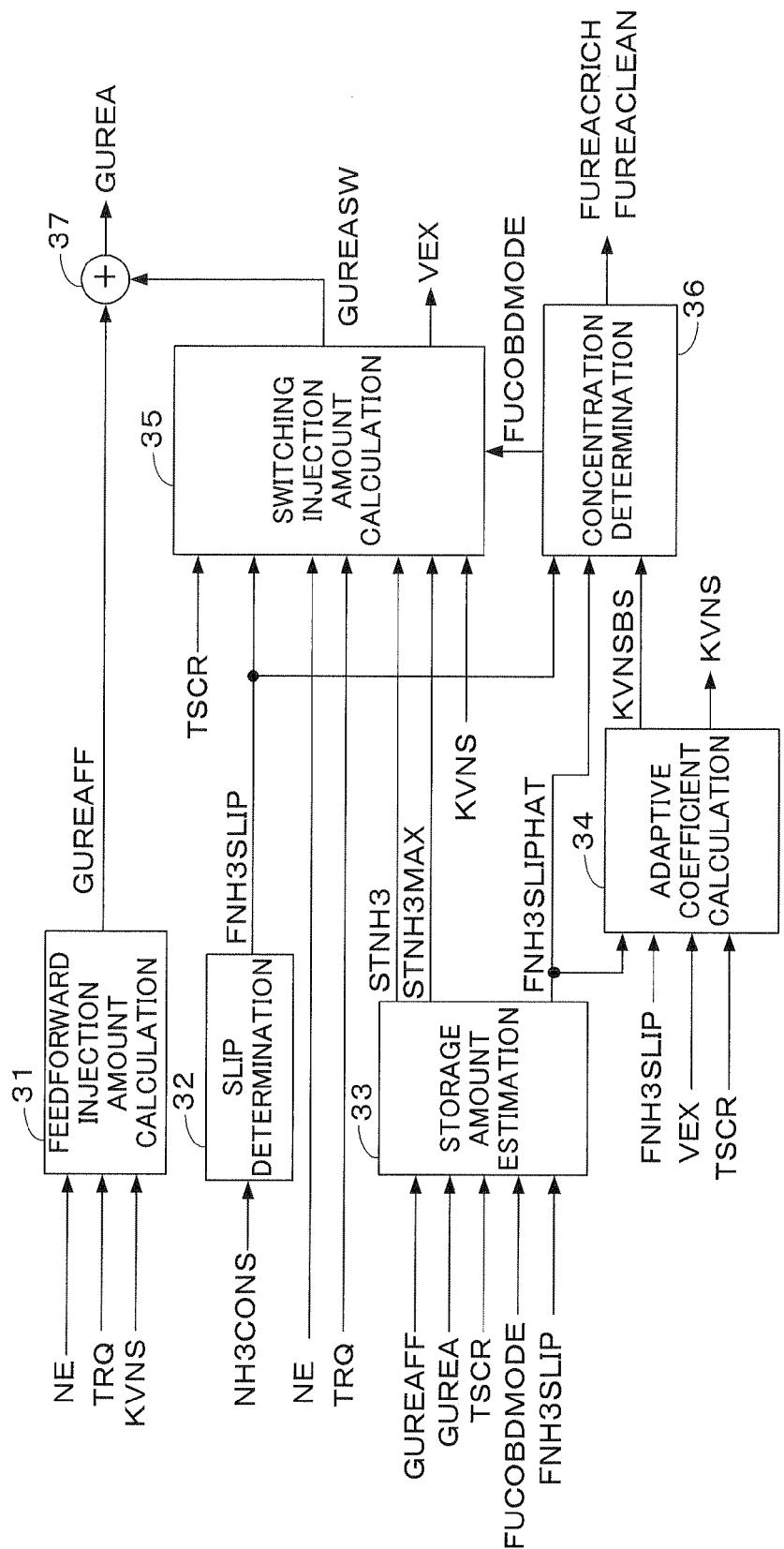
FIG. 5 is a block diagram showing a configuration of a module for controlling an urea solution injection amount (GUREA)

Preferred embodiments of the present invention will now be described with reference to the drawings.

FIG. 1 is a schematic diagram showing a configuration of an internal combustion engine and an exhaust gas purifying apparatus therefor according one embodiment of the present invention. The internal combustion engine 1 (hereinafter referred to as "engine") is a diesel (compression ignition type) engine wherein the lean-burn operation, in which the air-fuel ratio is set to a lean air-fuel ratio which is leaner than the stoichiometric ratio, is mainly performed. An exhaust passage 2 of the engine 1 is provided with an oxidation catalyst 8 for promoting oxidation of hydrocarbon and carbon monoxide in exhaust gases from the engine 1, and selective reduction catalysts (hereinafter referred to as "SCR catalyst") 3 and 4 for reducing NOx in the exhaust gases under existence of a reducing agent. The SCR catalysts 3 and 4 are disposed downstream of the oxidation catalyst 8.

An urea solution injection valve 5 for injecting urea solution is disposed upstream of the SCR catalyst 3, and an operation of the urea solution injection valve 5 is controlled by the electronic control unit 10 (hereinafter referred to as "ECU"). The urea solution injection valve 5 is connected to an urea solution tank 12 through a passage 11. When a valve opening command signal is supplied from the ECU 10, the urea solution injection valve 5 opens to inject the urea solution into the exhaust passage 2 by an amount (injection amount) depending on the valve opening period.

The SCR catalyst 3 is configured to be able to store urea and ammonia ($NH_3$, hereinafter indicated as "NH3") generated from the urea. Urea and ammonia act as the reducing agent. It is to be noted that, in the following description, an amount of the reducing agent stored in the SCR catalyst 3 is referred to as "storage amount" and the maximum storage amount that the SCR catalyst 3 can store is referred to as "storage capacity".

The SCR catalyst 3 is provided with a SCR catalyst temperature sensor 6 for detecting a temperature TSCR of the SCR catalyst 3 (hereinafter referred to as "SCR catalyst temperature"). An ammonia concentration sensor 7 (hereinafter referred to as "NH3sensor") for detecting an ammonia concentration NH3CONS in the exhaust gases is disposed between the SCR catalyst 3 and the SCR catalyst 4. The detection signals from these sensors are supplied to the ECU 10.

An engine rotational speed sensor 21 for detecting a rotational speed NE of the engine 1 and an accelerator sensor 22 for detecting a depression amount AP of the accelerator pedal of the vehicle driven by the engine 1 (this depression amount will be hereinafter referred to as "accelerator operation amount") are connected to the ECU 10. The detection signals of these sensors are supplied to the ECU 10.

The ECU 10 includes an input circuit, a central processing unit (hereinafter referred to as "CPU"), a memory circuit, and an output circuit. The input circuit performed various functions, including shaping the waveforms of input signals from above-described sensors and other sensors (not shown), correcting the voltage levels of the input signals to a predetermined level, and converting analog signal values into digital signal values. The memory circuit preliminarily stores various operation programs to be executed by the CPU and stores the results of computation or the like by the CPU. The output circuit supplies drive signals to the urea solution injection valve 5 and the fuel injection valves (not shown).

The ECU 10 performs a fuel injection control through the fuel injection valve according to an engine operating condition and an urea solution injection control for supplying an appropriate amount of urea to the SCR catalyst 3. Further, the ECU 10 determines the urea concentration CUR in the urea solution. When the ECU 10 determines that the urea concentration CUR is outside the acceptable range, a warning lamp is turned on. Further, in the urea solution injection control, the urea solution injection amount is corrected according to the urea concentration determined by the ECU 10.

An outline of the determination method of the urea concentration in this embodiment is described below with reference to FIGS. 2A-2C, which respectively show changes in an estimated storage amount STNH3 which is an estimated value of the storage amount, an actual storage amount NH3ACT, and an output NH3CONS from the NH3 sensor 7. In FIGS. 2B and 2C, the dot-and-dash lines correspond to a state where the urea concentration CUR is equal to a normal concentration CUR0, the solid lines correspond to a state where the urea concentration CUR is higher than the normal concentration CUR0, and the broken lines correspond to a state where the urea concentration CUR is lower than the normal concentration CUR0.

When the storage amount NH3ACT increases to reach the storage capacity NH3ACTMAX, an NH3-slip, in which NH3 flows out to the downstream side of the SCR catalyst 3, occurs. Therefore, in this embodiment, it is determined that the NH3-slip has occurred, when the NH3 sensor output NH3CONS exceeds a predetermined threshold value NH3JD (FIG. 2C, time t3, t4, and t5).

In this embodiment, the storage amount NH3ACT is gradually decreased from the state where the storage amount NH3ACT is equal to the storage capacity NH3ACTMAX, and thereafter, the storage amount NH3ACT is gradually increased. This operation is performed by changing the urea solution injection amount GUREA. The urea concentration CUR is determined according to a time period PRDUCNH3SLIP from a start time t1 of decreasing the storage amount NH3ACT to time t3, t4, or t5 at which the NH3-slip is detected (this time period is hereinafter referred to as "NH3-slip detection time period").

The NH3-slip detection time period PRDUCNH3SLIP becomes shorter (T3<T4<T5) as the urea concentration CUR becomes higher. Therefore, the urea concentration CUR can be detected.

In this determination method, the estimated storage amount STNH3 is calculated on the assumption that the urea concentration CUR is equal to the normal concentration CUR0. An estimated NH3-slip detection time period PRDUCNH3SLIPHAT is calculated from the start time t1 of decreasing the storage amount and an estimated slip occurrence time tSLIPHAT at which the estimated storage amount STNH3 reaches an estimated storage capacity STNH3MAX. The calculated estimated NH3-slip detection time period PRDUCNH3SLIPHAT is used as a determination reference value. The urea concentration CUR is determined based on a difference DPRDUCNH3SLIP between the determination reference value and the detected NH3-slip detection time period PRDUCNH3SLIP (this difference is hereinafter referred to as "urea concentration determination value"). The urea concentration determination value DPRUCNH3SLIP is calculated by the following equation (1).

$$DPRDUCNH3SLIP=PRDUCNH3SLIP-PRDUCNH3SLIPHAT \qquad (1)$$

The urea concentration determination value DPRUCNH3SLIP defined by the equation (1) takes a value in the vicinity of "0" when the urea concentration CUR is equal to the normal concentration CUR0, and decreases as the urea concentration CUR becomes higher. That is, the urea concentration determination value DPRUCNH3SLIP takes a negative value when the urea concentration CUR is higher than the normal concentration CUR0, and takes a positive value when the urea concentration CUR is lower than the normal concentration CUR0.

When the urea concentration determination value DPRUCNH3SLIP is less than a high concentration determination threshold value DPRDUCRICH corresponding to the upper limit value of the acceptable range of the urea concentration CUR, or is greater than a low concentration determination threshold value DPRDUCLEAN corresponding to the lower limit value of the acceptable range, the warning lamp is turned on.

When the storage decreasing amount DSTUCJD shown in FIG. 2A is set to a vale greater than a storage capacity NH3AMAXNG of the selective reduction catalyst which should be determined to be deteriorated (hereinafter referred to as "deteriorated SCR catalyst"), a problem occurs that the urea concentration cannot accurately be determined. The storage capacity NH3AMAXNG is hereinafter referred to as "deteriorated storage capacity".

That is, if the above-described urea concentration determination is performed when using the deteriorated SCR catalyst, an amount of NH3 (urea) stored in the deteriorated SCR catalyst reaches "0" while decreasing the storage amount. Accordingly, the NOx removing rate greatly decreases, and the occurrence time of the NH3-slip becomes earlier compared with the normal SCR catalyst. Therefore, the urea concentration cannot accurately be determined.

FIGS. 3A-3C show time charts for illustrating this problem. The time charts of FIGS. 3A-3C, like FIGS. 2A-2C, show changes in the estimated storage amount STNH3, the actual NH3 storage amount NH3ACT, and the NH3 sensor output NH3CONS. In FIGS. 3A-3C, the broken lines correspond to an example in which the storage decreasing amount DSTUCJD (=DST1) is less than the deteriorated storage capacity NH3AMAXNG, and the solid lines correspond to an example in which the storage decreasing amount DSTUCJD (=DST2) is greater than the deteriorated storage capacity NH3AMAXNG. Further, the dot-and-dash line in FIG. 3B shows imaginary changes when the SCR catalyst is normal.

In the example shown with the broken lines, the NH3-slip detection time period PRDUCNH3SLIP is detected as a time period T13, similarly to the example shown in FIG. 2 (NH3-slip is detected at time t13). On the other hand, in the example shown with the solid lines, the actual storage amount NH3ACT becomes "0" at time t11. Therefore, the NH3-slip is detected at time t12, and the NH3-slip detection time period PRDUCNH3SLIP is detected as the time period T12. Accordingly, the urea concentration is erroneously determined to be higher than the actual concentration.

Therefore, in this embodiment, the storage decreasing amount DSTUCJD is set to a value less than the deteriorated storage capacity NH3AMAXNG which is a storage capacity of the deterioration SCR catalyst. Such setting of the storage decreasing amount DSTUCJD can prevent the problem as indicated by the solid lines in FIGS. 3A-3C.

FIG. 4 shows relationships between the SCR catalyst temperature TSCR and the actual storage capacity NH3ACTMAX. The solid lines L1 to L3 respectively correspond to a fresh SCR catalyst, a normal SCR catalyst, and the deteriorated SCR catalyst. Further, the broken line L4 indicates a setting of the storage decreasing amount DSTUCJD, and is set to a value slightly less than the actual storage capacity of the deteriorated SCR catalyst (solid line L3). It is to be noted that TSCRJDL and TSCRJDH shown in FIG. 4 are respectively a lower limit temperature and a higher limit temperature of the SCR catalyst temperature range RTSCRJD where the urea concentration determination is performed. The lower limit temperature TSCRJDL and the higher limit temperature TSCRJDH are set, for example, to 200 degrees centigrade and 350 degrees centigrade, respectively.

FIG. 5 is a block diagram showing a configuration of a urea solution injection control module. The function of each block shown in FIG. 5 is realized by the calculation process of the CPU in the ECU 10.

The urea solution injection control module shown in FIG. 5 includes a feedforward injection amount calculation block 31, a slip determination block 32, a storage amount estimation block 33, an adaptive coefficient calculation block 34, a switching injection amount calculation block 35, a concentration determination block 36, and an adding block 37.

The feedforward injection amount calculation block 31 calculates a feedforward injection amount GUREAFF according to the engine rotational speed NE, an engine load (demand torque) TRQ, and an adaptive coefficient KVNS. The engine load TRQ is calculated according to the accelerator operation amount AP, and is set so as to increase as the accelerator operation amount AP increases. The adaptive coefficient KVNS is an injection amount correction coefficient which is calculated in the adaptive coefficient calculation block 34 according to the occurrence state of the NH3-slip, and takes less value as the urea concentration in the urea solution becomes higher.

Specifically, a GUREABS map shown in FIG. 6 is retrieved according to the engine rotational speed NE and the engine load TRQ, to calculate a basic injection amount GUREABS. Three curves shown in FIG. 6 respectively correspond to predetermined engine loads TRQ1, TRQ2, and TRQ3. The relationship of "TRQ1<TRQ2<TRQ3" is satisfied. Therefore, the basic injection amount GUREABS is set so as to increase as the engine rotational speed NE increases, and set so as to increase as the engine load TRQ increases.

The feedforward injection amount calculation block 31 further calculates the feedforward injection amount GUREAFF by applying the basic injection amount GUREABS and the adaptive coefficient KVNS to the following equation (2). In the equation (2), "k" is a discrete time digitized with a control period DTMUCOBD of the urea solution injection control executed by the CPU in the ECU 10. "(k)" indicates that the parameter with "(k)" is a present value, and is normally omitted in this description.

$$GUREAFF(k)=KVNS(k)\times GUREABS(k) \qquad (2)$$

The slip determination block 32 binarizes the NH3 sensor output NH3CONS. That is, the slip determination block 32 compares the NH3 sensor output NH3CONS with a predetermined threshold value NH3JD and sets a slip flag FNH3SLIP to "1" when the NH3sensor output NH3CONS is equal to or greater than the predetermined threshold value NH3JD. The slip flag FNH3SLIP is set to "0" when the NH3 sensor output NH3CONS is less than the predetermined threshold value NH3JD.

FIG. 7 is a diagram for illustrating this binarization process. FIG. 7A shows the slip flag FNH3SLIP obtained by the binarization. FIG. 7B shows a relationship between the actual ammonia concentration NH3CONACT in the exhaust gases and the sensor output NH3CONS. The solid line indicates an average characteristic and two broken lines show characteristics of different inclinations due to characteristic variation or aging.

By performing the binarization using the predetermined threshold value NH3JD, i.e., by setting the slip flag FNH3SLIP, which indicates whether ammonia exists or not, to "1" or "0" using the predetermined threshold value NH3JD, the influence of characteristic variation or aging can be minimized.

The storage amount estimation block 33 calculates the estimated storage amount STNH3 and the estimated storage capacity STNH3MAX according to the feedforward injection amount GUREAFF, the urea solution injection amount GUREA (output from the adding block 37), the SCR catalyst temperature TSCR, the adaptive coefficient KVNS, a concentration determination mode flag FUCOBDMODE (set in the concentration determination block 36), and the slip flag FNH3SLIP. Further, the storage amount estimation block 33 sets an estimated slip flag FNH3SLIPHAT according to the estimated storage amount STNH3 and the estimated storage capacity STNH3MAX.

The adaptive coefficient calculation block 34 calculates a basic adaptive coefficient KVNSBS and the adaptive coefficient KVNS according to an estimated exhaust volume flow rate VEX (calculated in the switching injection amount calculation block 35), the SCR catalyst temperature TSCR, the slip flag FNH3SLIP, and the estimated slip flag FNH3SLIPHAT. The basic adaptive coefficient KVNSBS is calculated according to the occurrence state of the NH3-slip. When performing the urea concentration determination, the adaptive coefficient KVNS is set to "1.0" and otherwise (when performing the normal control) set to the basic adaptive coefficient KVNSBS.

The switching injection amount calculation block 35 calculates the estimated exhaust volume flow rate VEX according to the engine rotational speed NE and the engine load TRQ, and further calculates a switching injection amount GUREASW according to the SCR catalyst temperature TSCR, the slip flag FNH3SLIP, the estimated storage amount STNH3, the estimated storage capacity STNH3MAX, the adaptive coefficient KVNS, and the concentration determination mode flag FUCOBDMODE.

The concentration determination block 36 sets the concentration determination mode flag FUCOBDMODE and a high concentration abnormality flag FUREACRICH, and a low concentration abnormality flag FUREACLEAN according to the basic adaptive coefficient KVNSBS, the slip flag FNH3SLIP, and the estimated slip flag FNH3SLIPHAT. The concentration determination mode flag FUCOBDMODE is set to "1" when an execution condition of the concentration determination is satisfied. Further, the high concentration abnormality flag FUREACRICH is set to "1" when the urea concentration CUR is determined to be abnormally high. The low concentration abnormality flag FUREACLEAN is set to "1" when the urea concentration CUR is determined to be abnormally low.

The adding block 37, as indicated by the following equation (3), adds the feedforward injection amount GUREAFF and the switching injection amount GUREASW to calculate the urea solution injection amount GUREA.

$$GUREA(k)=GUREAFF(k)+GUREASW(k) \quad (3)$$

Next, the calculation processes of the storage amount estimation block 33, the adaptive coefficient calculation block 34, the switching injection amount calculation block 35, and the concentration determination block 36 will be described in detail.

FIG. 8 is a flowchart showing a method of the calculation process in the storage amount estimation block 33. A part of the urea in the injected urea solution is itself stored in the SCR catalyst 3, and the rest of the urea is hydrolyzed to NH3 and the generated NH3 is stored in the SCR catalyst 3. In the process of FIG. 8, the estimated storage amount STNH3 and the estimated storage capacity STNH3MAX are calculated as an amount equivalent to the urea solution amount.

Figure 11A:
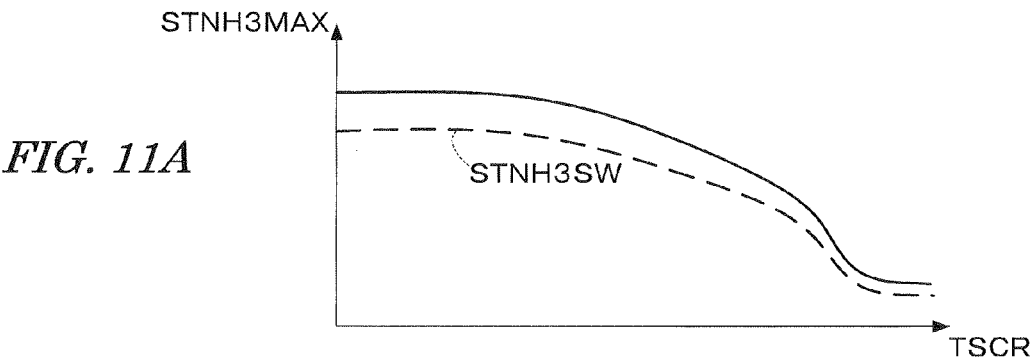
FIGS. 11A-11C show tables and a map which are used in the process of FIGS. 8 and 9.

In step S11, an STNH3MAX table shown in FIG. 11A is retrieved according to the SCR catalyst temperature TSCR to calculate the estimated storage capacity STNH3MAX. The STNH3MAX table is set so that the estimated storage capacity STNH3MAX decreases as the SCR catalyst temperature TSCR becomes higher. It is to be noted that the broken line is shown as a reference in FIG. 11A for indicating a setting of a target switching storage amount STNH3SW which is described below.

In step S12, the preceding value STNH3(k−1) of the estimated storage amount, the urea solution injection amount GUREA(k), and the feedforward injection amount GUREAFF(k) are applied to the following equation (4) to calculate a first calculation parameter STNH3TEMP1 of the estimated storage amount STNH3. Since the feedforward injection amount GUREAFF corresponds to an estimated amount of NH3 used for reducing NOx, the feedforward injection amount GUREAFF is subtracted from the preceding value STNH3(k−1).

$$STNH3TEMP1(k)=STNH3(k-1)+GUREA(k)-GUREAFF(k) \quad (4)$$

In step S13, it is determined whether or not the first calculation parameter STNH3TEMP1(k) is equal to or greater than the estimated storage capacity STNH3MAX(k). If the answer to step S13 is affirmative (YES), a second calculation parameter STNH3TEMP2(k) is set to the estimated storage capacity STNH3MAX(k) (step S14). If the answer to step S13 is negative (NO), it is determined whether or not the first calculation parameter STNH3TEMP1(k) is equal to or less than "0" (step S15).

If the answer to step S15 is affirmative (YES), the second calculation parameter STNH3TEMP2(k) is set to "0" (step S16). If the answer to step S15 is negative (NO), the second calculation parameter STNH3TEMP2 is set to the first calculation parameter STNH3TEMP1(k) (step S17).

In step S18, it is determined whether or not the slip flag FNH3SLIP is "1". If the answer to step S18 is affirmative (YES), it is determined whether or not the concentration determination mode flag FUCOBDMODE is "1" (step S19). If the answer to step S18 is negative (NO), or the answer to step S19 is affirmative (YES), the estimated storage amount STNH3(k) is set to the second calculation parameter STNH3TEMP2(k) (step S20).

If the answer to step S19 is negative (NO), i.e., the NH3-slip has occurred (FNH3SLIP=1) and the concentration determination is not performed, the process proceeds to step S21, in which the estimated storage amount STNH3(k) is set to the estimated storage capacity STNH3MAX(k). According to this setting of the estimated storage amount STNH3(k), it is possible to prevent errors from accumulating in the estimated storage amount STNH3, thereby improving calculation accuracy of the estimated storage amount STNH3, and accordingly improving accuracy of the NH3 storage control of the SCR catalyst 3.

In step S22, it is determined whether or not the estimated storage amount STNH3(k) is equal to or greater than the estimated storage capacity STNH3MAX(k). If the answer to step S22 is affirmative (YES), the estimated slip flag FNH3SLIPHAT(k) is set to "1" (step S23). If STNH3(k) is less than STNH3MAX(k), the estimated slip flag FNH3SLIPHAT (k) is set to "0" (step S24). That is, the estimated slip flag FNH3SLIPHAT is set to "1" when the estimated storage amount STNH3 reaches the estimated storage capacity STNH3MAX.

Figure 9:
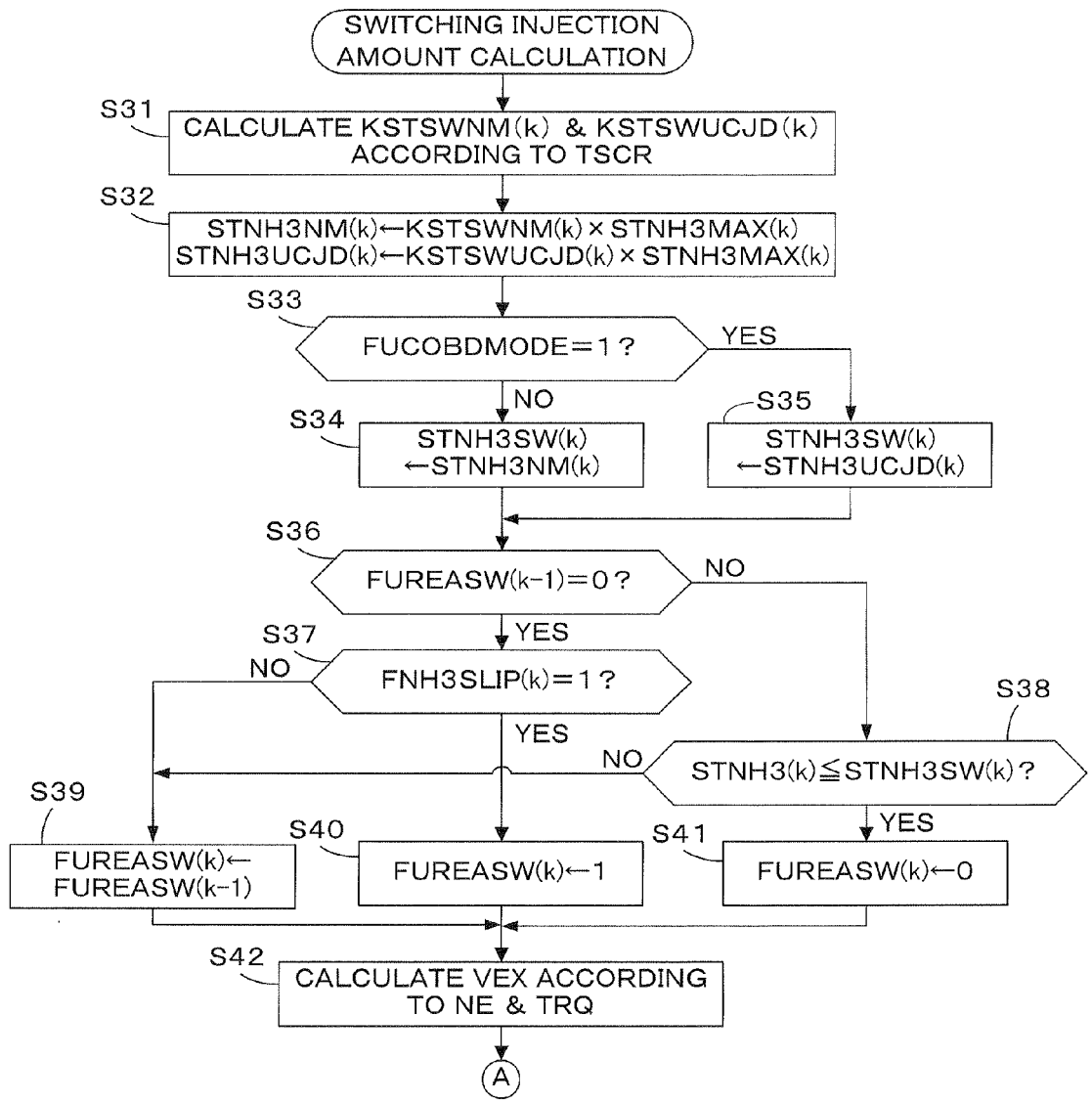
FIGS. 9 and 10 show a flowchart of a calculation process in the switching injection amount calculation block of FIG. 5.
Figure 10:
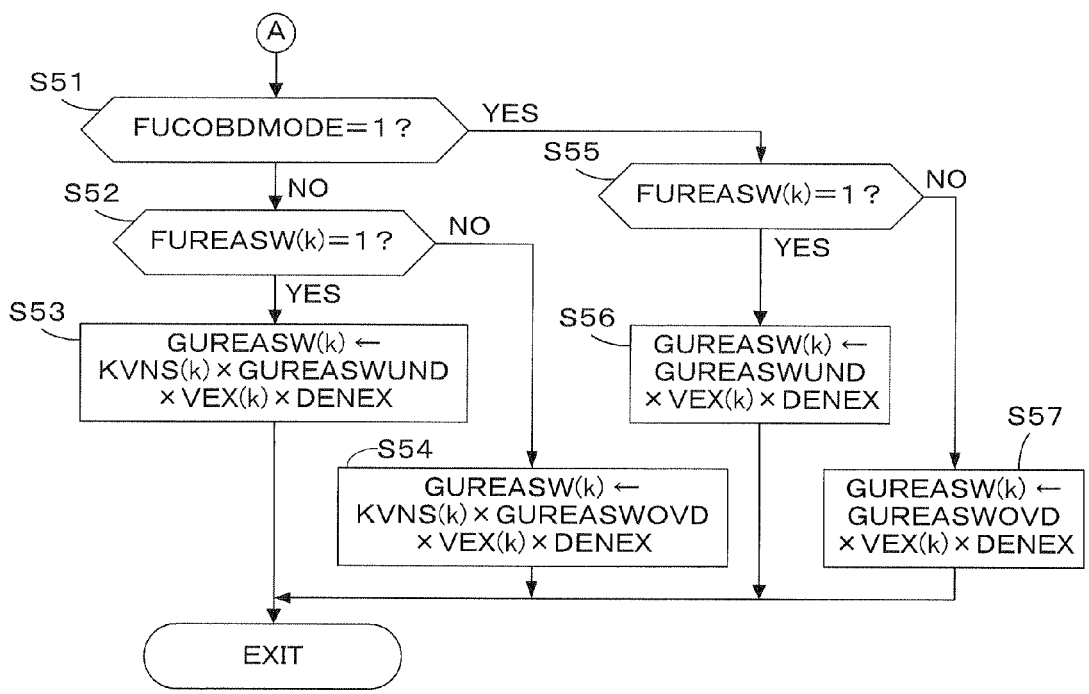

FIGS. 9 and 10 are flowcharts for showing a method of the calculation process in the switching injection amount calculation block 35.

Figure 11B:
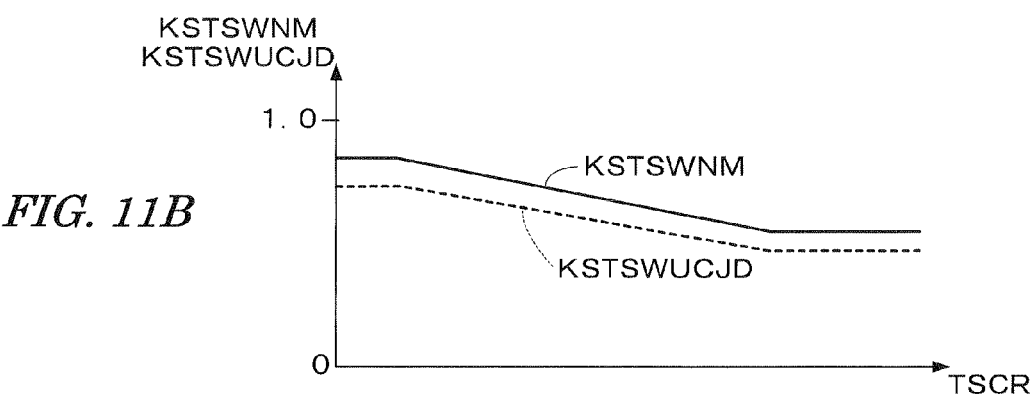

In step S31, a KSTSWNM table (solid line) and a KSTSUCJD table (broken line S) which are shown in FIG. 11B are retrieved according to the SCR catalyst temperature TSCR to calculate a normal switching storage amount calculation coefficient KSTSWNM(k) and a concentration determination switching storage amount calculation coefficient KSTSWUCJD(k). The normal switching storage amount calculation coefficient KSTSWNM(k) is applied to the calculation of the target switching storage amount STNH3SW when performing the normal control (the control in which the concentration determination is not performed), and the concentration determination switching storage amount calculation coefficient KSTSWUCJD(k) is applied to the calculation of the target switching storage amount STNH3SW in the concentration determination mode (refer to step S32).

The KSTSWNM table and the KSTSWUCJD table are set so that the coefficient value decreases as the SCR catalyst temperature TSCR becomes higher in a range approximately from 100 degrees centigrade to 500 degrees centigrade of the SCR catalyst temperature TSCR. Further, the coefficient value of KSTSWUCJD in the concentration determination mode is set to a value less than the corresponding value of KSTSWNM in the normal control (KSTSWUCJD<KSTSWNM). According to this setting, in the concentration determination mode, accuracy of the concentration determination is prevented from deteriorating in the transient operating condition of the engine. Further, in the normal control, the decreasing amount of the storage amount is set to the minimum, which prevents deterioration of the NOx removing rate.

It is to be noted that the switching storage amount calculation coefficients KSTSWNM and KSTSUCJD may be set to a constant value regardless of the SCR catalyst temperature TSCR.

In step S32, the estimated storage capacity STNH3MAX(k) and the normal switching storage amount calculation coefficient KSTSWNM(k) are applied to the following equation (5) to calculate a normal target switching storage amount STNH3NM(k). Further, the estimated storage capacity STNH3MAX(k) and the concentration determination switching storage amount calculation coefficient KSTSWUCJD(k) are applied to the following equation (6) to calculate a concentration determination target switching storage amount STNH3UCJD(k).

$$STNH3NM(k) = KSTSWNM(k) \times STNH3MAX(k) \quad (5)$$

$$STNH3UCJD(k) = KSTSWUCJD(k) \times STNH3MAX(k) \quad (6)$$

It is to be noted that the target switching storage amounts STNH3NM and STNH3UCJD may respectively be set to values obtained by subtracting predetermined amounts from the estimated storage capacity STNH3MAX.

In step S33, it is determined whether or not the concentration determination mode flag FUCOBDMODE is "1". In the concentration determination mode, the target switching storage amount STNH3SW(k) is set to the concentration determination target switching storage amount STNH3UCJD(k) (step S35). In the normal control, the target switching storage amount STNH3SW(k) is set to the normal target switching storage amount STNH3NM(k) (step S34).

In step S36, it is determined whether or not the preceding value of an injection amount switching flag FUREASW(k-1) is "0". If the injection amount switching flag FUREASW is "1", the switching injection amount GUREASW is set to a lower control value.

If the injection amount switching flag FUREASW is "0", the switching injection amount GUREASW is set to an upper control value (refer to steps S52 to S54).

If the answer to step S36 is affirmative (YES), it is determined whether or not the slip flag FNH3SLIP(k) is "1" (step S37). If FNH3SLIP(k) is "1", the injection amount switching flag FUREASW(k) is set to "1" (step S40). If FNH3SLIP(k) is "0", the injection amount switching flag FUREASW(k) is maintained at the preceding value (step S39).

If FUREASW(k-1) is "1" in step S36, it is determined whether or not the estimated storage amount STNH3(k) is equal to or less than the target switching storage amount STNH3SW(k) (step S38). If the answer to step S38 is affirmative (YES), the injection amount switching flag FUREASW(k) is set to "0" (step S41). If the answer to step S38 is negative (NO), i.e., if the estimated storage amount STNH3(k) is higher than the target switching storage amount STNH3SW(k), the process proceeds to step S39. That is, when the injection amount switching flag FUREASW is "0" and the slip flag FNH3SLIP is changed to "1", the injection amount switching flag FUREASW is changed to "1". When the injection amount switching flag FUREASW is "1" and the estimated storage amount STNH3 becomes equal to or less than the target switching storage amount STNH3SW, the injection amount switching flag FUREASW is changed to "0".

Figure 11C:
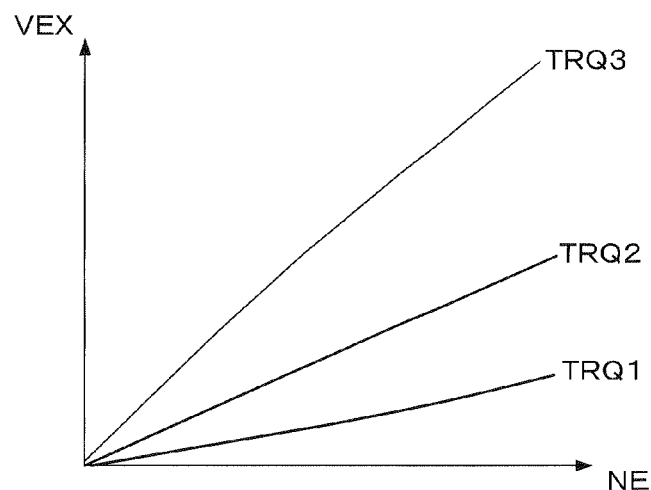

In step S42, a VEX map shown in FIG. 11C is retrieved according to the engine rotational speed NE and the engine load TRQ to calculate the estimated exhaust volume flow rate VEX. The estimated exhaust volume flow rate VEX is an estimated value of the exhaust volume flow rate per control period DTMUCOBD (for example, the control period DTMUCOBD is set to about 100 to 500 msec). The predetermined engine loads TRQ1, TRQ2, and TRQ3 in FIG. 11C satisfy the relationship of "TRQ1<TRQ2<TRQ3". The VEX map is set so that the estimated exhaust volume flow rate VEX increases as the engine rotational speed NE increases, and the estimated exhaust volume flow rate VEX increases as the engine load TRQ increases.

In step S51 (FIG. 10), it is determined whether or not the concentration determination mode flag FUCOBDMODE is "1". If the answer to step S51 is negative (NO), i.e., when performing the normal control, it is determined whether or not the injection amount switching flag FUREASW(k) is "1" (step S52). If the answer to step S52 is affirmative (YES), i.e., when the urea solution injection amount GUREA is set to the lower control value, the switching injection amount GUREASW(k) is calculated by the following equation (7). In the equation (7), GUREASWUND is a predetermined decreasing correction value which is set to a negative value for decreasing the NH3 storage amount of the SCR catalyst 3, and the unit of GUREASWUND is a weight concentration. DENEX is an exhaust gas density [g/L]. KVNS(k) is the adaptive coefficient calculated in the adaptive coefficient calculation block 34, and is set so as to compensate changes in the urea concentration.

$$GUREASW(k) = KVNS(k) \times GUREASWUND \times VEX(k) \times DENEX \quad (7)$$

If the answer to step S52 is negative (NO), i.e., when FUREASW(k) is "0" and the urea solution injection amount GUREA is set to the upper control value, the switching injection amount GUREASW(k) is calculated by the following equation (8). In the equation (8), GUREASWOVD is a predetermined increasing correction value which is set to a positive value for increasing the NH3 storage amount of the SCR catalyst 3, and the unit of GUREASWOVD is a weight concentration.

$$GUREASW(k) = KVNS(k) \times GUREASWOVD \times VEX(k) \times DENEX \quad (8)$$

On the other hand, if FUCOBDMODE is "1" in step S51, i.e., when performing the concentration determination, the switching injection amount GUREASW(k) is calculated by the following equation (9) if the injection amount switching flag FUREASW(k) is "1" (steps S55 and S56). If the injection amount switching flag FUREASW(k) is "0", the switching injection amount GUREASW(k) is calculated by the following equation (10) (steps S55 and S57). The equations (9) and (10) are respectively obtained by deleting the term of "KVNS(k)" from the equations (7) and (8). The reason for using the equations (9) and (10) is that the correction by the adaptive coefficient KVNS should be stopped when performing the concentration determination.

$$GUREASW(k) = GUREASWUND \times VEX(k) \times DENEX \quad (9)$$

$$GUREASW(k) = GUREASWOVD \times VEX(k) \times DENEX \quad (10)$$

Figure 12:
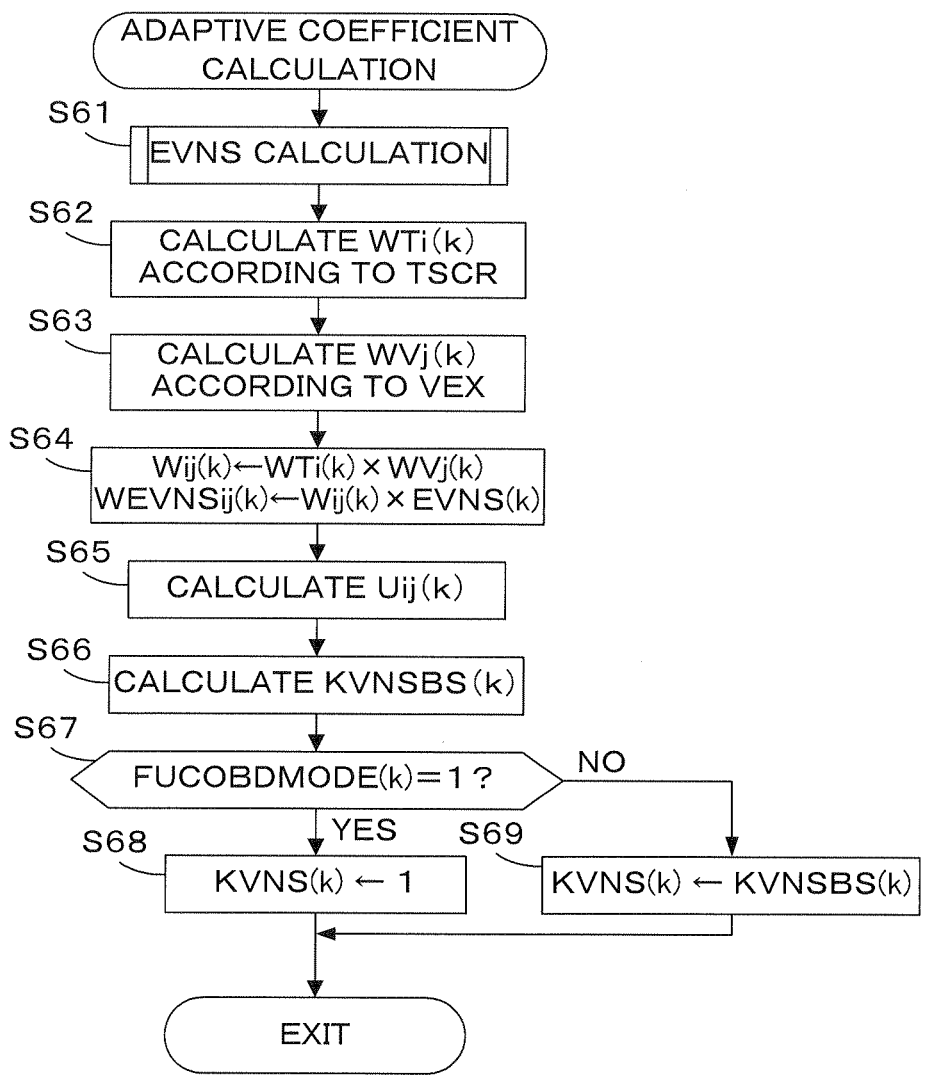
FIG. 12 is a flowchart of a calculation process in the adaptive coefficient calculation block of FIG. 5.

FIG. 12 is a flowchart showing a method of the calculation process in the adaptive coefficient calculation block 34.

Figure 13:
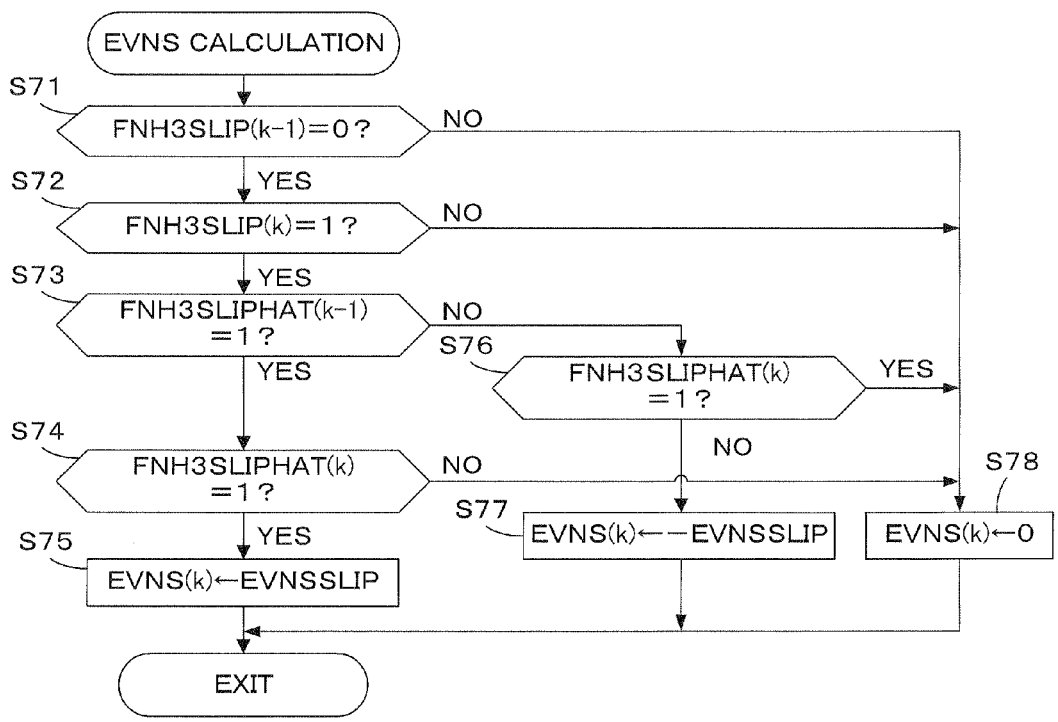
FIG. 13 is a flowchart of the EVNS calculation process executed in the process of FIG. 12.

In step S61, an EVNS calculation process shown in FIG. 13 is executed to calculate an error amount EVNS. The error amount EVNS is a parameter indicative of a difference between an estimated NH3 slip occurrence timing and a detected NH3 slip occurrence timing (at which the slip flag FNH3SLIP becomes "1"). The estimated NH3 slip occurrence timing (at which the estimated slip flag FNH3SLIPHAT becomes "1") is determined based on the estimated storage amount STNH3 and the estimated storage capacity STNH3MAX.

Figure 14A:
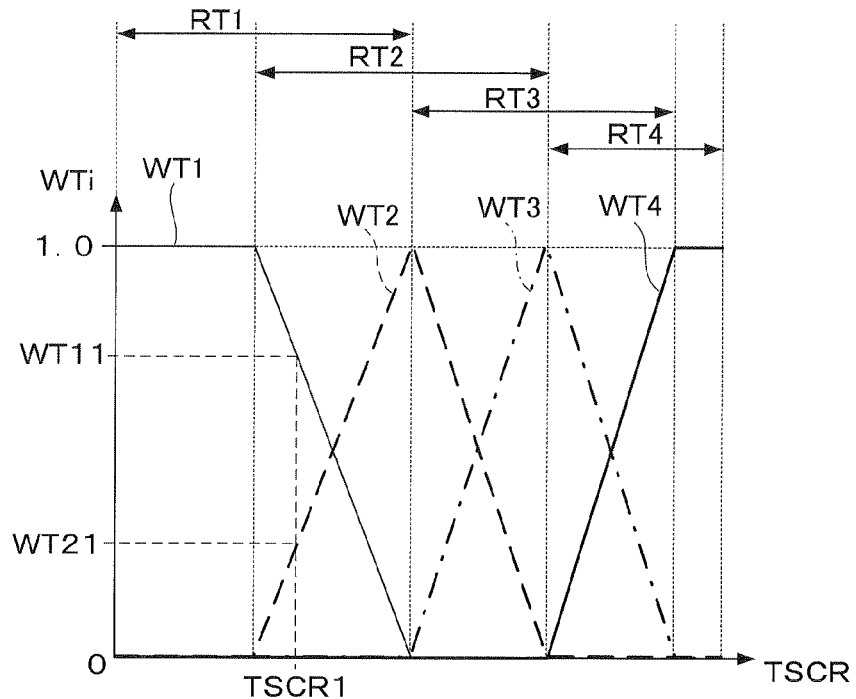
FIGS. 14A and 14B show tables used in the process of FIG. 12.

In step S62, WTi tables (i=1 to 4) shown in FIG. 14A are retrieved according to the SCR catalyst temperature TSCR to calculate catalyst temperature weighting coefficients WTi(k). In this embodiment, four temperature ranges RT1 to RT4 are set according to the SCR catalyst temperature TSCR. The temperature ranges RT1 to RT4 are set so that adjacent ranges overlap each other. The catalyst temperature weighting coefficients WT1 to WT4, which are set as shown in FIG. 14A, respectively correspond to the temperature ranges RT1 to RT4. For example, the retrieved result when the SCR temperature TSCR is equal to a temperature TSCR1 is shown below.

WT1=WT11, WT2=WT21, WT3=WT4=0

Figure 14B:
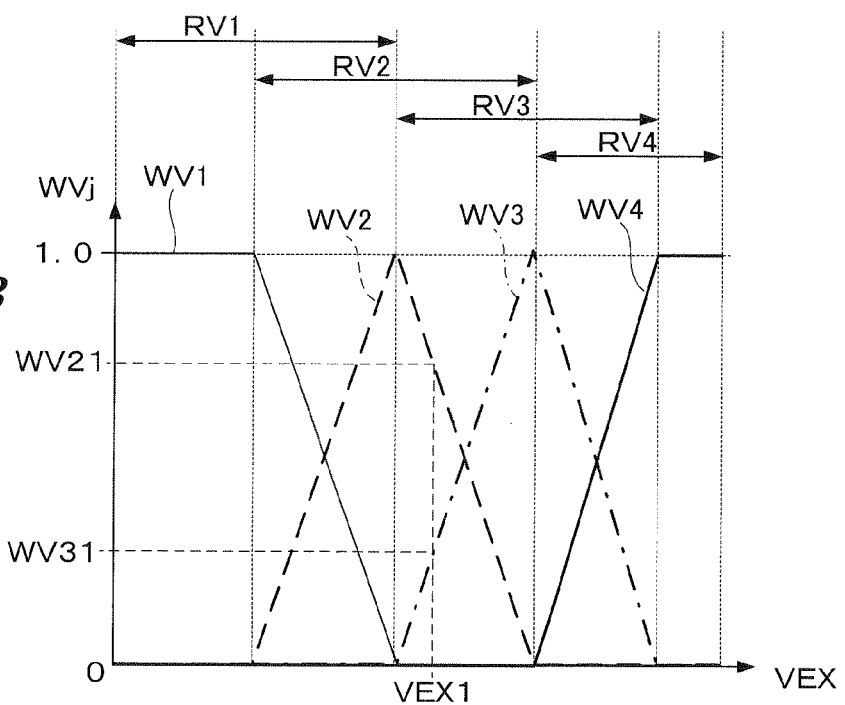

In step S63, WVj tables (j=1 to 4) shown in FIG. 14B are retrieved according to the estimated exhaust volume flow rate VEX to calculate volume flow rate weighting coefficients WVj(k). In this embodiment, four flow rate ranges RV1 to RV4 are set according to the estimated exhaust volume flow rate VEX. The flow rate ranges RV1 to RV4 are set so that adjacent ranges overlap each other. The volume flow rate weighting coefficients WV1 to WV4, which are set as shown in FIG. 14B, respectively correspond to the flow rate ranges RV1 to RV4. For example, the retrieved result when the estimated exhaust volume flow rate VEX is equal to a flow rate VEX1 is shown below.

WV1=0, WV2=WV21, WV3=WV31, WV4=0

In step S64, a region weighting coefficient Wij(k) corresponding to a region RTVij defined by the SCR catalyst temperature TSCR and the estimated exhaust volume flow rate VEX is calculated by the following equation (11), and a weighted error amount WEVNSij corresponding to the region RTVij is calculated by the following equation (12).

$$Wij(k)=WTi(k)\times WVj(k) \quad (11)$$

$$WEVNSij(k)=Wij(k)\times EVNS(k) \quad (12)$$

Figure 15:
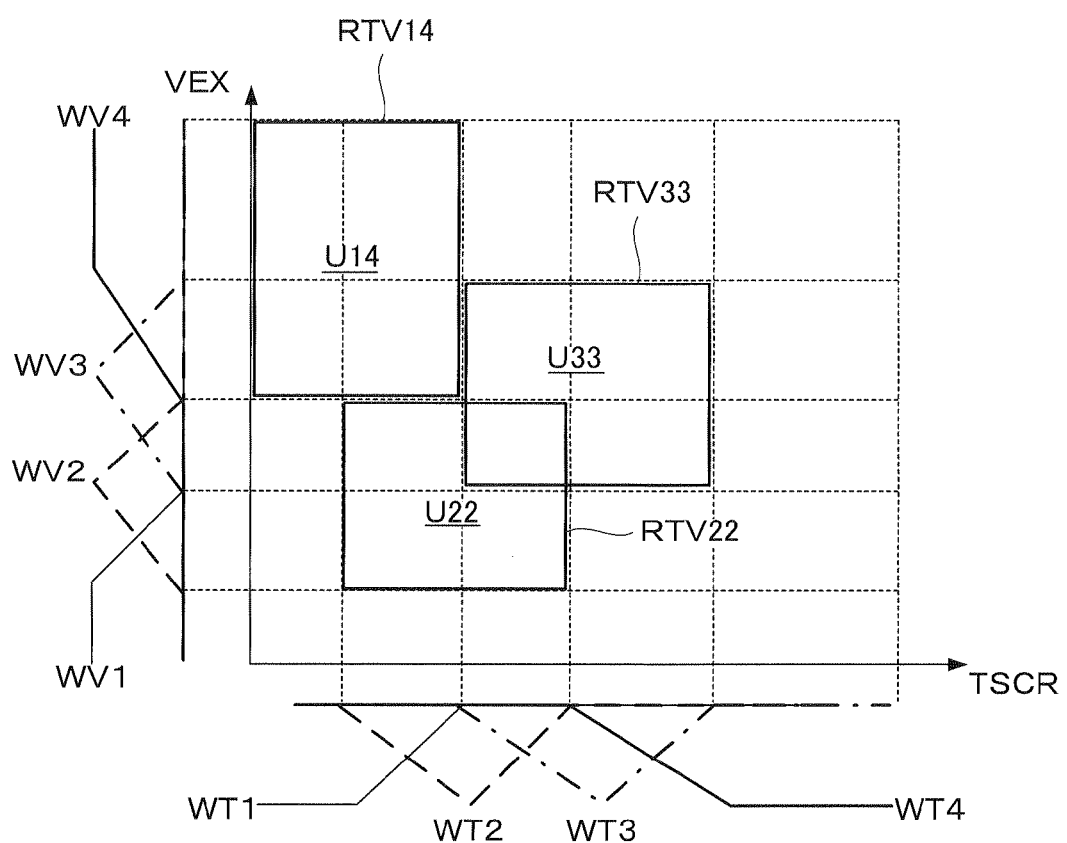
FIG. 15 is a diagram for illustrating the calculation method of a correction amount (Uij) in the process of FIG. 12.

The regions RTVij are 16 regions defined by the four ranges RT1 to RT4 of the SCR catalyst temperature TSCR and the four ranges RV1 to RV4 of the estimated exhaust volume flow rate VEX, and adjacent regions overlap each other as shown in FIG. 15.

In step S65, a correction amount Uij(k) is calculated with the sliding mode control algorithm so that the weighted error amount WEVNSij becomes "0". Specifically, a switching function value σij is calculated by the following equation (13), a reaching law control input URCHij and an adaptive law control input UADPij are calculated by the equations (14) and (15), and the correction amount Uij is calculated by the equation (16). In the equation (13), POLE is a switching function setting parameter for specifying a damping characteristic of the control deviation (WEVNSij), and set to a value greater than "−1" and less than "0". KRCH in the equation (14) and KADP in the equation (15) are respectively a reaching law control gain and an adaptive law control gain.

$$\sigma ij(k)=WEVNSij(k)+POLE\times WEVNSij(k-1) \quad (13)$$

$$URCHij(k)=KRCH\times \sigma ij(k) \quad (14)$$

$$UADPij(k)=UADPij(k-1)+KADP\times \sigma ij(k) \quad (15)$$

$$Uij(k)=URCHij(k)+UADPij(k) \quad (i=1 \text{ to } 4, j=1 \text{ to } 4) \quad (16)$$

In step S66, the region weighting coefficient Wij(k) and the correction amount Uij(k) are applied to the following equation (17) to calculate a basic adaptive coefficient KVNSBS(k).

$$KVNSBS(k) = 1 + \sum_{i=1}^{4}\sum_{j=1}^{4} Wij(k)\times Uij(k) \quad (17)$$

The adaptive coefficient KVNS is applied to the injection amount correction as multiplying term (refer to the equations (2), (7), and (8)). Therefore, in the equation (17), "1" is added so that the value upon starting use of the adaptive coefficient KVNS, i.e., the initial value of the adaptive coefficient KVNS is equal to "1". It is to be noted that the initial value of the adaptive law control input UADPij may be set to "1" instead of adding "1" in the equation (17).

In step S67, it is determined whether or not the concentration determination mode flag FUCOBDMODE(k) is "1". If the answer to step S67 is affirmative (YES), the adaptive coefficient KVNS(k) is set to "1" (step S68). If FUCOBDMODE is "0", the adaptive coefficient KVNS(k) is set to the basic adaptive coefficient KVNSBS(k) (step S69). If the urea solution injection amount is corrected with the adaptive coefficient KVNS when performing the concentration determination, the concentration determination cannot accurately be performed. Therefore, the adaptive coefficient KVNS is set to "1" during execution of the concentration determination.

It is to be noted that the algorithm applied to calculation of the correction amount Uij in step S65 is not limited to the sliding mode control algorithm, and well-known feedback control algorithms such as the PID (Proportional, Integral, and Differential) control algorithm, the optimal control algorithm, the backstepping control algorithm, and the like may be applicable.

According to the process of FIG. 12, the correction amount Uij is calculated corresponding to the 16 operating regions RTVij (I=1 to 4, j=1 to 4) defined by the SCR catalyst temperature TSCR and the estimated exhaust volume flow rate VEX. For example, as shown in FIG. 15, a correction amount U22 is calculated corresponding to an operating region RTV22, a correction amount U33 is calculated corresponding to an operating region RTV33, and a correction amount U14 is calculated corresponding to an operating region RTV14. Therefore, a change in the NOx removing rate due to a change in the urea concentration is compensated corresponding to the operating region, which makes it possible to accurately compensate changes in the urea concentration regardless of changes in the SCR catalyst temperature TSCR and/or the engine operating condition (the engine rotational speed NE, the engine load TRQ).

FIG. 13 is a flowchart of the EVNS calculation process executed in step S61 of FIG. 12.

In step S71, it is determined whether or not the preceding slip flag FNH3SLIP(k−1) is "0". If the answer to step S71 is affirmative (YES), it is further determined whether or not the present slip flag FNH3SLIP(k) is "1" (step S72). If the answer to step S71 or S72 is negative (NO), the error amount EVNS(k) is set to "0" (step S78).

If the answer to step S72 is affirmative (YES), i.e., when the slip flag FNH3SLIP changes from "0" to "1", it is determined whether or not the preceding estimated slip flag FNH3SLIPHAT(k−1) is "1" (step S73). If the answer to step S73 is affirmative (YES), it is determined whether or not the present estimated slip flag FNH3SLIPHAT(k) is "1" (step S74). If the answer to step S74 is affirmative (YES), i.e., when the estimated slip flag FNH3SLIPHAT is already "1" at the time the NH3-slip is detected, it is indicated that the urea concentration CUR of the injected urea solution is lower than the normal value CUR0. Therefore, the error amount EVNS (k) is set to a predetermined error amount EVNSSLIP (>0) (step S75). If the answer to step S74 is negative (NO), the process proceeds to step S78.

On the other hand, if the answer to step S73 negative (NO), i.e., when the estimated slip flag FNH3SLIPHAT is "0" at the time which is one control period before the time of detecting the NH3-slip occurrence, it is determined whether or not the present estimated slip flag FNH3SLIPHAT(k) is "1" (step S76). If the answer to step S76 is negative (NO), i.e., when the estimated slip flag FNH3SLIPHAT is "0" at the time the NH3-slip occurrence is detected, it is indicated that the urea concentration CUR is higher than the normal value CUR0. Therefore, the error amount EVNS(k) is set to a negative predetermined error amount −EVNSSLIP (<0) (step S77). If the answer to step S76 is affirmative (YES), the process proceeds to step S78.

Consequently, according to the process of FIG. 12, the basic adaptive coefficient KVNSBS is calculated so as to decrease as the urea concentration CUR becomes higher.

Figure 16A:
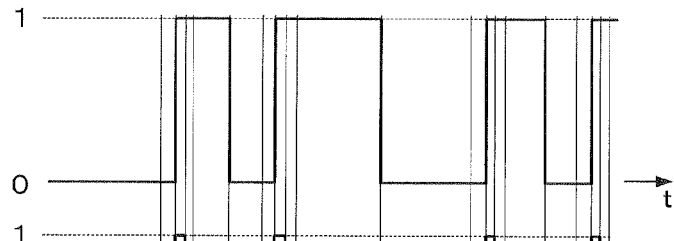
FIGS. 16A-16F show time charts for illustrating the control operation by the process of FIG. 12.
Figure 16B:
Figure 16C:
Figure 16D:
Figure 16E:
Figure 16F:
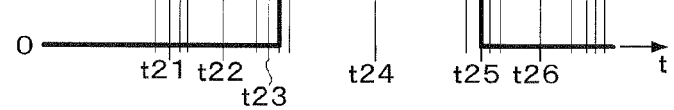

FIGS. 16A to 16F are time charts for illustrating an operation example of the urea solution injection control described above. FIGS. 16A to 6F respectively show changes in the injection amount switching flag FUREASW, the slip flag FNH3SLIP, the NH3 sensor output NH3CONS, the estimated storage amount STNH3, the urea solution injection amount GUREA, and the concentration determination mode flag FUCOBDMODE.

The injection amount switching flag FUREASW changes to "1" at times t21, t23, and t25 at which the slip flag FNH3SLIP changes to "1", and changes to "0" at times t22 and t26 at which the estimated storage amount STNH3reaches the normal target switching storage amount STNH3NM (in the normal control) or at time t24 at which the estimated storage amount STNH3reaches the concentration determination target switching storage amount STNH3UCJD (in the concentration determination mode). The switching injection amount GUREASW is switched depending on a change in the injection amount switching flag FUREASW, thereby alternately controlling the urea solution injection amount GUREA to two values whose center is the feedforward injection amount GUREAFF.

Figure 17:
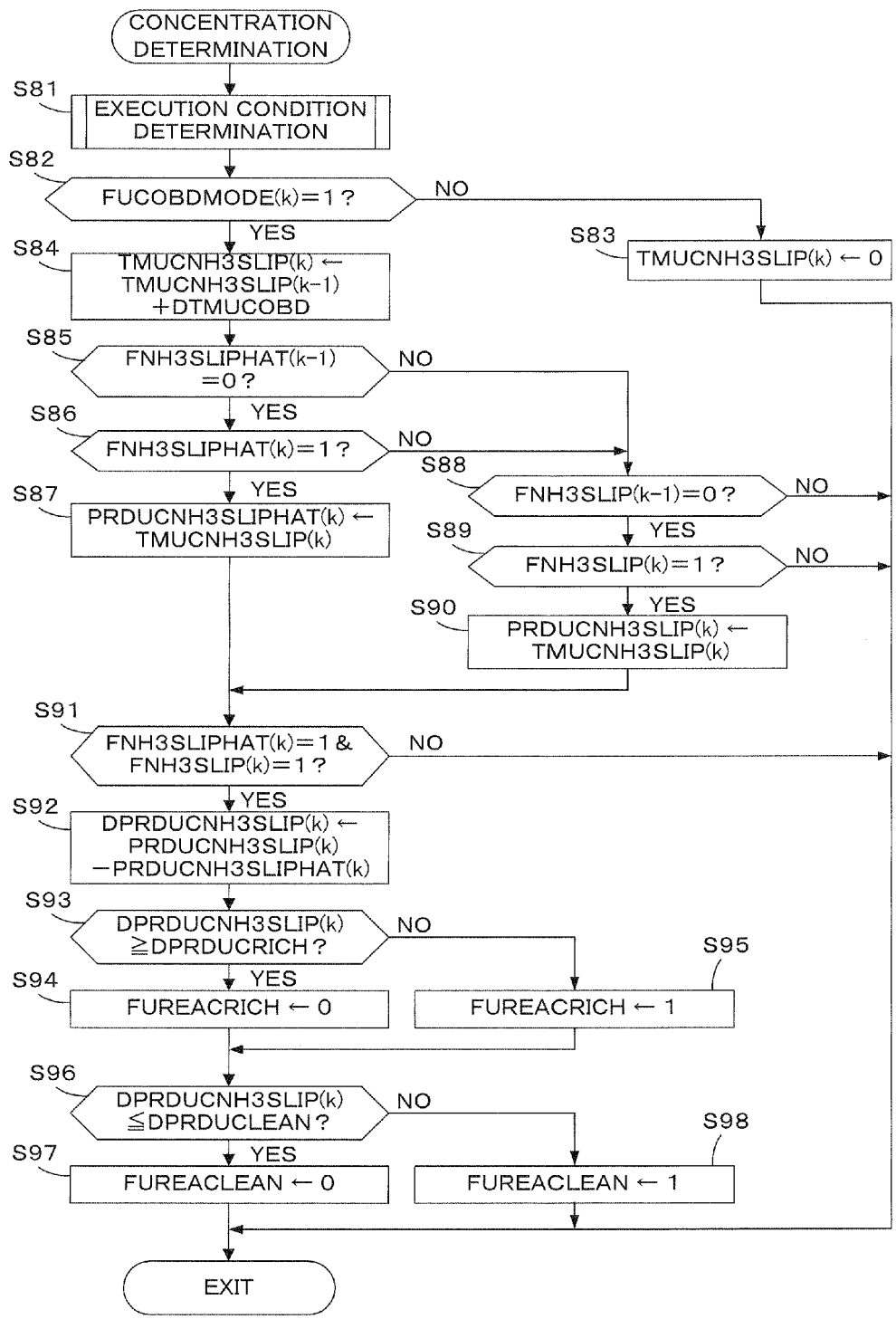
FIG. 17 is a flowchart of the calculation process (first concentration determination method) in the concentration determination block of FIG. 5.

FIG. 17 is a flowchart showing a method of the calculation process in the concentration determination block 36. Any one of the five methods described below can be adopted as the concentration determination method. The process shown in FIG. 17 corresponds to the first concentration determination method.

Figure 18:
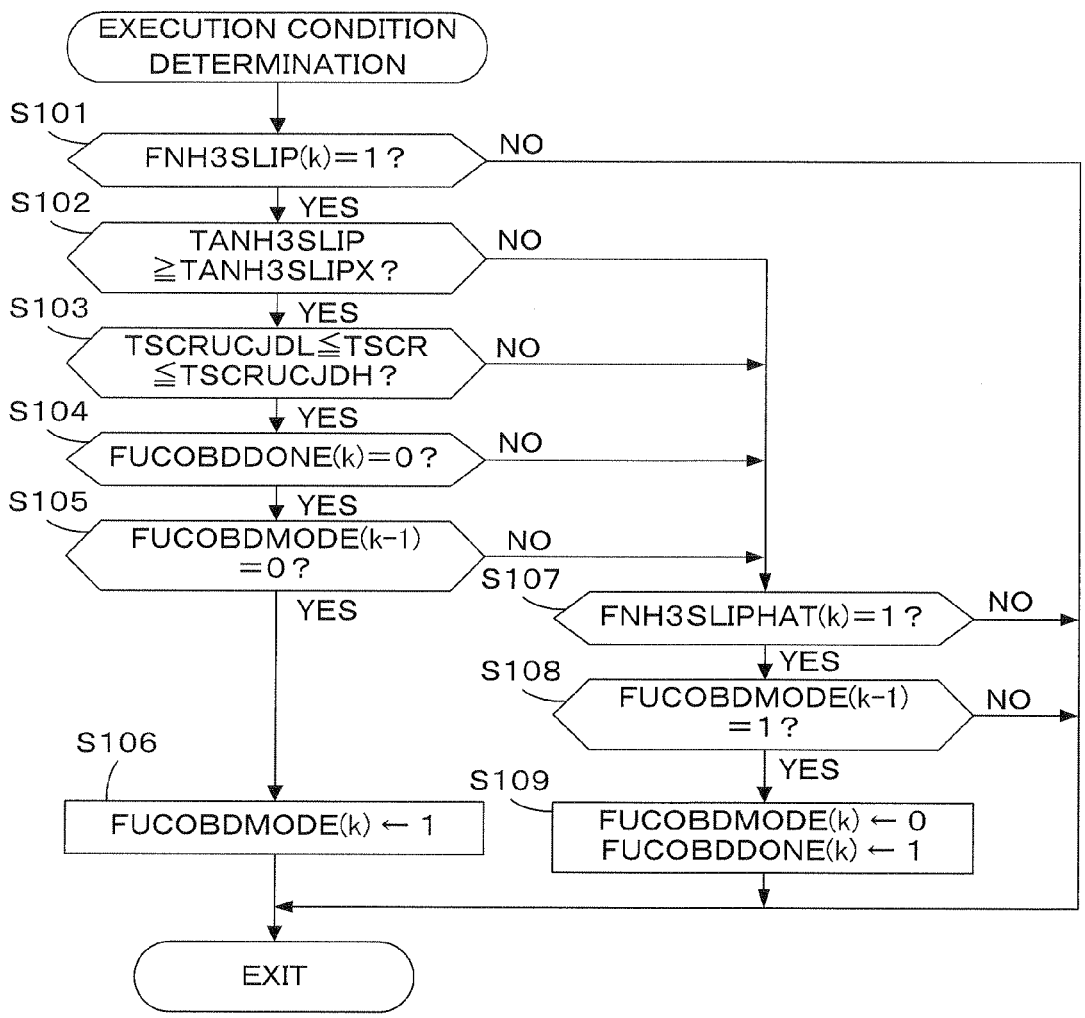
FIG. 18 is a flowchart of the execution condition determination process executed in the process of FIG. 17.

In step S81, an execution condition determination process shown in FIG. 18 is executed to set the concentration determination mode flag FUCOBDMODE. In step S82, it is determined whether or not the concentration determination mode flag FUCOBDMODE(k) is "1". If the answer to step S82 is negative (NO), a value of a timer TMUCNH3SLIP(k), which measures an elapsed time period from the time the concentration determination mode starts, is set to "0" (step S83), and the process ends.

If the answer to step S82 is affirmative (YES), the value of the timer TMUCNH3SLIP is increased by one control period DTMUCOBD with the following equation (21) (step S84).

$$TMUCNH3SLIP(k)=TMUCNH3SLIP(k-1)+DTMUCOBD \quad (21)$$

In step S85, it is determined whether or not the preceding estimated slip flag FNH3SLIPHAT(k−1) is "0". If the answer to step S85 is affirmative (YES), it is determined whether or not the present estimated slip flag FNH3SLIPHAT(k) is "1" (step S86). If the answer to step S86 is affirmative (YES), i.e., when the estimated slip flag FNH3SLIPHAT changes from "0" to "1", an estimated slip detection time period PRDUCNH3SLIPHAT(k) is set to the present value of the timer TMUCNH3SLIP(k) (step S87), and the process proceeds to step S91.

If the answer to step S85 or S86 is negative (NO), it is determined whether or not the preceding slip flag FNH3SLIP (k−1) is "0" (step S88). If the answer to step S88 is affirmative (YES), it is determined whether or not the present slip flag FNH3SLIP(k) is "1" (step S89). If the answer to step S88 or S89 is negative (NO), the process ends.

If the answer to step S89 is affirmative (YES), i.e., when the slip flag FNH3SLIP changes from "0" to "1", the slip detection time period PRDUCNH3SLIP(k) is set to the present value of the timer TMUCNH3SLIP(k) (step S90), and the process proceeds to step S91.

In step S91, it is determined whether or not both of the estimated slip flag FNH3SLIPHAT(k) and the slip flag FNH3SLIP(k) are "1". If the answer to step S91 is negative (NO), the process ends. If the answer to step S91 is affirmative (YES), the urea concentration determination value DPRDUCNH3SLIP is calculated by the above-described equation (1) (step S92). The urea concentration determination value DPRDUCNH3SLIP decreases as the urea concentration CUR becomes higher.

In step S93, it is determined whether or not the urea concentration determination value DPRDUCNH3SLIP(k) is equal to or greater than the high concentration determination threshold value DPRDUCRICH. If the answer to step S93 is negative (NO), it is determined that the urea concentration CUR is higher than the upper limit value of the acceptable range, and the high concentration abnormality flag FUREACRICH is set to "1" (step S95). If DPRDUCNH3SLIP(k) is equal to or greater than DPRDUCRICH in step S93, the high concentration abnormality flag FUREACRICH is set to "0" (step S94).

In step S96, it is determined whether or not the urea concentration determination value DPRDUCNH3SLIP(k) is equal to or less than the low concentration determination threshold value DPRDUCLEAN. If the answer to step S96 is negative (NO), it is determined that the urea concentration CUR is less than the lower limit value of the acceptable range, and the low concentration abnormality flag FUREACLEAN is set to "1" (step S98). If DPRDUCNH3SLIP(k) is equal to or less than DPRDUCLEAN in step S96, the low concentration abnormality flag FUREACLEAN is set to "0" (step S97).

FIG. 18 is a flowchart of the execution condition determination process executed in step S81 of FIG. 17. It is to be noted that the initial values of the concentration determination mode flag FUCOBDMODE and a concentration determination end flag FUCOBDDONE which are set in this process are "0".

In step S101, it is determined whether or not the slip flag FNH3SLIP(k) is "1". If the answer to step S101 is negative (NO), the process ends. If FNH3SLIP(k) is "1", it is determined whether or not an elapsed time period TANH3SLIP from the time the NH3-slip first occurs is equal to or greater than a predetermined waiting time period TANHSLIPX (e.g., 5 seconds) (step S102). If the answer to step S102 is affirmative (YES), it is determined whether or not the SCR catalyst temperature TSCR is equal to or higher than a predetermined lower limit temperature TSCRUCJDL (e.g., 200 degrees centigrade) and equal to or lower than a predetermined upper limit temperature TSCRUCJDH (e.g., 300 degrees centigrade) (step S103). If the answer to step S103 is affirmative (YES), it is determined whether or not the concentration determination end flag FUCOBDDONE(k) is "0" (step S104). If the answer to step S104 is affirmative (YES), it is further determined whether or not the preceding concentration determination mode flag FUCOBDMODE(k−1) is "0" (step S105).

If any one of the answers to steps S102 to S105 is negative (NO), the process proceeds to step S107. If the answer to step S105 is affirmative (YES), the concentration determination execution condition is determined to be satisfied, and the concentration determination mode flag FUCOBDMODE(k) is set to "1" (step S106).

In step S107, it is determined whether or not the estimated slip flag FNH3SLIPHAT(k) is "1". If the answer to step S107 is affirmative (YES), it is determined whether or not the preceding concentration determination mode flag FUCOBDMODE(k−1) is "1". If the answer to step S107 or S108 is negative (NO), the process ends. Accordingly, the concentration determination mode flag FUCOBDMODE(k) is maintained at the preceding value. If the answer to step S108 is affirmative (YES), the concentration determination mode flag FUCOBDMODE(k) is set to "0" and the concentration determination end flag FUCOBDDONE(k) is set to "1". That is, when both of the slip flag FNH3SLIP and the estimated slip flag FNH3SLIPHAT become "1" during the concentration determination mode, the concentration determination mode ends.

Figure 19A:
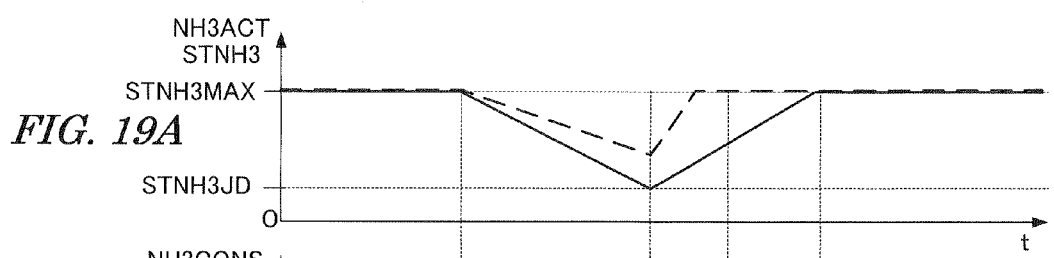
FIGS. 19A-19D show time charts for illustrating the process of FIG. 18.
Figure 19B:
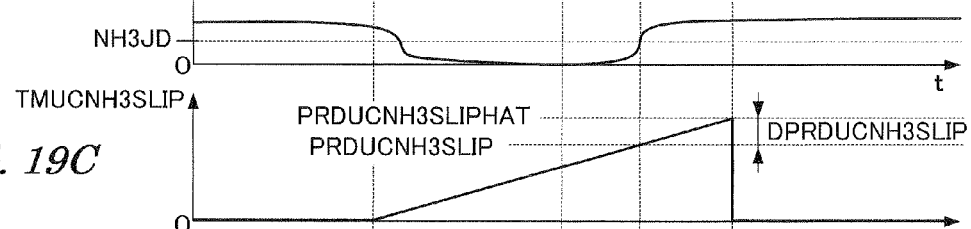
Figure 19C:
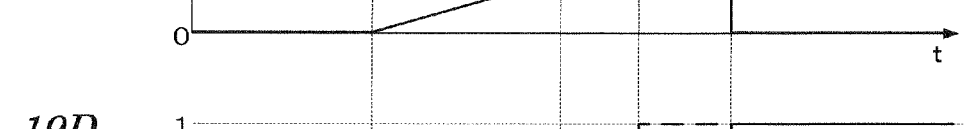
Figure 19D:
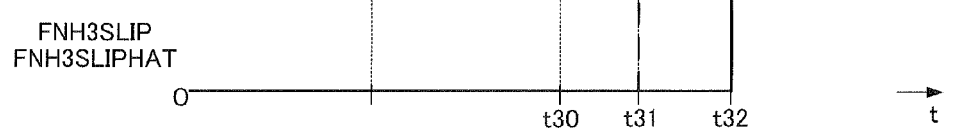

FIGS. 19A-19D show time charts for illustrating the concentration determination method in the process of FIG. 17, and an example in which the urea concentration CUR is higher than the normal concentration CUR0, is shown. FIG. 19A shows changes in the estimated storage amount STNH3 (solid line) and the actual storage amount NH3ACT (broken line). FIGS. 19B and 19C respectively show the NH3 sensor output NH3CONS and the value of the timer TMUCNH3SLIP (the elapsed time period from the start time of reducing the storage amount). FIG. 19D shows changes in the slip flag FNH3SLIP (solid line) and the estimated slip flag FNH3SLIPHAT (broken line). According to the process of FIG. 17, the timer TMUCNH3SLIP starts counting at the time the concentration determination mode flag FUCOBDMODE changes to "1". It is to be noted that a difference between the time the concentration determination mode flag FUCOBDMODE changes to "1" and the time the estimated storage amount STNH3 starts to decrease is negligible. Therefore, in this specification, "the time of staring the storage amount reduction" includes "the time of starting the urea solution injection amount reduction for reducing the storage amount".

When the actual storage amount NH3ACT reaches the actual storage capacity NH3ACTMAX (FIG. 19A shows an example in which the actual storage capacity NH3ACTMAX is equal to the estimated storage capacity STNH3MAX), the slip flag FNH3SLIP is set to "1" (time t31), and the timer value at time t31 is measured as the slip detection time period PRDUCNH3SLIP.

On the other hand, when the estimated storage amount STNH3 reaches the estimated storage capacity STNH3MAX, the estimated slip flag FNH3SLIPHAT is set to "1" (time t32), and the timer value at time t32 is measured as the estimated slip detection time period PRDUCNH3SLIPHAT. Therefore, the urea concentration determination value DPRUCNH3SLIP takes a negative value, and the urea concentration CUR is determined to be higher than the normal concentration CUR0.

Figure 20:
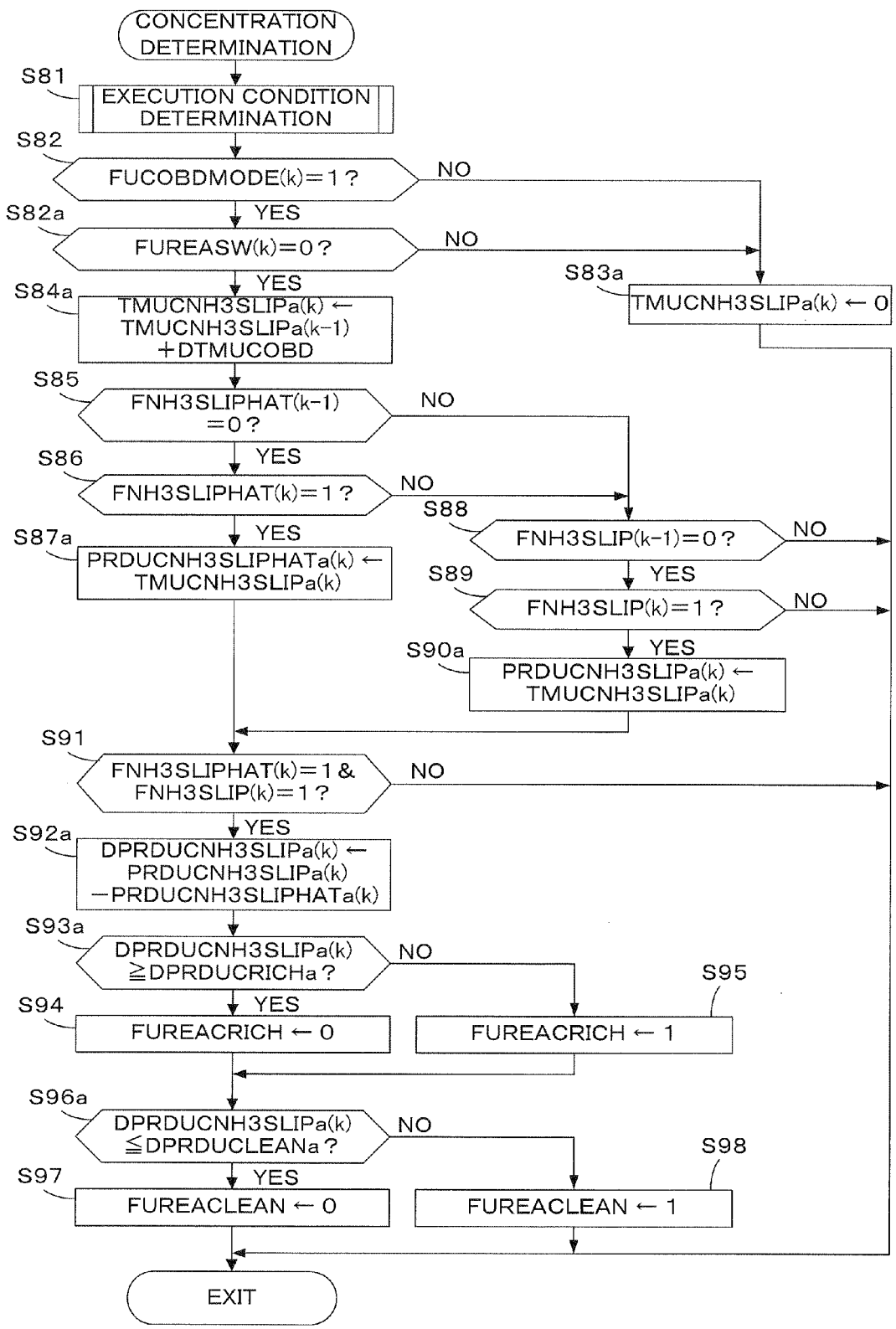
FIG. 20 is a flowchart of the calculation process (second concentration determination method) in the concentration determination block of FIG. 5.
Figure 21:
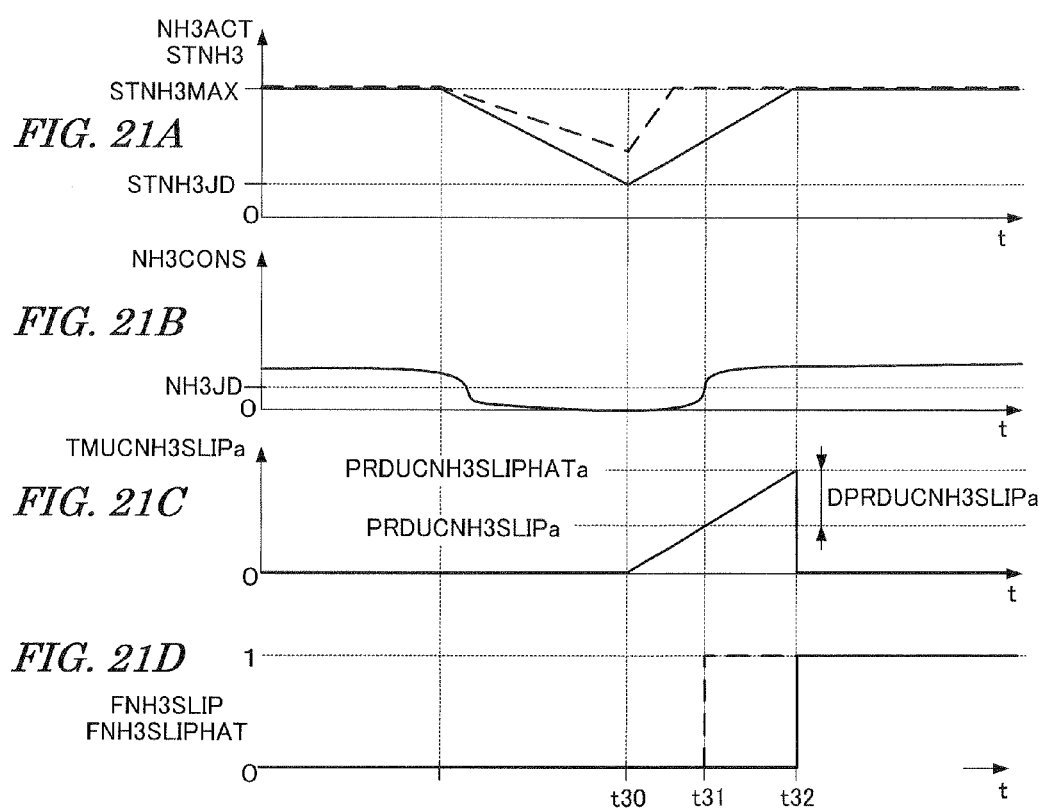
FIGS. 21A-21D show time charts for illustrating the process of FIG. 20.

FIG. 20 is a flowchart of the concentration determination process which uses a second concentration determination method. This process is obtained by changing steps S83, S84, S87, S90, S92, S93, and S96 of FIG. 17 respectively to steps S83a, S84a, S87a, S90a, S92a, S93a, and S96a, and further adding step S82a. In the first concentration determination method, the timer TMUCNH3SLIP starts counting at the time the concentration determination mode flag FUCOBDMODE(k) changes to "1", i.e., at the time of starting the storage amount reduction. In the second concentration determination method, a timer TMUCNH3SLIPa starts counting at the time the injection amount switching flag FUREASW(k) changes to "0" after the concentration determination mode starts, i.e., at the time of starting the storage amount increase (refer to FIG. 21C).

If the answer to step S82 is affirmative (YES), the process proceeds to step S82a, in which it is determined whether or not the injection amount switching flag FUREASW(k) is "0". If the answer to step S82a is negative (NO), the value of the timer TMUCNH3SLIPa(k) is set to "0" (step S83a).

In step S84a, the value of the timer TMUCNH3SLIPa is increased by the following equation (21a).

$$TMUCNH3SLIPa(k)=TMUCNH3SLIPa(k-1)+DT\text{-}MUCOBD \quad (21a)$$

In step S87a, an estimated slip detection time period PRDUCNH3SLIPHATa(k) is set to the timer value TMUCNH3SLIPa(k). In step S90a, a slip detection time period PRDUCNH3SLIPa(k) is set to the timer value TMUCNH3SLIPa(k). In step S92a, an urea concentration determination value DPRUCNH3SLIPa(k) is calculated by the following equation (1a).

$$DPRDUCNH3SLIPa(k)=PRDUCNH3SLIPa(k)-PRDUCNH3SLIPHATa(k) \quad (1a)$$

In step S93a, it is determined whether or not the urea concentration determination value DPRDUCNH3SLIPa(k) is equal to or greater than a high concentration determination threshold value DPRDUCRICHa of the second concentration determination method. In step S96a, it is determined whether or not the urea concentration determination value DPRDUCNH3SLIPa(k) is equal to or less than a low concentration determination threshold value DPRDUCLEANa of the second concentration determination method. Consequently, if DPRDUCNH3SLIPa(k) is less than DPRDUCRICHa, the high concentration abnormality flag FUREACRICH is set to "1" (step S95). If DPRDUCNH3SLIPa(k) is greater than DPRDUCLEANa, the low concentration abnormality flag FUREACLEAN is set to "1" (step S98).

FIGS. 21A-21D show time charts for illustrating the concentration determination process of FIG. 20, and an example in which the urea concentration CUR is higher than the normal concentration CUR0, is shown like FIGS. 19A-19D. FIGS. 21A, 21B, and 21D are the same as the corresponding FIGS. 19A, 19B, and 19D. FIG. 21C shows changes in the value of the timer TMUCNH3SLIPa. Time t30 indicates a time at which the injection amount switching flag FUREASW changes to "1", and the timer TMUCNH3SLIPa starts counting at time t30.

The timer value at time t31 is measured as the NH3-slip detection time period PRDUCNH3SLIPa, and the timer value at time t32 is measured as the estimated slip detection time period PRDUCNH3SLIPHATa. Therefore, the concentration determination can be performed similarly as the first concentration determination method.

Figure 22:
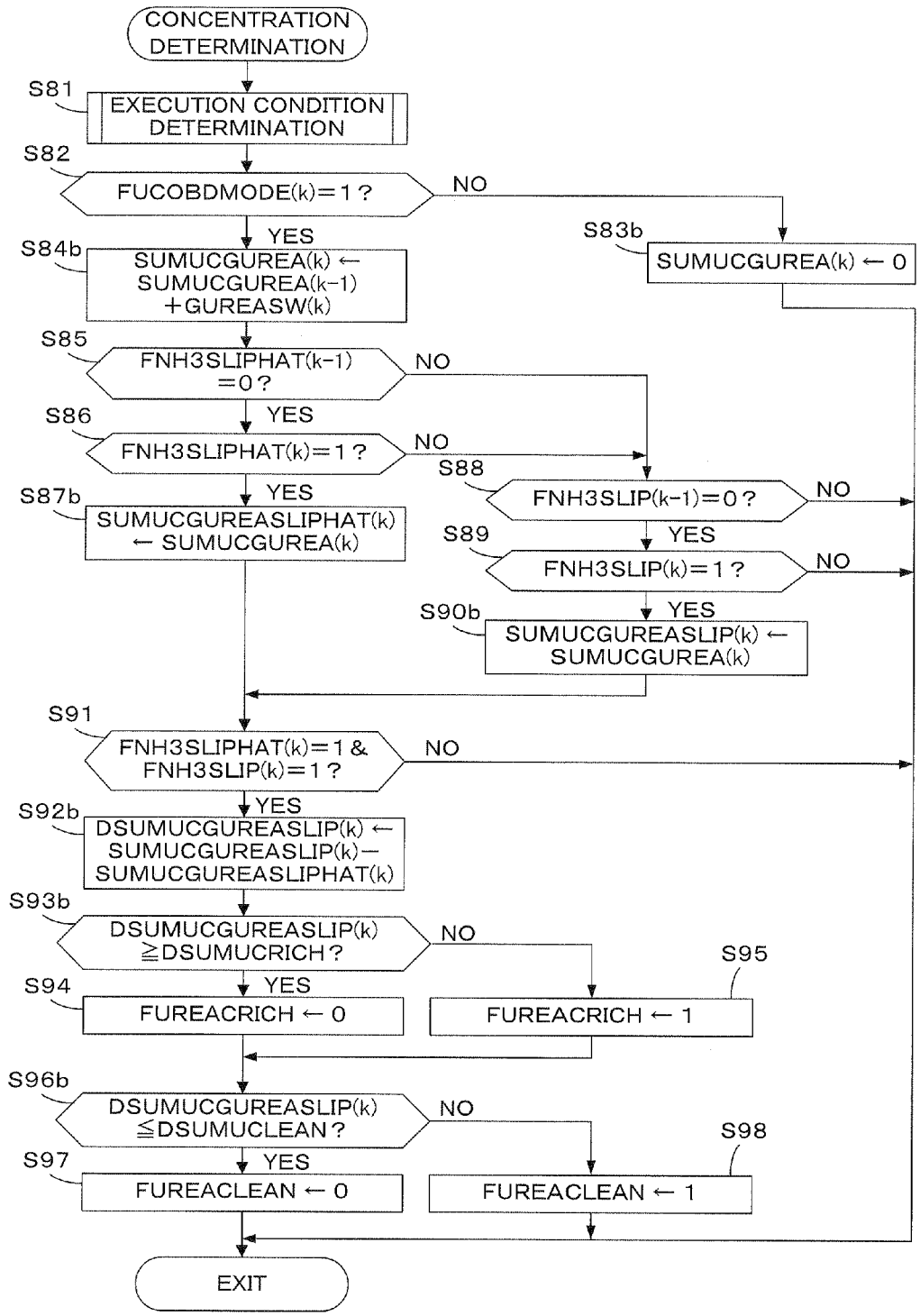
FIG. 22 is a flowchart of the calculation process (third concentration determination method) in the concentration determination block of FIG. 5.

FIG. 22 is a flowchart of the concentration determination process which uses a third concentration determination method. This process is obtained by changing steps S83, S84, S87, S90, S92, S93, and S96 of FIG. 17 respectively to steps S83b, S84b, S87b, S90b, S92b, S93b, and S96b.

In the first concentration determination method, the concentration determination is performed based on the elapsed time period measured by the timer TMUCNH3SLIP from the time the concentration determination mode flag FUCOBD-MODE(k) changes to "1" (the time of starting the storage amount reduction). In the third concentration determination method, the switching injection amount GUREASW(k) is integrated from the time of starting the storage amount reduction to calculate an integrated value SUMUCGUREA, and the concentration determination is performed based on the integrated value SUMUCGUREA.

Specifically, the calculation of the integrated value SUMUCGUREA starts at the time of starting the storage amount reduction. The integrated value SUMUCGUREA at the time the slip flag FNH3SLIP changes to "1" is calculated as a slip detection integrated value SUMUCGUREASLIP, and the integrated value SUMUCGUREA at the time the estimated slip flag FNH3SLIPHAT changes to "1" is calculated as an estimated slip detection integrated value SUMUCGUREASLIPHAT. A difference between the slip detection integrated value SUMUCGUREASLIP and the estimated slip detection integrated value SUMUCGUREA-SLIPHAT is calculated as an urea concentration determination value DSUMUCGUREASLIP. The high concentration abnormality flag FUREACRICH and the low concentration abnormality flag FUREACLEAN are set according to the result of comparison between the urea concentration determination value DSUMUCGUREASLIP and determination threshold values DSUMUCRICH and DSUMUCLEAN.

In FIG. 22, if the answer to step S82 is negative (NO), the process proceeds to step S83b, in which the integrated value SUMUCGUREA(k) is set to "0". If the answer to step S82 is affirmative (YES), the process proceeds to step S84b, in which the integrated value SUMUCGUREA(k) is calculated by the following equation (21b).

$$SUMUCGUREA(k)=SUMUCGUREA(k-1)+GUREASW(k) \qquad (21b)$$

In step S87b, the estimated slip detection integrated value SUMUCGUREASLIPHAT(k) is set to the integrated value SUMUCGUREA(k). In step S90b, the slip detection integrated value SUMUCGUREASLIP(k) is set to the integrated value SUMUCGUREA(k).

In step S92b, the urea concentration determination value DSUMUCGUREASLIP(k) is calculated by the following equation (1b).

$$DSUMUCGUREASLIP(k)=SUMUCGUREASLIP(k)-SUMUCGUREASLIPHAT(k) \qquad (1b)$$

In step S93b, it is determined whether or not the urea concentration determination value DSUMUCGUREASLIP (k) is equal to or greater than the high concentration determination threshold value DSUMUCRICH of the third concentration determination method. In step S96b, it is determined whether or not the urea concentration determination value DSUMUCGUREASLIP(k) is equal to or less than the low concentration determination threshold value DSU-MUCLEAN of the third concentration determination method. Consequently, if DSUMUCGUREASLIP(k) is less than DSUMUCRICH, the high concentration abnormality flag FUREACRICH is set to "1" (step S95). If DSU-MUCGUREASLIP(k) is greater than DSUMUCLEAN, the low concentration abnormality flag FUREACLEAN is set to "1" (step S98).

FIGS. 23A-23E show time charts for illustrating the concentration determination process of FIG. 22, and an example in which the urea concentration CUR is higher than the normal concentration CUR0, is shown like FIGS. 19A-19D. FIGS. 23A, 23B, and 23D are the same as the corresponding FIGS. 19A, 18B, and 19D. FIG. 23C shows changes in the integrated value SUMUCGUREA, and FIG. 23E shows changes in the injection amount switching flag FUREASW.

When the concentration determination mode starts, the switching injection amount GUREASW is set to a negative value. Accordingly, the integrated value SUMUCGUREA decreases from "0". At time t30, the injection amount switching flag FUREASW changes to "0", and the integrated value SUMUCGUREA thereafter increases.

The slip detection integrated value SUMUCGUREASLIP is set to the integrated value SUMUCGUREA of time t31, and the estimated slip detection integrated value SUMUCGUREASLIPHAT is set to the integrated value SUMUCGUREA of time t32. Therefore, the urea concentration determination value DSUMUCGUREASLIP takes a negative value, and the urea concentration CUR is determined to be higher than the normal concentration CUR0.

Figure 24:
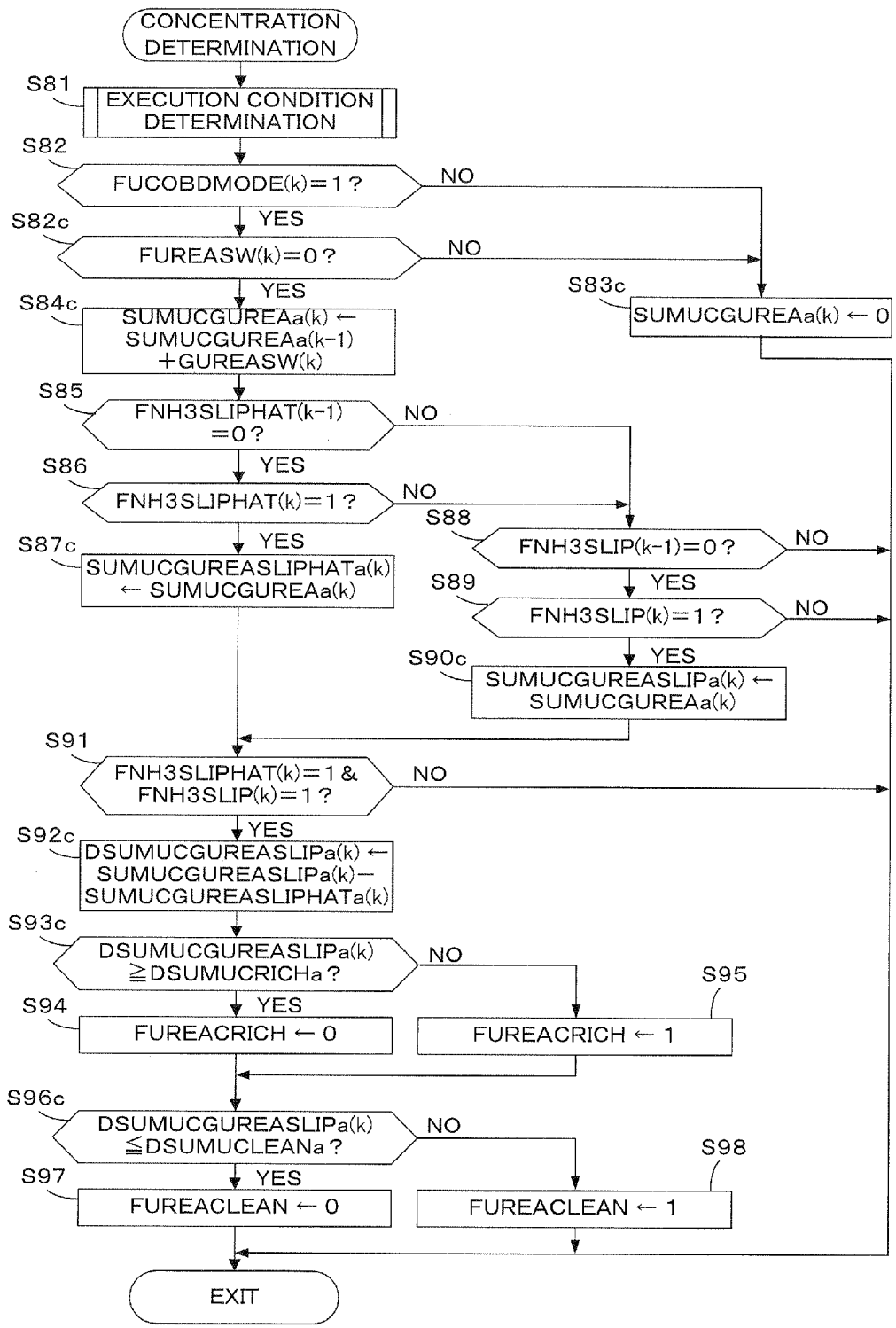
FIG. 24 is a flowchart of the calculation process (fourth concentration determination method) in the concentration determination block of FIG. 5.

FIG. 24 is a flowchart of the concentration determination process which uses a fourth concentration determination method. This process is obtained by changing steps S83b, S84b, S87b, S90b, S92b, S93b, and S96b of FIG. 22 respectively to steps S83c, S84c, S87c, S90c, S92c, S93c, and S96c, and further adding step S82c.

In the third concentration determination method, the calculation of the integrated value SUMUCGUREA starts at the time the concentration determination mode flag FUCOBD-MODE(k) changes to "1". In the fourth concentration determination method, the calculation of the integrated value SUMUCGUREAa starts at the time the injection amount switching flag FUREASW(k) changes to "1" after the concentration determination mode starts, i.e., at the time of starting the storage amount increase (refer to FIG. 25C).

In FIG. 24, if the answer to step S82 is affirmative (YES), the process proceeds to step S82c, in which it is determined whether or not the injection amount switching flag FUREASW(k) is "0". If the answer to step 82c is negative (NO), the process proceeds to step S83c, in which the integrated value SUMUCGUREAa(k) is set to "0". If the answer to step S82c is affirmative (YES), the process proceeds to step S84c, in which the integrated value SUMUCGUREAa(k) is calculated by the following equation (21c).

$$SUMUCGUREAa(k)=SUMUCGUREAa(k-1)+GUREASW(k) \qquad (21c)$$

In step S87c, the estimated slip detection integrated value SUMUCGUREASLIPHATa(k) is set to the integrated value SUMUCGUREAa(k). In step S90c, the slip detection integrated value SUMUCGUREASLIPa(k) is set to the integrated value SUMUCGUREAa(k).

In step S92c, an urea concentration determination value DSUMUCGUREASLIPa(k) is calculated by the following equation (1c).

$$DSUMUCGUREASLIPa(k)=SUMUCGUREASLIPa(k)-SUMUCGUREASLIPHATa(k) \qquad (1c)$$

In step S93c, it is determined whether or not the urea concentration determination value DSUMUCGUREASLIPa (k) is equal to or greater than a high concentration determination threshold value DSUMUCRICHa of the fourth concentration determination method. In step S96c, it is determined whether or not the urea concentration determination value DSUMUCGUREASLIPa(k) is equal to or less than a low concentration determination threshold value DSU-MUCLEANa of the fourth concentration determination method. Consequently, if DSUMUCGUREASLIPa(k) is less than DSUMUCRICHa, the high concentration abnormality flag FUREACRICH is set to "1" (step S95). If DSU- MUCGUREASLIPa(k) is greater than DSUMUCLEANa, the low concentration abnormality flag FUREACLEAN is set to "1" (step S98).

FIGS. 25A-25E show time charts for illustrating the concentration-determination process of FIG. 24, and an example in which the urea concentration CUR is higher than the normal concentration CUR0, is shown like FIGS. 23A-23E. FIGS. 25A, 25B, 25D, and 25E are the same as the corresponding FIGS. 23A, 23B, 23D, and 23E. FIG. 25C shows changes in the integrated value SUMUCGUREAa.

The calculation of the integrated value SUMUCGUREAa starts at time t30 at which the injection amount switching flag FUREASW changes to "0".

The slip detection integrated value SUMUCGUREASLIPa is set to the integrated value SUMUCGUREAa of time t31, and the estimated slip detection integrated value SUMUCGUREASLIPHATa is set to the integrated value SUMUCGUREAa of time t32. Therefore, the urea concentration determination value DSUMUCGUREASLIPa takes a negative value, and the urea concentration CUR is determined to be higher than the normal concentration CUR0.

FIG. 26 is a flowchart of the concentration determination process which uses a fifth concentration determination method. The fifth concentration determination method is made contemplating that the basic adaptive coefficient KVNSBS decreases as the urea concentration CUR becomes higher, wherein the concentration determination is performed according to the basic adaptive coefficient KVNSBS. The determination by the fifth concentration determination method can be performed at anytime.

In step S111, it is determined whether or not the basic adaptive coefficient KVNSBS(k) is greater than a high concentration coefficient threshold value KVNSOBDRICH. If the answer to step S111 is negative (NO), the high concentration abnormality flag FUREACRICH is set to "1" (step S113). If KVNSBS(k) is equal to or greater than KVNSOBDRICH in step S111, the high concentration abnormality flag FUREACRICH is set to "0" (step S112).

In step S114, it is determined whether or not the basic adaptive coefficient KVNSBS(k) is equal to or less than a low concentration coefficient threshold value KVNSOBDLEAN. The answer to step S114 is negative (NO), the low concentration abnormality flag FUREACLEAN is set to "1" (step S116). If KVNSBS(k) is equal to or less than KVNSOBDLEAN in step S111, the low concentration abnormality flag FUREACLEAN is set to "0" (step S115).

Next, typical examples of the control operation in which the above-described concentration determination methods are used will be described with reference to time charts of FIGS. 27A to 36G.

FIGS. 27A to 29G correspond to examples in which the first concentration determination method is applied to the exhaust system having a new SCR catalyst 3. FIGS. 27A to 27G respectively show changes in the NH3 sensor output NH3CONS, changes in the estimated storage amount STNH3 and the actual storage amount NH3ACT, changes in the urea solution injection amount GUREA (solid line) and the switching injection amount GUREASW (broken line), changes in the urea concentration determination value DPRDUCNH3SLIP, changes in the concentration determination mode flag FUCOBDMODE, and changes in the basic adaptive coefficient KVNSBS and the adaptive coefficient KVNS. Further, FIGS. 27H to 27J respectively show changes in the engine rotational speed NE, changes in the engine load TRQ, and changes in an upstream side NOx amount QNOx 1 and a downstream side NOx amount QNOx2. The upstream side NOx amount QNOx1 indicates an amount of NOx on the upstream side of the SCR catalyst 3, and the downstream side NOx amount QNOx2 indicates an amount of NOx on the downstream side of the SCR catalyst 3. FIGS. 28A to 29G show time charts corresponding to FIGS. 27A to 27G.

FIGS. 27A to 27J correspond to the state in which the urea concentration CUR is equal to the normal concentration CUR0. In FIG. 27B, the estimated storage amount STNH3 coincides with the actual storage amount NH3ACT. Accordingly, only the estimated storage amount STNH3 is shown by the solid line. The urea concentration determination value DPRDUCNH3SLIP is maintained at "0" and the basic adaptive coefficient KVNSBS and the adaptive coefficient KVNS are maintained at "1.0". The concentration determination is performed during a time period in which the concentration determination mode flag FUCOBDMODE is "1" (broken line in FIG. 27E). Both of the high concentration abnormality flag FUREACRICH and the low concentration abnormality flag FUREACLEAN are maintained at "0".

It is to be noted that the engine operating condition upon the concentration determination is the steady operating condition as shown in FIGS. 27H and 27I, and the engine operating condition is the same in the examples shown in FIGS. 28A to 36G. Further, according to FIG. 27J, it is confirmed that the NOx amount on the downstream side of the SCR catalyst 3 greatly decreases. In FIGS. 28A to 36G, time charts corresponding to FIGS. 27H to 27J are omitted.

FIGS. 28A to 28G corresponds to the state in which the urea concentration CUR is higher than the normal concentration CUR0. In FIG. 28B, the actual storage amount NH3ACT is shown by the thin broken line. Since the basic adaptive coefficient KVNSBS takes a value in the vicinity of "1.0" at the beginning (FIG. 28F), the estimated storage amount STNH3 (solid line) is less than the actual storage amount NH3ACT. Thereafter, the basic adaptive coefficient KVNSBS gradually decreases, and the estimated storage amount STNH3 coincides with the actual storage amount NH3ACT. At time t41, the urea concentration determination value DPRDUCNH3SLIP becomes less than the high concentration determination threshold value DPRDUCRICH, and the high concentration abnormality flag FUREACRICH (indicated by the solid line in FIG. 28G) is set to "1".

FIGS. 29A to 29G correspond to the state in which the urea concentration CUR is lower than the normal concentration CUR0. Since the basic adaptive coefficient KVNSBS takes a value in the vicinity of "1.0" at the beginning (FIG. 29F), the estimated storage amount STNH3 becomes greater than the actual storage amount NH3ACT in FIG. 29B. Thereafter, the basic adaptive coefficient KVNSBS gradually increases, and the estimated storage amount STNH3 coincides with the actual storage amount NH3ACT. At time t41, the urea concentration determination value DPRDUCNH3SLIP exceeds the low concentration determination threshold value DPRDUCLEAN, and the low concentration abnormality flag FUREACLEAN (indicated by the broken line in FIG. 29G) is set to "1". It is to be noted that FIG. 29B shows changes in the estimated storage amount STNH3 which is not subjected to the upper limit process and the initialization process executed upon the NH3-slip detection (steps S13, S14, and S21 in FIG. 8). FIGS. 31B, 33B, and 36B are the same.

FIGS. 30A to 31G correspond to examples in which the fourth concentration determination method is applied to the exhaust system having a new SCR catalyst 3. FIGS. 30A to 30G correspond to an example in which the urea concentration CUR is higher than the normal concentration CUR0, and FIGS. 31A to 31G correspond to an example in which the urea concentration CUR is lower than the normal concentration CUR0. Each parameter shown in FIGS. 30A to 31G changes similarly to the corresponding parameter shown in FIGS. 28A to 29G, and the determination result is obtained at time t41.

FIGS. 32A to 33G correspond to examples in which the fifth concentration determination method is applied to the exhaust system having a new SCR catalyst 3. FIG. 32A to 32G correspond to an example in which the urea concentration CUR is higher than the normal concentration CUR0, and FIGS. 33A to 33G correspond to an example in which the urea concentration CUR is lower than the normal concentration CUR0. In the fifth determination method, the urea concentration determination values (DPRDUCNH3SLIP or the like) are not used. Accordingly, FIGS. 32D and 33D for indicating changes in the concentration determination value are not shown.

In the fifth concentration determination method, the determination is performed regardless of whether during the concentration determination mode or not (i.e., the determination is also performed during the normal operation mode). In FIG. 32F, the basic adaptive coefficient KVNSBS becomes less than the high concentration coefficient threshold value KVNSOBDRICH at time t51 and the high concentration abnormality flag FUREACRICH is set to "1" (FIG. 32G). On the other hand, in FIG. 33F, the basic adaptive coefficient KVNSBS exceeds the low concentration coefficient threshold value KVNSOBDLEAN at time t51, and the low concentration abnormality flag FUREACRICH is set to "1" (FIG. 33G).

FIGS. 34A to FIG. 36G correspond to an example in which the first concentration determination method is applied to the exhaust system having a deteriorated SCR catalyst 3. FIGS. 34A to 34G correspond to the state in which the urea concentration CUR is equal to the normal concentration CUR0, FIGS. 35A to 35G correspond to the state in which the urea concentration CUR is higher than the normal concentration CUR0, and FIGS. 36A to 36G correspond to the state in which the urea concentration CUR is lower than the normal concentration CUR0.

In FIG. 34B, a deteriorated actual storage capacity NH3ACTMAX is shown by the dot-and-dash line. It is confirmed that the parameters shown in FIGS. 34C to 34G change like the parameters in corresponding FIGS. 27C to 27G.

The parameters shown in FIGS. 35C to 35G change like the parameters in corresponding FIGS. 28C to 28G, and the parameters shown in FIGS. 36C to 36G change like the parameters in corresponding FIGS. 29C to 29G. Accordingly, the concentration determination is also accurately performed when the deteriorated SCR catalyst is used.

Figure 37:
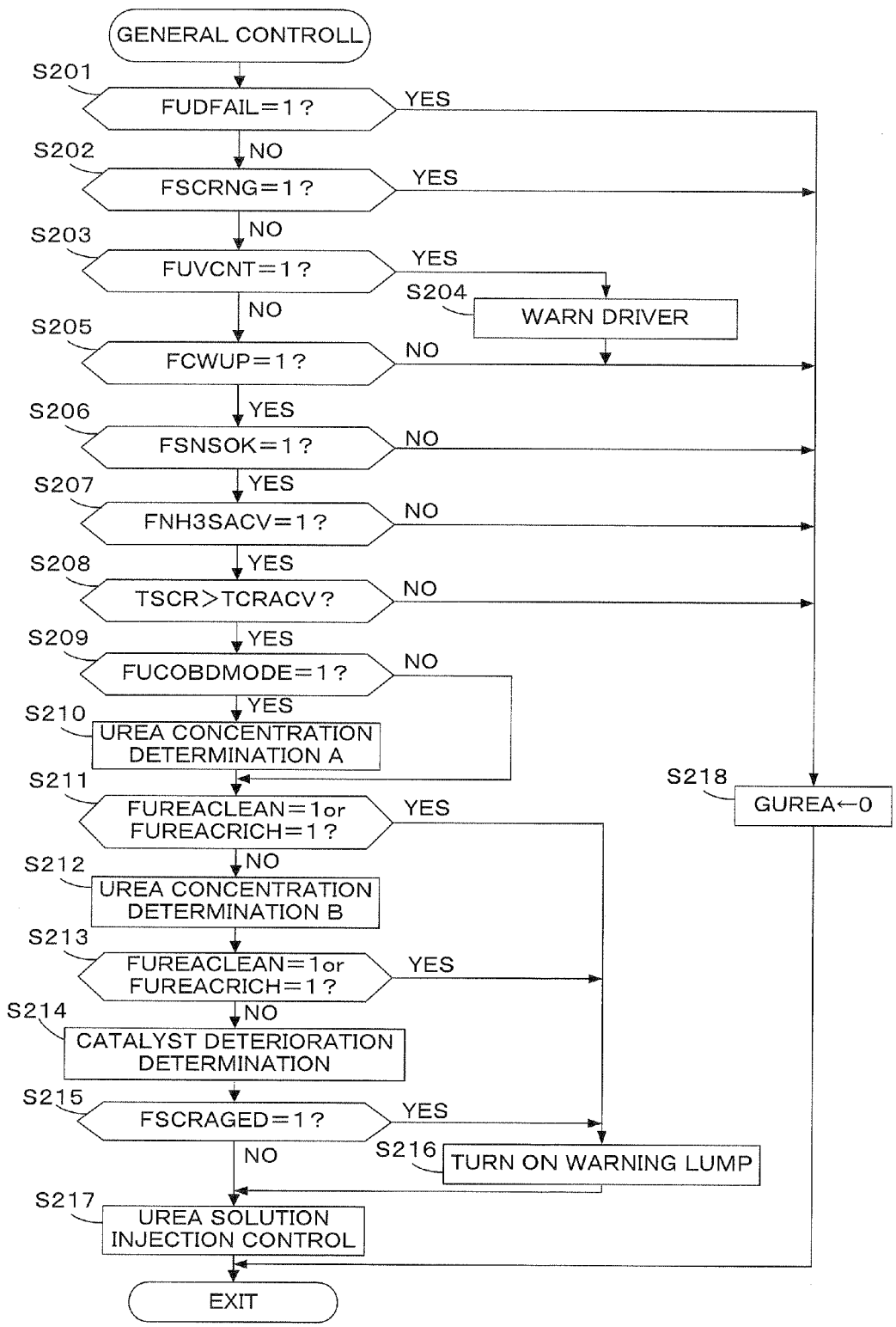
FIG. 37 is a flowchart showing a general configuration of a process which performs the urea injection amount control and the urea concentration determination.

FIG. 37 is a flowchart showing a general configuration of the process for performing the above-described urea solution injection control and the urea concentration determination. This process is executed by the CPU in the ECU 10, for example, at 50 msec intervals. In this process, any two of the above-described first to fifth concentration determination methods may be used to perform the urea concentration determination.

In step S201, it is determined whether or not an urea solution injection device failure flag FUDFAIL is "1". The urea solution injection device failure flag FUDFAIL is set to "1" when a failure of the urea solution injection device, which includes the urea solution tank 12 and the urea solution pump (not shown), is detected. If the answer to step S201 is negative (NO), it is determined whether or not a SCR catalyst abnormal deterioration flag FSCRNG is "1". The SCR catalyst abnormal deterioration flag FSCRNG is set to "1" when an abnormal deterioration of the SCR catalyst 3 is detected. If any one of the answers to steps S201 and S202 is affirmative (YES), the process proceeds to step S218, in which the urea solution injection amount GUREA is set to "0".

If the answer to step S202 is negative (NO), it is determined whether or not a urea solution tank empty flag FUVCNT is "1" (step S203). The urea solution tank empty flag FUVCNT is set to "1" when an amount of the urea solution in the urea solution tank 12 becomes equal to or less than a predetermined amount which is a little greater than "0". If the answer to step S203 is affirmative (YES), an output of the warning indication and/or the warning sound is performed (step S204), and the process proceeds to step S218.

If the answer to step S203 is negative (NO), it is determined whether or not an oxidation catalyst warming-up completion flag FCWUP is "1" (step S205). The oxidation catalyst warming-up completion flag FCWUP is set to "1" when a predetermined warming-up time period has elapsed after start of the engine. If the answer to step S205 is affirmative (YES), it is determined whether or not a sensor normal flag FSNSOK is "1" (step S206). The sensor normal flag FSNSOK is set to "1" when both of the NH3 sensor 7 and the SCR catalyst temperature sensor 6 are normal (is set to "0" when a failure of the sensor 6 and/or the sensor 7 is detected).

If the answer to step S206 is affirmative (YES), it is determined whether or not a sensor activation flag FNH3SACV is "1" (step S207). The sensor activation flag FNH3SACV is set to "1" when the NH3 sensor 7 is activated. If the answer to step S207 is affirmative (YES), it is determined whether or not the SCR catalyst temperature TSCR is higher than a predetermined activation temperature TSCRACV (e.g., 200 degrees centigrade) (step S208).

If any one of the answers to steps S205 to S208 is negative (NO), the process proceeds to step S218. If the answer to step S208 is affirmative (YES), it is determined whether or not the concentration determination mode flag FUCOBDMODE is "1" (step S209). If the answer to step S209 is affirmative (YES), a urea concentration determination A is performed, for example, with the first concentration determination method (step S210). If the answer to step S209 is negative (NO), the process immediately proceeds to step S211. Any one of the second to fourth concentration determination methods may be adopted as the urea concentration determination A.

In step S211, it is determined whether or not the high concentration abnormality flag FUREACRICH or the low concentration abnormality flag FUREACLEAN is "1". If the answer to step S211 is affirmative (YES), the warning lamp is turned on (step S216). Thereafter, the process proceeds to step S217.

If the answer to step S211 negatives (NO), i.e., when both of the flags are "0" or "1", a urea concentration determination B is performed, for example, with the fifth determination method (step S212). Any one of the first to fourth concentration determination methods that is not adopted in the urea concentration determination A in step S210, may be adopted as the urea concentration determination B. However, if selecting one of the first to fourth methods, the determination is performed when the concentration determination mode flag FUCOBDMODE is "1".

In step S213, the same determination as that in step S211 is performed. If the answer to step S213 is affirmative (YES), the process proceeds to the above-described step S216.

If the answer to step S213 is negative (NO), a deterioration determination process of the SCR catalyst 3 (not shown) is performed (step S214). In the deterioration determination process, a catalyst deterioration flag FSCRAGED is set to "1" when the SCR catalyst 3 is determined to be deteriorated.

In step S215, it is determined whether or not the catalyst deterioration flag FSCRAGED is "1". If the answer to step S215 is affirmative (YES), the process proceeds to step S216. If the answer to step S215 is negative (NO), the process immediately proceeds to step S217, in which the above-described urea solution injection control is performed.

As described above, in this embodiment, the storage amount change control is performed and the urea concentration in the urea solution is determined according to the occurrence state of the NH3-slip during execution of the storage amount change control. In the storage amount change control, the storage amount NH3ACT indicative of an amount of the reducing agent, i.e., an amount of urea or ammonia stored in the SCR catalyst 3, is temporarily decreased from the state in which the storage amount NH3ACT is at maximum, and thereafter, the storage amount NH3ACT is increased until the slip flag FNH3SLIP is set to "1" (until an occurrence of the NH3-slip is detected). Therefore, the concentration determination can be performed without using a new additional sensor for the urea concentration determination and freezing the urea solution. Consequently, deterioration of the reducing agent amount supply accuracy due to a change in the urea concentration can accurately be determined with a comparatively simple configuration.

Further, the decreasing amount DSTUCJD of the storage amount NH3ACT is set to a value less than the deteriorated storage capacity NH3AMAXNG which is the maximum storage amount of the SCR catalyst which should be determined to be deteriorated. Therefore, the concentration determination can be performed without being influenced by the deterioration degree of the SCR catalyst 3.

According to the first concentration determination method, the urea concentration determination value DPRDUCNH3SLIP is calculated as a difference between the NH3-slip detection time period PRDUCNH3SLIP and the estimated NH3-slip detection time period PRDUCNH3SLIPHAT as the determination reference value. The NH3-slip detection time period PRDUCNH3SLIP indicates the time period from the time the decreasing of the storage amount NH3ACT is started to the time the NH3-slip occurs (FIG. 19, t31). The concentration determination is performed based on the urea concentration determination value DPRDUCNH3SLIP. The NH3-slip detection time period PRDUCNH3SLIP becomes shorter as the urea concentration CUR becomes higher. Therefore, the urea concentration can be determined based on the difference between the NH3-slip detection time period PRDUCNH3SLIP and the estimated NH3-slip detection time period PRDUCNH3SLIPHAT.

The estimated NH3-slip detection time period PRDUCNH3SLIPHAT is calculated according to the estimated storage capacity STNH3MAX and the estimated NH3 storage amount STNH3. The engine operating condition (the engine rotational speed NE and the engine load TRQ) and the SCR catalyst temperature TSCR are reflected in these parameters (S11 and S12 of FIG. 8). Therefore, the determination can accurately be performed regardless of the engine operating condition and/or changes in the SCR catalyst temperature TSCR when performing the concentration determination.

Further, according to the second concentration determination method, the urea concentration determination is performed based on the urea concentration determination value DPRDUCNH3SLIP indicative of a difference between the NH3-slip detection time period PRDUCNH3SLIPa and the estimated NH3-slip detection time period PRDUCNH3SLIPHATa as the determination reference value. The NH3-slip detection time period PRDUCNH3SLIPa indicates the time period from the time the increasing of the storage amount NH3ACT is started (t30 of FIG. 21) to the time the NH3-slip occurs (t31). The urea concentration can be determined by the NH3-slip detection time period PRDUCNH3SLIPa which starts from the time of starting the increasing in the storage amount NH3ACT, similarly to the first concentration determination method.

Figure 23:
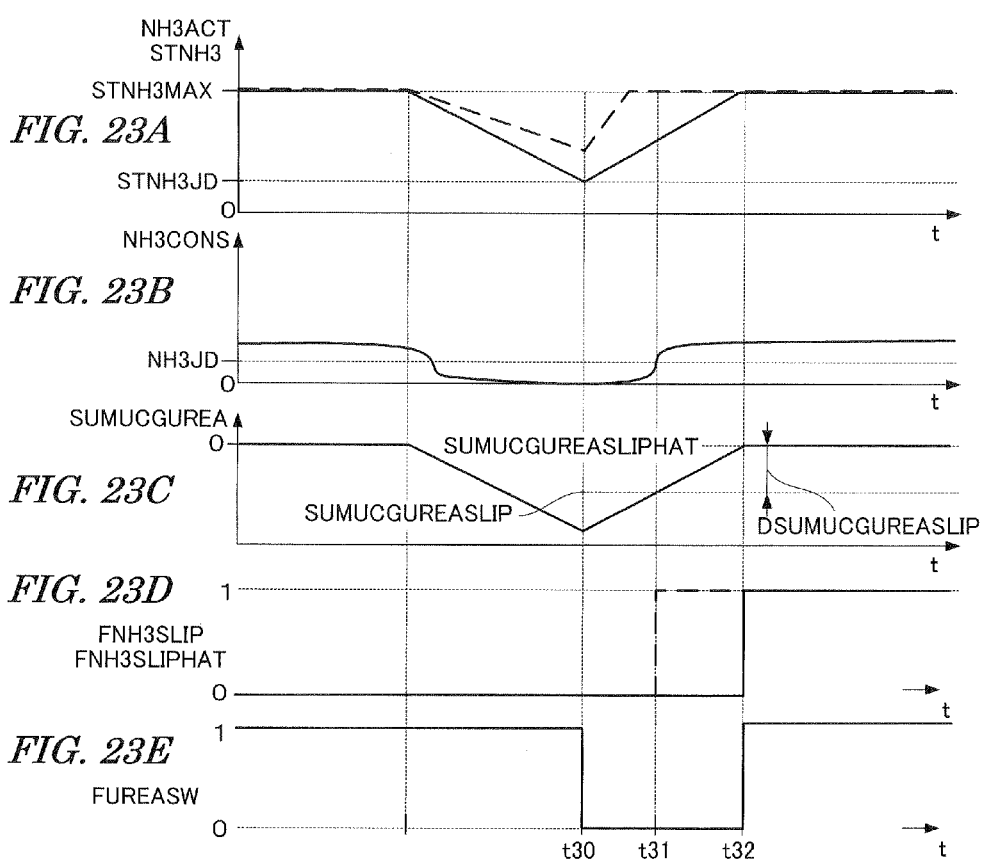
FIGS. 23A-23E show time charts for illustrating the process of FIG. 22.

Further, according to the third concentration determination method, the concentration determination value DSUMUCGUREASLIP is calculated as a difference between the slip detection integrated value SUMUCGUREASLIP and the estimated slip detection integrated value SUMUCGUREASLIPHAT as the determination reference value. The slip detection integrated value SUMUCGUREASLIP indicates a change amount of the storage amount from the time of starting the decrease in the storage amount NH3ACT to the time the NH3-slip occurs (FIG. 23, t31). The urea concentration determination is performed based on the concentration determination value DSUMUCGUREASLIP. The slip detection integrated value SUMUCGUREASLIP decreases as the urea concentration becomes higher. Therefore, the urea concentration can be determined based on the difference between the slip detection integrated value SUMUCGUREASLIP and the estimated slip detection integrated value SUMUCGUREASLIPHAT.

Further, according to the fourth concentration determination method, the concentration determination value DSUMUCGUREASLIPa is calculated as a difference between the slip detection integrated value SUMUCGUREASLIPa and the estimated slip detection integrated value SUMUCGUREASLIPHATa as the determination reference value. The slip detection integrated value SUMUCGUREASLIPa indicates a change amount of the storage amount from the time of starting the increase in the storage amount NH3ACT (t30 of FIG. 25) to the time the NH3-slip occurs (t31 of FIG. 25). The urea concentration determination is performed based on the concentration determination value DSUMUCGUREASLIPa. The urea concentration can be determined by using the slip detection integrated value SUMUCGUREASLIPa whose integration starts from the time of starting the increase in the storage amount NH3ACT, similarly to the third concentration determination method.

Further, according to the fifth concentration determination method, the urea concentration determination is performed by comparing the basic adaptive coefficient KVNSBS with the predetermined coefficient threshold values KVNSOBDRICH and KVNSOBDLEAN. Since the basic adaptive coefficient KVNSBS decreases as the urea concentration CUR becomes higher, the urea concentration determination can be performed at any time by comparing the basic adaptive coefficient KVNSBS with the predetermined coefficient threshold value.

In this embodiment, the urea solution corresponds to the reactant, urea corresponds to the reducing agent, and the urea tank 12, the passage 11, and the urea solution injection valve 5 correspond to the reducing-agent supply means. Further, the NH3 sensor 7 constitutes a part of the reducing-agent slip determining means, and the ECU 10 constitutes a part of the reducing-agent slip determining means, the storage amount changing means, and the accuracy determining means. Specifically, the slip determination block 32 of FIG. 2 corresponds to the reducing agent slip determining means, the storage amount estimation block 33 and the switching injection amount calculation block 35 correspond to the storage amount changing means, and the concentration determination block 36 is corresponds to the accuracy determining means.

The present invention is not limited to the embodiment described above, and various modifications may be made. For example, the processes shown in FIGS. 8 and 13 may be replaced with the processes shown in FIGS. 38 and 39.

Figure 38:
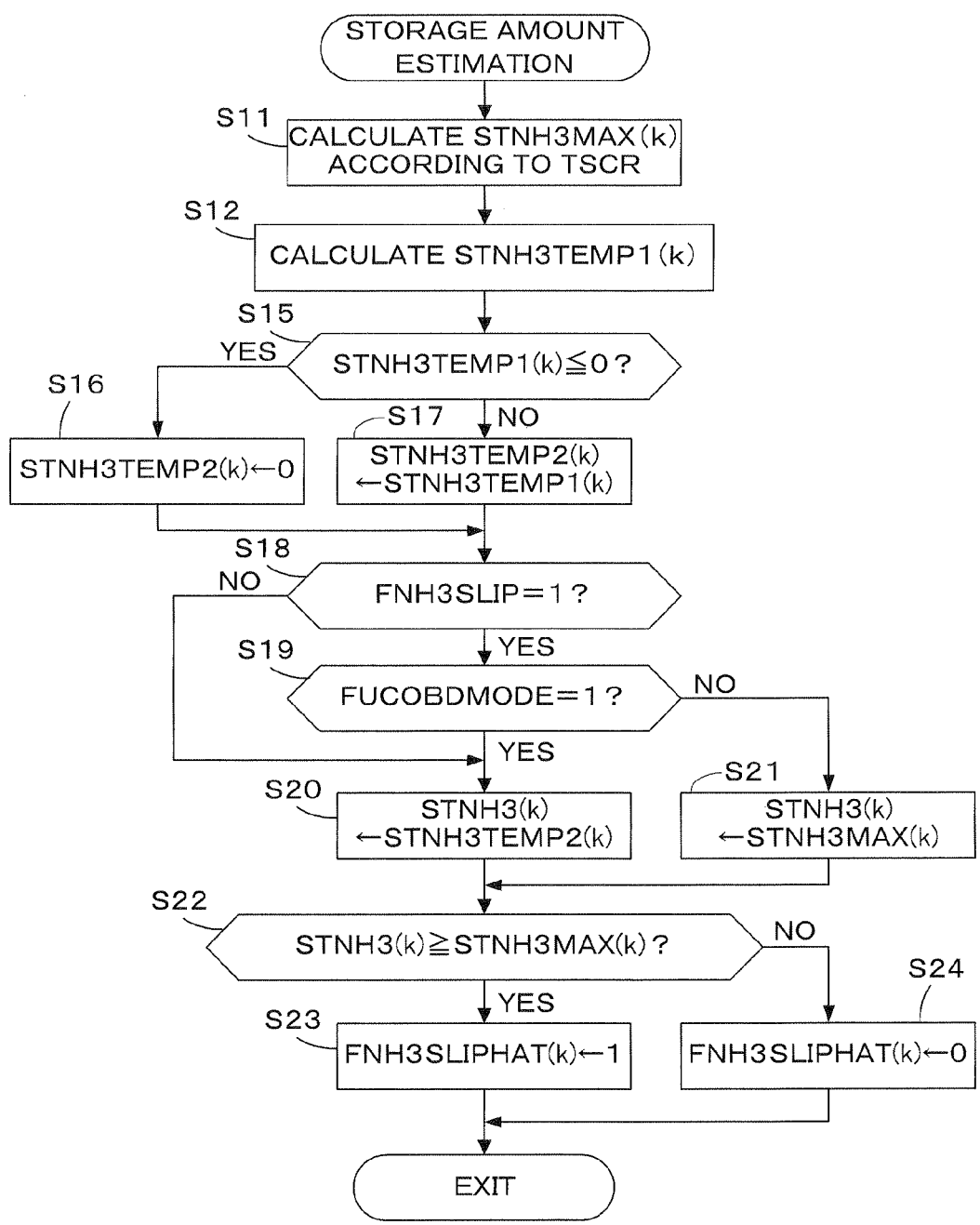
FIG. 38 is a flowchart showing a modification of the process shown in FIG. 8.

FIG. 38 is obtained by deleting steps S13 and S14 of FIG. 8, so that the upper limit process of the first calculation parameter STNH3TEMP1 is not performed. Without the upper limit process of STNH3TEMP1, the estimated storage amount STNH3can exceeds the estimated storage capacity STNH3MAX in the urea concentration determination mode (when FUCOBDMODE=1).

Figure 39:
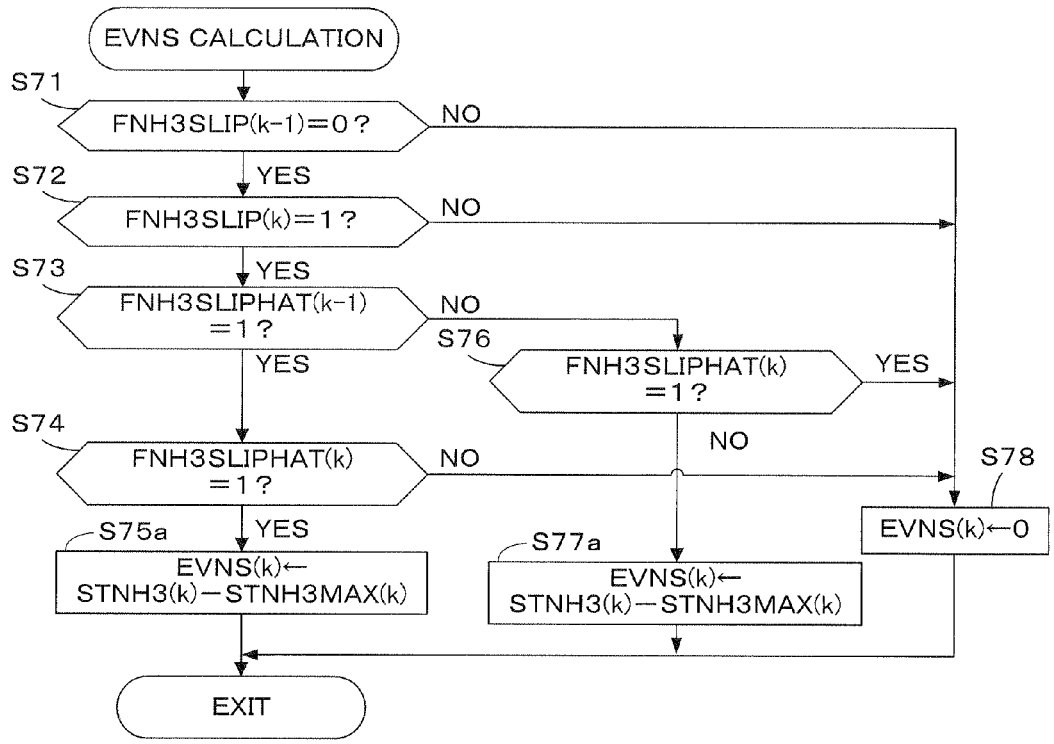
FIG. 39 is a flowchart showing a modification of the process shown in FIG. 13.

FIG. 39 is obtained by changing steps S75 and S77 of FIG. 13 respectively to steps S75a and S77a. The calculation in steps S75a is the same as that in step S77a, wherein the error amount EVNS(k) is calculated by the following equation (31).

$$EVNS(k)=STNH3(k)-STNH3MAX(k) \quad (31)$$

If the slip flag FNH3SLIP changes to "1" before the estimated slip flag FNH3SLIPHAT changes to "1", step S77a is executed. At this time, the estimated storage amount STNH3 (k) is less than the estimated storage capacity STNH3MAX (k). Therefore, the error amount EVNS calculated by the equation (31) takes a negative value. On the other hand, if the estimated slip flag FNH3SLIPHAT changes to "1" before the slip flag FNH3SLIP changes "1", step S75a is executed. At this time, the estimated storage amount STNH3(k) exceeds the estimated storage capacity STNH3MAX(k). Therefore, the error amount EVNS calculated by the equation (31) takes a positive value.

According to the processes of FIGS. 38 and 39, the error amount EVNS is calculated as a difference between the estimated storage amount STNH3and the estimated storage capacity STNH3MAX at the time the NH3-slip occurs (at the time the NH3-slip flag FNH3SLIP changes to "1"). Therefore, the error amount EVNS depending on a time difference (including the sign of positive or negative) between the time the slip flag FNH3SLIP changes to "1" and the time the estimated slip flag FNH3SLIPHAT change to "1", is obtained, which makes it possible to accelerate the convergence timing of the basic adaptive coefficient KVNSBS.

Figure 40:
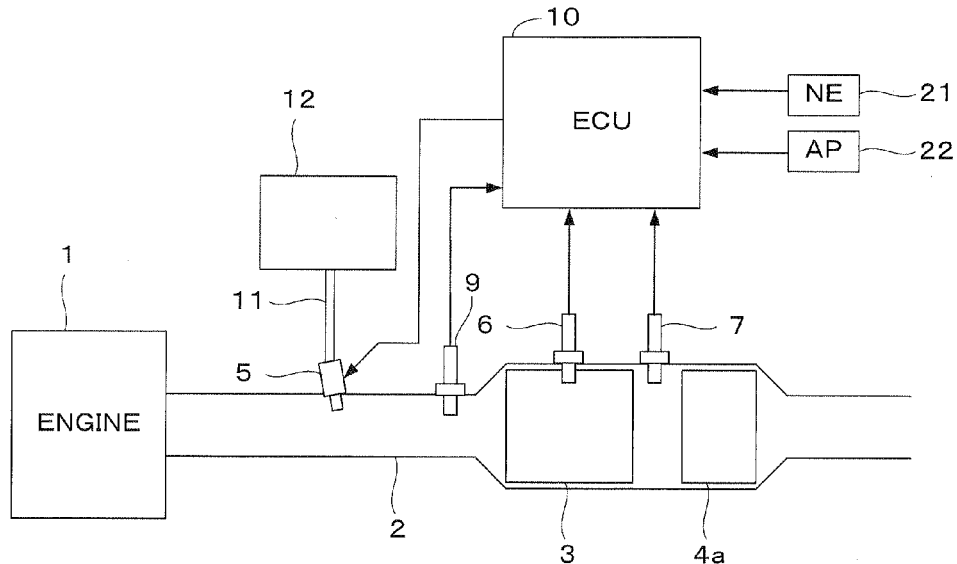
FIG. 40 is a schematic diagram showing a modification of the configuration shown in FIG. 1.
Figure 41:
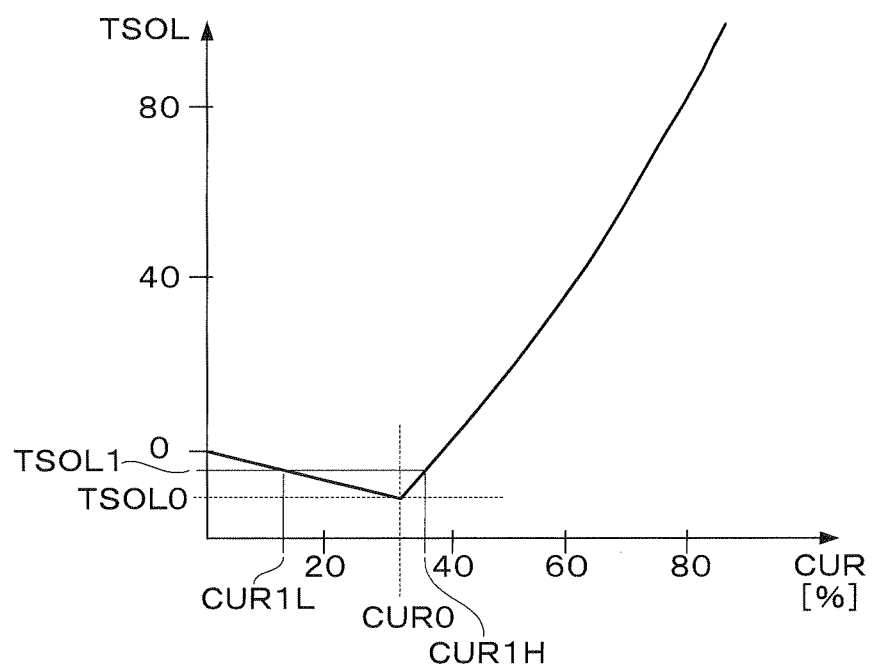
FIG. 41 shows a relationship between the urea concentration (CUR) and the freezing point (TSOL) of the urea solution.

Further, the oxidation catalyst 8 may be deleted as shown in FIG. 40. Further, a NOx concentration sensor 9 for detecting a NOx concentration NOxC in the exhaust gases may be disposed, and the basic injection amount GUREABS of the urea solution may be set according to the detected NOx concentration NOxC. Further, the SCR catalyst 4 disposed downstream of the SCR catalyst 3 may be replaced with an oxidation catalyst 4a.

Further, in the above-described embodiment, the urea solution is used as the reactant. Alternatively, for example, an aqueous solution of burette bond which is an urea polymer may be used as the reactant.

Further, the urea solution supply device in the above-described embodiment may be replaced with an ammonia gas (reducing agent) supply device, as shown in JP-'968. In this case, the urea injection amount control in the above-described embodiment corresponds to the ammonia gas flow rate control, the urea concentration determination method corresponds to the ammonia gas (reducing agent) supply accuracy determination method. The determination result that the urea concentration is abnormally high corresponds to the determination result that the ammonia supply amount is excessive. The determination result that the urea concentration is abnormally low corresponds to the determination result that the ammonia supply amount is too little. Therefore, the ammonia gas supply accuracy can be determined by applying the methods in the above-described embodiment. When the determination result that the ammonia supply amount is excessive or too little is obtained, the operating characteristic of the flow rate sensor, the flow rate control valve, or the like of the ammonia gas supply device can be determined to be deteriorated.

The present invention can be applied also to an exhaust gas purifying apparatus for a spark ignition type engine performing the lean-burn operation, or a watercraft propulsion engine such as outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine, comprising:
a selective reduction catalyst disposed in an exhaust passage of said engine for reducing NOx in exhaust gases from said engine under existence of a reducing agent;
reducing-agent supply means for supplying the reducing agent or a reactant for generating the reducing agent to the upstream side of said selective reduction catalyst;
reducing-agent slip determining means for determining occurrence of a reducing-agent slip in which the reducing agent is discharged to the downstream side of said selective reduction catalyst;
storage amount changing means for temporarily decreasing a storage amount indicative of an amount of the reducing agent stored in said selective reduction catalyst, from the state where the storage amount is at the maximum, and thereafter increasing the storage amount until the occurrence of the reducing-agent slip is detected; and
accuracy determining means for determining an accuracy of the reducing agent supply by said reducing agent supply means, according to an occurrence state of the reducing agent slip when said storage amount change means changes the storage amount.

2. An exhaust gas purifying apparatus according to claim 1, wherein said storage amount changing means comprises means for setting a decreasing amount of the storage amount to a value which is less than a deteriorated storage capacity indicative of a maximum storable amount of the reducing agent in a selective reduction catalyst which should be determined to be deteriorated.

3. An exhaust gas purifying apparatus according to claim 1, wherein said accuracy determining means comprises means for calculating the accuracy based on a difference between a time parameter and a determination reference value, the time parameter indicating a time period from the time the decreasing of the storage amount is started to the time the reducing agent slip occurs.

4. An exhaust gas purifying apparatus according to claim 2, wherein said accuracy determining means comprises means for calculating the accuracy based on a difference between a time parameter and a determination reference value, the time parameter indicating a time period from the time the decreasing of the storage amount is started to the time the reducing agent slip occurs.

5. An exhaust gas purifying apparatus according to claim 1, wherein said accuracy determining means comprises means for calculating the accuracy based on a difference between a time parameter and a determination reference value, the time parameter indicating a time period from the time the increasing of the storage amount is started to the time the reducing agent slip occurs.

6. An exhaust gas purifying apparatus according to claim 2, wherein said accuracy determining means comprises means for calculating the accuracy based on a difference between a time parameter and a determination reference value, the time parameter indicating a time period from the time the increasing of the storage amount is started to the time the reducing agent slip occurs.

7. An exhaust gas purifying apparatus according to claim 1, wherein said accuracy determining means comprises means for calculating the accuracy based on a difference between a change amount parameter and a determination reference value, the change amount parameter indicating a change amount of the storage amount from the time the decreasing of the storage amount is started to the time the reducing agent slip occurs.

8. An exhaust gas purifying apparatus according to claim 2, wherein said accuracy determining means comprises means for calculating the accuracy based on a difference between a change amount parameter and a determination reference value, the change amount parameter indicating a change amount of the storage amount from the time the decreasing of the storage amount is started to the time the reducing agent slip occurs.

9. An exhaust gas purifying apparatus according to claim 1, wherein said accuracy determining means comprises means for calculating the accuracy based on a difference between a change amount parameter and a determination reference value, the change amount parameter indicating a change amount of the storage amount from the time the increasing of the storage amount is started to the time the reducing agent slip occurs.

10. An exhaust gas purifying apparatus according to claim 2, wherein said accuracy determining means comprises means for calculating the accuracy based on a difference between a change amount parameter and a determination reference value, the change amount parameter indicating a change amount of the storage amount from the time the increasing of the storage amount is started to the time the reducing agent slip occurs.

11. An exhaust gas purifying apparatus according to claim 3, further comprising storage amount estimating means for calculating an estimated value of the storage amount according to an operating condition of said engine, wherein the determination reference value is calculated based on the estimated value of the storage amount.

12. An exhaust gas purifying apparatus according to claim 4, further comprising storage amount estimating means for calculating an estimated value of the storage amount according to an operating condition of said engine, wherein the determination reference value is calculated based on the estimated value of the storage amount.

13. An exhaust gas purifying apparatus according to claim 5, further comprising storage amount estimating means for calculating an estimated value of the storage amount according to an operating condition of said engine, wherein the determination reference value is calculated based on the estimated value of the storage amount.

14. An exhaust gas purifying apparatus according to claim 6, further comprising storage amount estimating means for calculating an estimated value of the storage amount according to an operating condition of said engine, wherein the determination reference value is calculated based on the estimated value of the storage amount.

15. An exhaust gas purifying apparatus according to claim 7, further comprising storage amount estimating means for calculating an estimated value of the storage amount according to an operating condition of said engine, wherein the determination reference value is calculated based on the estimated value of the storage amount.

16. An exhaust gas purifying apparatus according to claim 8, further comprising storage amount estimating means for calculating an estimated value of the storage amount according to an operating condition of said engine, wherein the determination reference value is calculated based on the estimated value of the storage amount.

17. An exhaust gas purifying apparatus according to claim 9, further comprising storage amount estimating means for calculating an estimated value of the storage amount according to an operating condition of said engine, wherein the determination reference value is calculated based on the estimated value of the storage amount.

18. An exhaust gas purifying apparatus according to claim 10, further comprising storage amount estimating means for calculating an estimated value of the storage amount according to an operating condition of said engine, wherein the determination reference value is calculated based on the estimated value of the storage amount.

\* \* \* \* \*